(12) United States Patent
Sueoka et al.

(10) Patent No.: US 10,767,577 B2
(45) Date of Patent: Sep. 8, 2020

(54) METHOD OF IMPLEMENTING CONTROL LOGIC OF COMPRESSION-IGNITION ENGINE

(71) Applicant: Mazda Motor Corporation, Aki-gun, Hiroshima (JP)

(72) Inventors: Masanari Sueoka, Hiroshima (JP); Atsushi Inoue, Aki-gun (JP); Keiji Maruyama, Hiroshima (JP); Takuya Ohura, Hiroshima (JP); Tomohiro Nishida, Hiroshima (JP); Yusuke Kawai, Hiroshima (JP); Tetsuya Chikada, Higashihiroshima (JP); Masatoshi Hidaka, Higashihiroshima (JP); Toshiaki Takahashi, Hiroshima (JP); Tatsuhiro Tokunaga, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/411,015

(22) Filed: May 13, 2019

(65) Prior Publication Data
US 2019/0360368 A1    Nov. 28, 2019

(30) Foreign Application Priority Data

May 22, 2018   (JP) .................................. 2018-098152
May 22, 2018   (JP) .................................. 2018-098153
May 22, 2018   (JP) .................................. 2018-098154

(51) Int. Cl.
*F02D 41/00*    (2006.01)
*F01L 13/00*    (2006.01)
(Continued)

(52) U.S. Cl.
CPC ...... *F02D 41/0002* (2013.01); *F01L 13/0036* (2013.01); *F02B 23/101* (2013.01);
(Continued)

(58) Field of Classification Search
None
See application file for complete search history.

(56) References Cited

U.S. PATENT DOCUMENTS

| | | | |
|---|---|---|---|
| 6,968,825 B2 | 11/2005 | Hitomi et al. | |
| 2006/0081207 A1 * | 4/2006 | Nakamura | F01L 13/0026 123/179.3 |
| 2009/0194081 A1 | 8/2009 | Ito et al. | |

FOREIGN PATENT DOCUMENTS

| | | | |
|---|---|---|---|
| EP | 0609837 A1 * | 8/1994 | ............... F02B 33/38 |
| EP | 3572651 A1 * | 11/2019 | ............ F01L 13/0036 |

(Continued)

OTHER PUBLICATIONS

Urushihara T et al., "A Study of a Gasoline-fueled Compression Ignition Engine ~ Expansion of HCCI Operation Range Using SI Combustion as a Trigger of Compression Ignition," SAE International, Apr. 11, 2005, 9 pages.

(Continued)

*Primary Examiner* — Patrick Hamo
*Assistant Examiner* — Wesley G Harris
(74) *Attorney, Agent, or Firm* — Alleman Hall Creasman & Tuttle LLP

(57) ABSTRACT

A method of implementing control logic of a compression-ignition engine is provided. A controller outputs a signal to a injector and a variable valve operating mechanism so that a gas-fuel ratio (G/F) becomes leaner than a stoichiometric air fuel ratio, and an air-fuel ratio (A/F) becomes equal to or richer than the stoichiometric air fuel ratio, and to an ignition plug so that unburnt mixture gas combusts by self-ignition (Continued)

after the ignition plug ignites mixture gas inside a combustion chamber. The method includes steps of determining a geometric compression ratio and determining the control logic defining an intake valve close timing IVC. IVC (deg.aBDC) is determined so that the following expression is satisfied: if the geometric compression ratio $\varepsilon$ is $10 \leq \varepsilon < 17$, $$0.4234\varepsilon^2 - 22.926\varepsilon + 207.84 + C \leq IVC \leq -0.4234\varepsilon^2 + 22.926\varepsilon - 167.84 + C$$

where C is a correction term according to an engine speed NE (rpm), $$C = 3.3 \times 10^{-10} NE^3 - 1.0 \times 10^{-6} NE^2 + 7.0 \times 10^{-4} NE.$$

20 Claims, 22 Drawing Sheets

(51) Int. Cl.
  *F02D 41/30* (2006.01)
  *F02D 41/14* (2006.01)
  *F02D 13/02* (2006.01)
  *F02B 23/10* (2006.01)
  *F02N 99/00* (2010.01)
  *F02N 19/00* (2010.01)

(52) U.S. Cl.
  CPC ..... *F02D 13/0219* (2013.01); *F02D 13/0261* (2013.01); *F02D 41/006* (2013.01); *F02D 41/0007* (2013.01); *F02D 41/0057* (2013.01); *F02D 41/1475* (2013.01); *F02D 41/3041* (2013.01); *F02N 19/004* (2013.01); *F02N 99/006* (2013.01); *F01L 2800/01* (2013.01); *F02D 2013/0292* (2013.01); *F02D 2041/001* (2013.01); *F02D 2041/0015* (2013.01); *F02D 2200/101* (2013.01)

(56) References Cited

FOREIGN PATENT DOCUMENTS

| | | | |
|---|---|---|---|
| EP | 3572652 A1 * | 11/2019 | ............ F02D 37/02 |
| JP | 4082292 B2 | 4/2008 | |
| JP | 6249667 B2 | 12/2017 | |

OTHER PUBLICATIONS

Gentz, G et al., "Spark Assist for CA50 Control and Improved Robustness in a Premixed LTGC Engine—Effects of Equivalence Ratio and Intake Boost," SAE International, Apr. 3, 2018, 19 pages.

Gerow, M et al., "A comparison of valving strategies appropriate for multi-mode combustion within a downsized boosted automotive engine part B: mid load operation within the SACI combustion regime," Proceedings of the ASME 2013 Internal Combustion Engine Division Fall Technical Conference, Dearborn Michigan, Oct. 13, 2013, 14 pages.

Szybist J et al., "Load Expansion of Stoichiometric HCCI Using Spark Assisted and Hydraulic Valve Actuation," SAE International, Oct. 25, 2010, 15 pages.

European Patent Office, Extended European Search Report Issued in Application No. 19174789.8, dated Sep. 18, 2019, Germany, 11 pages.

* cited by examiner

METHOD OF IMPLEMENTING CONTROL LOGIC OF COMPRESSION-IGNITION ENGINE

TECHNICAL FIELD

The technology disclosed herein relates to a method of implementing control logic of a compression-ignition engine.

BACKGROUND OF THE DISCLOSURE

It is known that combustion by compressed self-ignition in which a mixture gas combusts instantly without flame propagation maximizes fuel efficiency since the combustion period is the minimized. However, various problems must be solved for automobile engines with regard to combustion by compressed self-ignition. For example, since operating states and environmental conditions vary greatly in the automotive application, performing compressed self-ignition in a stable manner is a major problem. Combustion by compressed self-ignition has not yet been put to practical use for the automobile engine. In order to solve the problem, for example, JP4,082,292B2 proposes that an ignition plug ignite the mixture gas, when it is difficult for the compressed self-ignition to occur because of a low combustion-chamber temperature. By igniting the mixture gas immediately before a compression top dead center, the pressure around the ignition plug increases to facilitate the compressed self-ignition.

Unlike the technology disclosed in JP4,082,292B2 in which the compressed self-ignition is assisted by the ignition of the ignition plug, the present applicant instead proposes SPCCI (SPark Controlled Compression-ignition) combustion which is a combination of SI (Spark Ignition) combustion and CI (Compression-ignition) combustion. SI combustion is combustion accompanied by the flame propagation initiated by forcibly igniting the mixture gas inside the combustion chamber. CI combustion is combustion initiated by the mixture gas inside the combustion chamber carrying out the compressed self-ignition. SPCCI combustion is combustion in which, when the mixture gas inside the combustion chamber is forcibly ignited to start the combustion by flame propagation, the unburnt mixture gas inside the combustion chamber combusts by the compression-ignition because of a pressure buildup due to the heat generation and the flame propagation of the SI combustion. Since SPCCI combustion includes CI combustion, it is one form of "combustion by compression-ignition."

CI combustion takes place, when the in-cylinder temperature reaches an ignition temperature defined by the composition of the mixture gas. Fuel efficiency can be maximized, if the in-cylinder temperature reaches the ignition temperature near a compression top dead center and CI combustion takes place. The in-cylinder temperature increases according to the increase in the in-cylinder pressure. The in-cylinder pressure in SPCCI combustion is a result of two pressure buildups: a pressure buildup by the compression work of a piston in a compression stroke, and a pressure buildup caused by the heat generation of the SI combustion.

Here, the compression work of the piston is defined by an effective compression ratio. If the effective compression ratio is too low, the pressure buildup by the compression work of the piston is small. In this case, unless the flame propagation in SPCCI combustion progresses and the pressure buildup caused by the heat generation of the SI combustion increases considerably, the in-cylinder temperature cannot be raised to the ignition temperature. As a result, since a small amount of mixture gas is ignited by the compressed self-ignition, and a large amount of mixture gas combusts by the flame propagation, the combustion period becomes longer and fuel efficiency decreases. That is, in order to stabilize the CI combustion in the SPCCI combustion to maximize fuel efficiency, it is necessary to have the effective compression ratio above a certain value.

Meanwhile, if CI combustion takes place near the compression top dead center because of a high in-cylinder temperature at a compression starting timing due to a high ambient temperature, etc., the in-cylinder pressure excessively increases to create excessive combustion noise. In this case, the combustion noise can be reduced if the ignition timing is retarded. However, if the ignition timing is retarded, since the CI combustion takes place when the piston falls considerably in an expansion stroke, fuel efficiency is lowered. Since the pressure buildup caused by the heat generation of the SI combustion can be utilized in the SPCCI combustion, it is effective to lower the effective compression ratio to reduce the pressure buildup by the compression work of the piston in order to achieve both reduced combustion noise and improved fuel efficiency. Thus, combustion noise can be kept to a tolerable level without lowering fuel efficiency.

In order for a design engineer to put to practical use an engine which performs the SPCCI combustion, he/she needs to determine, depending on each engine operating state, the minimum effective compression ratio at which the CI combustion is stabilized, and additionally needs to raise the effective compression ratio within a permissible combustion noise range and determine the effective compression ratio without the combustion noise becoming excessively large. Therefore, the design engineer can put to practical use the engine with maximum fuel efficiency by maximizing the ratio of the CI combustion within the SPCCI combustion, while suppressing the combustion noise to a tolerable level.

However, since the SPCCI combustion is a new combustion system in the art, no one has found the suitable range for the effective compression ratio until now.

The effective compression ratio of the engine is determined based on a geometric compression ratio and a close timing of an intake valve. Since the intake valve close timing is changed when the engine is actually operated, when implementing engine control logic for performing the SPCCI combustion, the design engineer needs to determine the intake valve close timing.

Since the maximum in-cylinder pressure increases as the geometric compression ratio increases, the strength of engine components needs to be raised, which results in an increase in weight, and an increase in mechanical resistance loss. Meanwhile, in terms of thermal efficiency, a larger expansion ratio which is determined based on the geometric compression ratio is desirable. Since the maximum in-cylinder pressure varies by the heat balance based on the combustion mode or the stroke capacity even if the geometric compression ratio is same, the optimal geometric compression ratio for the new combustion system of SPCCI combustion has been unknown until now.

SUMMARY OF THE DISCLOSURE

The present inventors diligently examined SPCCI combustion, and as a result, succeeded in determining a suitable range of a close timing of an intake valve within a range of a geometric compression ratio where the SPCCI combustion occurs. The present inventors came to invent a method of implementing control logic of a compression-ignition engine based on this knowledge.

Specifically, the technology disclosed herein relates to the method of implementing the control logic of the compression-ignition engine.

The engine includes a injector configured to inject fuel to be supplied in a combustion chamber, a variable valve operating mechanism configured to change a valve timing of an intake valve, an ignition plug configured to ignite a mixture gas inside the combustion chamber, at least one sensor configured to measure a parameter related to an operating state of the engine, and a controller configured to perform a calculation according to the control logic corresponding to the operating state of the engine in response to the measurement of the at least one sensor, and output a signal to the injector, the variable valve operating mechanism, and the ignition plug.

The controller outputs the signal to the injector and the variable valve operating mechanism so that a gas-fuel ratio (G/F) that is a weight ratio of the entire gas of the mixture gas inside the combustion chamber to the fuel becomes leaner than a stoichiometric air fuel ratio, and an air-fuel ratio (A/F) that is a weight ratio of air contained in the mixture gas to the fuel becomes the stoichiometric air fuel ratio or richer than the stoichiometric air fuel ratio, and outputs the signal to the ignition plug so that unburnt mixture gas combusts by self-ignition after the ignition plug ignites the mixture gas inside the combustion chamber.

The method of implementing the control logic includes the steps of determining a geometric compression ratio $\varepsilon$ of the engine, and determining control logic defining a valve close timing IVC of the intake valve. When determining the control logic, the valve close timing IVC (deg.aBDC) is determined so that the following expression is satisfied:

if the geometric compression ratio $\varepsilon$ is $10 \leq \varepsilon < 17$, $$0.4234\varepsilon^2 - 22.926\varepsilon + 207.84 + C \leq IVC \leq -0.4234\varepsilon^2 + 22.926\varepsilon - 167.84 + C \quad (a)$$

where C is a correction term according to the engine speed NE (rpm), $$C = 3.3 \times 10^{-10} NE^3 - 1.0 \times 10^{-6} NE^2 + 7.0 \times 10^{-4} NE.$$

The ignition plug ignites the mixture gas inside the combustion chamber in response to the signal from the controller. The combustion starts by flame propagation and then the unburnt mixture gas combusts by self-ignition to complete the combustion. That is, this engine performs SPCCI (SPark Controlled Compression Ignition) combustion.

With this engine, the G/F of the mixture gas is made leaner than the stoichiometric air fuel ratio and the A/F is made to be the stoichiometric air fuel ratio or richer than the stoichiometric air fuel ratio. By making the G/F lean, fuel efficiency of the engine improves, and by making the A/F the stoichiometric air fuel ratio, emission performance improves by using a catalyst device.

When implementing the control logic of the engine, a design engineer first determines the geometric compression ratio $\varepsilon$ of the engine. When the geometric compression ratio is set $10 \leq \varepsilon < 17$, the design engineer determines the valve close timing IVC of the intake valve so that the expression (a) is satisfied. By setting the close timing so as to satisfy the expression (a), the engine can keep the combustion noise within the allowable range while performing stable CI (compression ignition) combustion in the SPCCI combustion which is a combination of SI (spark ignition) combustion and the CI combustion, even under various conditions with different situations inside the combustion chamber. Operating the engine which performs the SPCCI combustion according to the control logic maximizes fuel efficiency.

The index for determining the valve close timing IVC, which is available when implementing the control logic of the engine which performs the SPCCI combustion has been unknown until now. The design engineer had to repeatedly conduct experiments, etc. under various conditions while changing the valve close timing IVC to various timings so as to determine the valve close timing IVC corresponding to the operating state of the engine.

The method defines the relationship between the geometric compression ratio $\varepsilon$ of the engine and the valve close timing IVC of the intake valve in order to achieve suitable SPCCI combustion. The design engineer can put to practical use the engine which performs the SPCCI combustion, by determining the valve close timing IVC within the range in which the relationship is satisfied. The design engineer can put to practical use the engine for performing the SPCCI combustion with very few man-hours.

When determining the control logic, the valve close timing IVC (deg.aBDC) may be determined so that the following expression is satisfied, if the geometric compression ratio $\varepsilon$ is $17 \leq \varepsilon < 20$.

$$-0.4288\varepsilon^2 + 31.518\varepsilon - 379.88 + C \leq IVC \leq -0.4234\varepsilon^2 + 22.926\varepsilon - 167.84 + C \quad (b)$$

or $$0.4234\varepsilon^2 - 22.926\varepsilon + 207.84 + C \leq IVC \leq 1.9163\varepsilon^2 - 89.935\varepsilon + 974.94 + C \quad (c)$$

With the engine which performs the SPCCI combustion, fuel efficiency is maximized. In addition, the design engineer can put to practical use the engine which performs the SPCCI combustion with fewer man-hours.

When determining the control logic, the valve close timing IVC (deg.aBDC) may be determined so that the following expression is satisfied, if the geometric compression ratio $\varepsilon$ is $20 \leq \varepsilon \leq 30$.

$$-0.4288\varepsilon^2 + 31.518\varepsilon - 379.88 + C \leq IVC \leq 120 \quad (d)$$

or $$-80 \leq IVC \leq 1.9163\varepsilon^2 - 89.935\varepsilon + 974.94 + C \quad (e)$$

Similar to the above, with the engine which performs the SPCCI combustion, fuel efficiency is maximized. In addition, the design engineer can put to practical use the engine which performs the SPCCI combustion with few man-hours.

When determining the control logic, the valve close timing IVC (deg.aBDC) may be determined so that the following expression is satisfied, if the fuel is a low octane fuel, and if the geometric compression ratio $\varepsilon$ is $10 \leq \varepsilon < 15.7$.

$$0.4234\varepsilon^2 - 21.826\varepsilon + 178.75 + C \leq IVC \leq -0.4234\varepsilon^2 + 21.826\varepsilon - 138.75 + C \quad (f)$$

Thus, the engine using the low octane fuel also can maximize fuel efficiency. In addition, the design engineer can put to practical use the engine which performs the SPCCI combustion with fewer man-hours.

By determining the valve close timing IVC of the intake valve so as to satisfy both of the expressions (a) and (f) if the geometric compression ratio $\varepsilon$ is $10 \leq \varepsilon < 15.7$, the design engineer can set the control logic suitable for both of the engine using a high octane fuel and the engine using the low octane fuel. Even if the octane number of the fuel is different depending on each destination, the design engineer can set the control logic collectively, which reduces the man-hours.

When determining the control logic, the valve close timing IVC (deg.aBDC) may be determined so that the following expression is satisfied, if the fuel is the low octane fuel, and if the geometric compression ratio ε is $15.7 \leq ε < 18.7$.

$$-0.5603ε^2+34.859ε-377.22+C \leq IVC \leq -0.4234ε^2+21.826ε-138.75+C \quad (g)$$

or $$0.4234ε^2-21.826ε+178.75+C \leq IVC \leq 1.9211ε^2-85.076ε+862.01+C \quad (h)$$

When determining the control logic, the valve close timing IVC (deg.aBDC) may be determined so that the following expression is satisfied, if the fuel is low octane fuel, and if the geometric compression ratio ε is $18.7 \leq ε \leq 30$.

$$-0.5603ε^2+34.859ε-377.22+C \leq IVC \leq 120 \quad (i)$$

or $$-80 \leq IVC \leq 1.9211ε^2-85.076ε+862.01+C \quad (j)$$

The close timing IVC of the intake valve may change as the operating state of the engine changes, and the close timing IVC (deg.aBDC) may be determined for each operating state so that one of the expressions (a) to (j) is satisfied.

Thus, the engine can stably perform the SPCCI combustion in various operating states, while reducing combustion noise.

The engine may be provided with an exhaust gas recirculation (EGR) system configured to introduce exhaust gas into the combustion chamber. The controller may output a signal to the EGR system and the ignition plug so that a heat amount ratio used as an index related to ratio of an amount of heat generated when the mixture gas combusts by flame propagation to the entire amount of heat generated when the mixture gas inside the combustion chamber combusts, becomes a target heat amount ratio defined corresponding to the operating state of the engine.

The heat amount ratio of SPCCI combustion is less than 100%. The heat amount ratio of the combustion mode where the combustion completes only by flame propagation without the combustion by compression ignition (i.e., SI combustion) is 100%.

If the heat amount ratio is increased in SPCCI combustion, the ratio of the SI combustion increases, which is advantageous in reducing combustion noise. Whereas, if the heat amount ratio is lowered in the SPCCI combustion, the ratio of the CI combustion increases, which is advantageous in improving fuel efficiency. The heat amount ratio changes by changing the temperature of the combustion chamber and/or an ignition timing. For example, when the temperature inside the combustion chamber is high, CI combustion starts at an early timing, and the heat amount ratio becomes low. Further, when the ignition timing is advanced, SI combustion starts at an early timing, and the heat amount ratio becomes high. By the controller outputting the signal to the EGR system and the ignition plug so that the heat amount ratio becomes the target heat amount ratio defined corresponding to the operating state of the engine, both of the reduction in the combustion noise and the improvement in the fuel efficiency can be achieved.

According to another aspect of the present disclosure, a method of implementing control logic of a compression-ignition engine is provided. The engine includes a injector configured to inject fuel to be supplied in a combustion chamber, a variable valve operating mechanism configured to change a valve timing of an intake valve, an ignition plug configured to ignite a mixture gas inside the combustion chamber, at least one sensor configured to measure a parameter related to an operating state of the engine, and a controller configured to perform a calculation according to the control logic corresponding to the operating state of the engine in response to the measurement of the at least one sensor, and output a signal to the injector, the variable valve operating mechanism, and the ignition plug. The controller outputs the signal to the injector and the variable valve operating mechanism so that an air-fuel ratio (A/F) that is a weight ratio of air contained in the mixture gas to the fuel becomes leaner than the stoichiometric air fuel ratio, and outputs the signal to the ignition plug so that unburnt mixture gas combusts by self-ignition after the ignition plug ignites the mixture gas inside the combustion chamber.

The method of implementing the control logic includes the steps of determining a geometric compression ratio ε of the engine, and determining control logic defining a valve close timing IVC of the intake valve. When determining the control logic, the valve close timing IVC (deg.aBDC) is determined so that the following expression is satisfied:

if the geometric compression ratio ε is $10 \leq ε < 20$, $$0.9949ε^2-41.736ε+401.16+C \leq IVC \leq -0.9949ε^2+41.736ε-361.16+C \quad (a')$$

where C is a correction term according to the engine speed NE (rpm), $$C=3.3 \times 10^{-10}NE^3-1.0 \times 10^{-6}NE^2+7.0 \times 10^{-4}NE.$$

The ignition plug ignites the mixture gas inside the combustion chamber in response to the signal from the controller. The combustion starts by flame propagation and then unburnt mixture gas combusts by self-ignition to complete the combustion. That is, this engine performs the SPCCI combustion.

With this engine, the A/F is made to be leaner than the stoichiometric air fuel ratio. By making the A/F lean, the fuel efficiency of the engine improves.

When implementing the control logic of the engine, a design engineer first determines the geometric compression ratio ε of the engine. When the geometric compression ratio ε is set $10 \leq ε < 20$, the design engineer determines the valve close timing IVC of the intake valve so that the expression (a) is satisfied. By setting the close timing so as to satisfy the expression (a), the engine can keep combustion noise within the allowable range while performing a stable CI combustion in the SPCCI combustion which is a combination of SI combustion and CI combustion, even under various conditions with different situations inside the combustion chamber. Operating the engine which performs the SPCCI combustion according to the control logic maximizing fuel efficiency.

The index for determining the valve close timing IVC, which is available when implementing the control logic of the engine which performs the SPCCI combustion has been unknown until now. The design engineer had to repeatedly conduct experiments, etc. under various conditions while changing the valve close timing IVC to various timings so as to determine the valve close timing IVC corresponding to the operating state of the engine.

The method defines the relationship between the geometric compression ratio ε of the engine and the valve close timing IVC of the intake valve in order to achieve suitable SPCCI combustion. The design engineer can put to practical use the engine which performs the SPCCI combustion, by determining the valve close timing IVC within the range in which the relationship is satisfied. The design engineer can put to practical use the engine for performing the SPCCI combustion with very few man-hours.

When determining the control logic, the valve close timing IVC (deg.aBDC) may be determined so that the following expression is satisfied, if the geometric compression ratio ε is 20≤ε<25.

$$-35+C \leq IVC \leq 75+C \quad \text{(b')}$$

With the engine which performs the SPCCI combustion, fuel efficiency is maximized. In addition, the design engineer can put to practical use the engine which performs the SPCCI combustion with fewer man-hours.

When determining the control logic, the valve close timing IVC (deg.aBDC) may be determined so that the following expression is satisfied, if the geometric compression ratio ε is 25≤ε<30.

$$-4.7481\varepsilon^2+266.75\varepsilon-3671.2+C \leq IVC \leq 75+C \quad \text{(c')}$$

or $$-35+C \leq IVC \leq 4.7481\varepsilon^2-266.75\varepsilon+3711.2+C \quad \text{(d')}$$

Similar to above, with the engine which performs the SPCCI combustion, fuel efficiency is maximized. In addition, the design engineer can put to practical use the engine which performs the SPCCI combustion with fewer man-hours.

When determining the control logic, the valve close timing IVC (deg.aBDC) may be determined so that the following expression is satisfied, if the fuel is the low octane fuel, and if the geometric compression ratio ε is 10≤ε<18.7.

$$0.9949\varepsilon^2-39.149\varepsilon+348.59+C \leq IVC \leq -0.9949\varepsilon^2+39.149\varepsilon-308.59+C \quad \text{(e')}$$

Thus, the engine using the low octane fuel also can maximize fuel efficiency. In addition, the design engineer can put in practical use the engine which performs the SPCCI combustion with fewer man-hours.

By determining a valve close timing IVC of the intake valve so as to satisfy both of the expressions (a') and (e') if the geometric compression ratio ε is 10≤ε<18.7, the design engineer can set the control logic suitable for both of the engine using the high octane fuel and the engine using the low octane fuel. Even if the octane number of the fuel is different depending on each destination, the design engineer can set the control logic collectively, which reduces the man-hours.

When determining the control logic, the valve close timing IVC (deg.aBDC) may be determined so that the following expression is satisfied, if the fuel is the low octane fuel, and if the geometric compression ratio ε is 18.7≤ε<23.7.

$$-35+C \leq IVC \leq 75+C \quad \text{(f')}$$

When determining the control logic, the valve close timing IVC (deg.aBDC) may be determined so that the following expression is satisfied, if the fuel is the low octane fuel, and if the geometric compression ratio ε is 23.7≤ε≤30.

$$-3.1298\varepsilon^2+172.48\varepsilon-2300+C \leq IVC \leq 75+C \quad \text{(g')}$$

or $$-35+C \leq IVC \leq 3.1298\varepsilon^2-172.48\varepsilon+2340+C \quad \text{(h')}$$

The close timing IVC of the intake valve may change as the operating state of the engine changes, and the close timing IVC (deg.aBDC) may be determined for each operating state so that one of the expressions (a') to (h') is satisfied.

Thus, the engine can stably perform SPCCI combustion in various operating states while reducing combustion noise.

According to still another aspect of the present disclosure, a method of implementing control logic of a compression-ignition engine is provided. The engine includes a injector configured to inject fuel to be supplied in a combustion chamber, a variable valve operating mechanism configured to change a valve timing of an intake valve, an ignition plug configured to ignite a mixture gas inside the combustion chamber, at least one sensor configured to measure a parameter related to an operating state of the engine, and a controller configured to perform a calculation according to the control logic corresponding to the operating state of the engine in response to the measurement of the at least one sensor, and output a signal to the injector, the variable valve operating mechanism, and the ignition plug. The engine may have a first mode in which the controller outputs a signal to each of the injector and the variable valve operating mechanism so that an air-fuel ratio (A/F) that is a weight ratio of air contained in the mixture gas to the fuel becomes leaner than a stoichiometric air fuel ratio, and outputs a signal to the ignition plug so that the unburnt mixture gas combusts by self-ignition after the ignition plug ignites the mixture gas inside the combustion chamber, and a second mode in which the controller outputs a signal to each of the injector and the variable valve operating mechanism so that a gas-fuel ratio (G/F) that is a weight ratio of the entire gas of the mixture gas inside the combustion chamber to the fuel becomes leaner than the stoichiometric air fuel ratio, and the A/F becomes the stoichiometric air fuel ratio or richer than the stoichiometric air fuel ratio, and outputs a signal to the ignition plug so that the unburnt mixture gas combusts by self-ignition after the ignition plug ignites the mixture gas inside the combustion chamber. The method of implementing the control logic includes the steps of determining a geometric compression ratio ε of the engine, and determining the control logic defining a valve close timing IVC of the intake valve. When determining the control logic, the valve close timing IVC (deg.aBDC) is determined so that the following expression is satisfied:

if the geometric compression ratio ε is 10≤ε<17, $$0.9949\varepsilon^2-41.736\varepsilon+401.16+C \leq IVC \leq -0.9949\varepsilon^2+41.736\varepsilon-361.16+C \quad \text{(a'')}$$

where C is a correction term according to the engine speed NE (rpm), $$C=3.3\times10^{-10}NE^3-1.0\times10^{-6}NE^2+7.0\times10^{-4}NE.$$

The ignition plug ignites the mixture gas inside the combustion chamber in response to the signal from the controller. The combustion starts by flame propagation and then the unburnt mixture gas combusts by self-ignition to complete the combustion. That is, this engine performs the SPCCI combustion.

With this engine, in the first mode, the A/F is made to be leaner than the stoichiometric air fuel ratio. By making the A/F lean, fuel efficiency of the engine improves. On the other hand, in the second mode, the G/F of the mixture gas is made leaner than the stoichiometric air fuel ratio and the A/F is made to be the stoichiometric air fuel ratio or richer than the stoichiometric air fuel ratio. By making the G/F lean, fuel efficiency of the engine improves. Further, by introducing EGR gas into the combustion chamber, the stability of the SPCCI combustion improves.

When implementing the control logic of the engine, the design engineer first determines the geometric compression ratio ε of the engine. When the geometric compression ratio ε is set 10≤ε<17, the design engineer determines the valve close timing IVC of the intake valve so that the expression (a) is satisfied. By setting the close timing so as to satisfy the expression (a), the engine can keep the combustion noise within the allowable range while performing stable CI combustion in the SPCCI combustion which is a combination of SI combustion and CI combustion, even under various conditions with different situations inside the combustion chamber. Operating the engine which performs the SPCCI combustion according to the control logic maximizes fuel efficiency.

The index for determining the valve close timing IVC, available when implementing the control logic of the engine which performs the SPCCI combustion has been unknown until now. The design engineer had to repeatedly conduct experiments, etc. under various conditions while changing the valve close timing IVC to various timings so as to determine the valve close timing IVC corresponding to the operating state of the engine.

The method of implementing the control logic defines the relationship between the geometric compression ratio ε of the engine and the valve close timing IVC of the intake valve in order to achieve suitable SPCCI combustion. The design engineer can put to practical use the engine which performs the SPCCI combustion, by determining the valve close timing IVC within the range in which the relationship is satisfied. The design engineer can put to practical use the engine for performing the SPCCI combustion with very few man-hours.

When determining the control logic, the valve close timing IVC (deg.aBDC) may be determined so that the following expression is satisfied if the geometric compression ratio ε is 17≤ε≤30.

$$-0.4288\varepsilon^2+31.518\varepsilon-379.88+C \leq IVC \leq -0.9949\varepsilon^2+41.736\varepsilon-361.16+C \quad \text{(b'')}$$

or $$0.9949\varepsilon^2-41.736\varepsilon+401.16+C \leq IVC \leq 1.9163\varepsilon^2-89.935\varepsilon+974.94+C \quad \text{(c'')}$$

With the engine which performs the SPCCI combustion, fuel efficiency is maximized in both of the first mode and the second mode. In addition, the design engineer can put to practical use the engine which performs the SPCCI combustion with fewer man-hours.

When determining the control logic, the valve close timing IVC (deg.aBDC) may be determined so that the following expression is satisfied, if the fuel is the low octane fuel, and if the geometric compression ratio ε is 10≤ε<15.7.

$$0.9949\varepsilon^2-39.149\varepsilon+348.59+C \leq IVC \leq -0.9949\varepsilon^2+39.149\varepsilon-308.59+C \quad \text{(d'')}$$

Thus, the engine using the low octane fuel also can maximize fuel efficiency. In addition, the design engineer can put to practical use the engine which performs the SPCCI combustion with fewer man-hours.

By determining a valve close timing IVC of the intake valve so as to satisfy both of the expressions (a") and (d") if the geometric compression ratio ε is 10≤ε<15.7, the design engineer can set the control logic suitable for both of the engine using the high octane fuel and the engine using the low octane fuel. Even if the octane number of the fuel is different depending on each destination, the design engineer can set the control logic collectively, which reduces the man-hours.

When determining the control logic, the valve close timing IVC (deg.aBDC) may be determined so that the following expression is satisfied, if the fuel is the low octane fuel, and if the geometric compression ratio ε is 15.7≤ε≤30.

$$-0.5603\varepsilon^2+34.859\varepsilon-377.22+C \leq IVC \leq -0.9949\varepsilon^2+39.149\varepsilon-308.59+C \quad \text{(e'')}$$

or $$0.9949\varepsilon^2-39.149\varepsilon+348.59+C \leq IVC \leq 1.9211\varepsilon^2-85.076\varepsilon+862.01+C \quad \text{(f'')}$$

The close timing IVC of the intake valve may change as the operating state of the engine changes, and the close timing IVC (deg.aBDC) may be determined for each operating state so that one of the expressions (a") to (f") is satisfied.

Thus, in both of the first mode and the second mode, the engine can stably perform SPCCI combustion in various operating states while reducing combustion noise.

The engine may operate in a low-load operating state where the load is a given load or lower, according to the control logic.

In general CI combustion, ignitability degrades when the engine load is low. In this regard, in the SPCCI combustion, SI combustion is performed at the start of the combustion, and CI combustion starts using the heat released by SI combustion. The ignitability of SPCCI combustion does not degrade even when the engine load is low.

Figure 11:
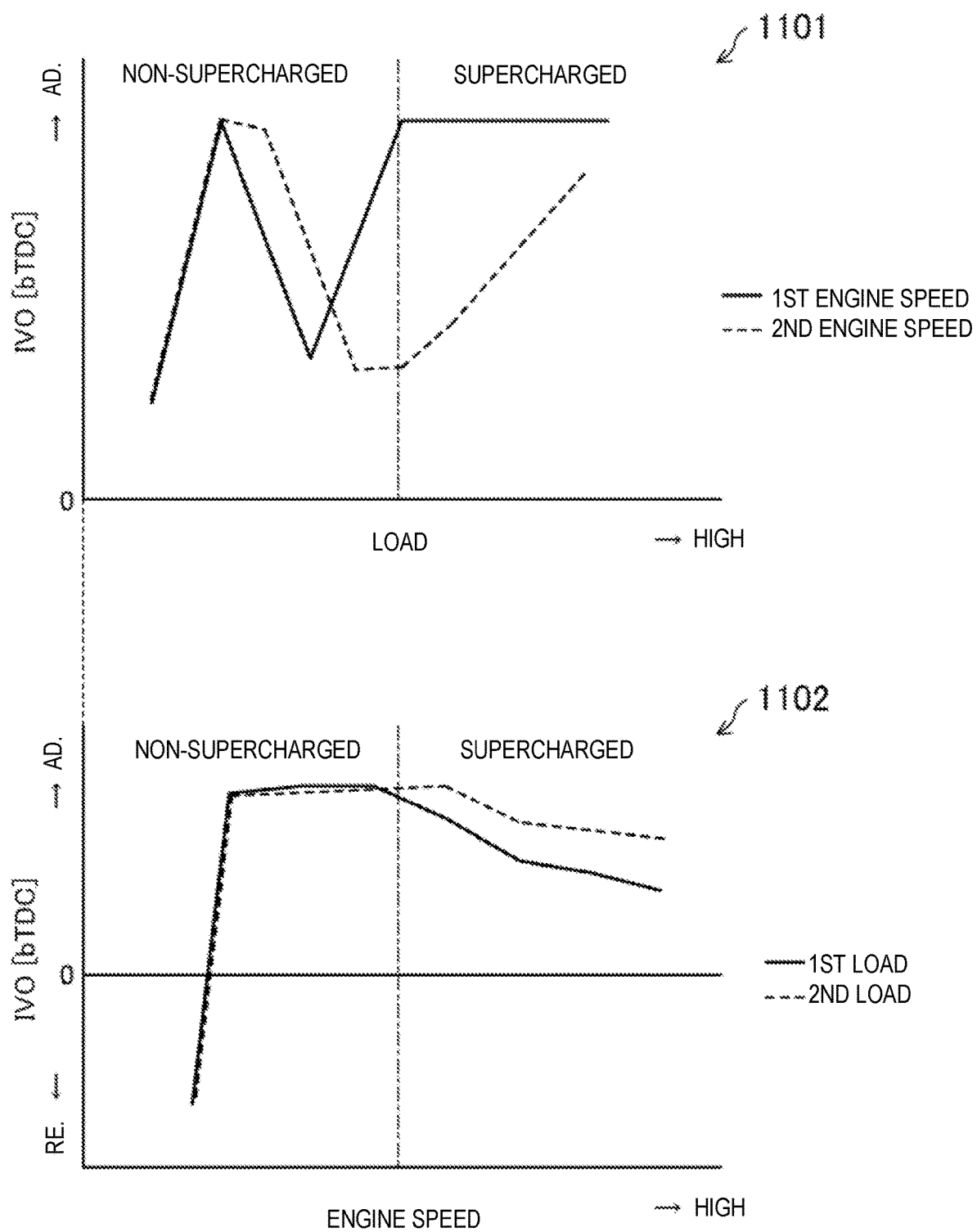

An upper graph of FIG. 11 is a graph illustrating a relationship between an engine load and a valve open timing of an intake valve in Layer 2, and a lower graph thereof is a graph illustrating a relationship between an engine speed and the valve open timing of the intake valve in Layer 2.

Figure 12:
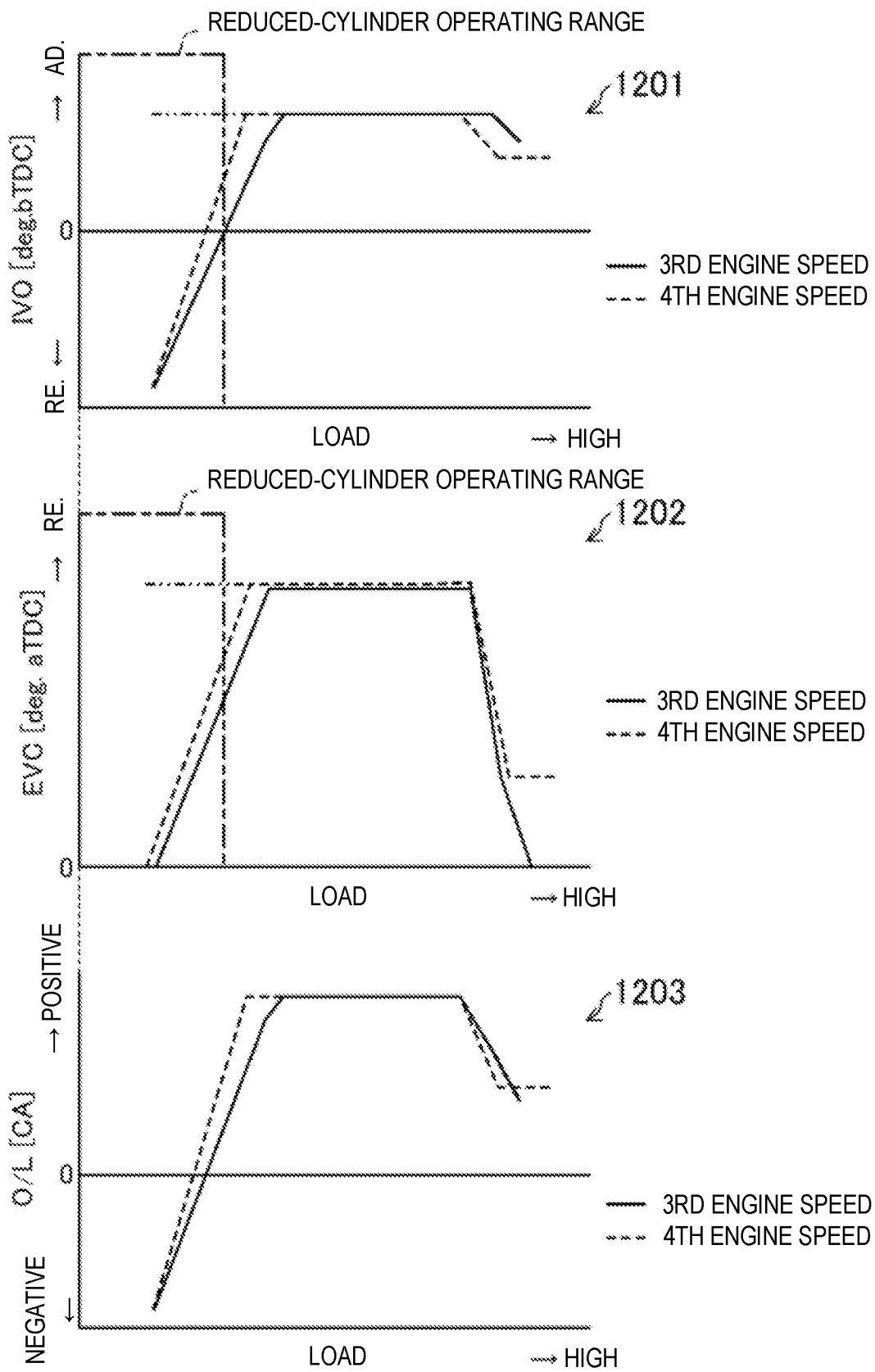

An upper graph of FIG. 12 is a graph illustrating a relationship between the engine load and the valve open timing of the intake valve in Layer 3, a middle graph thereof is a graph illustrating a relationship between the engine load and a valve close timing of an exhaust valve in Layer 3, and a lower graph thereof is a graph illustrating a relationship between the engine load, and an overlap period of the intake valve and the exhaust valve in Layer 3.

Figure 13:
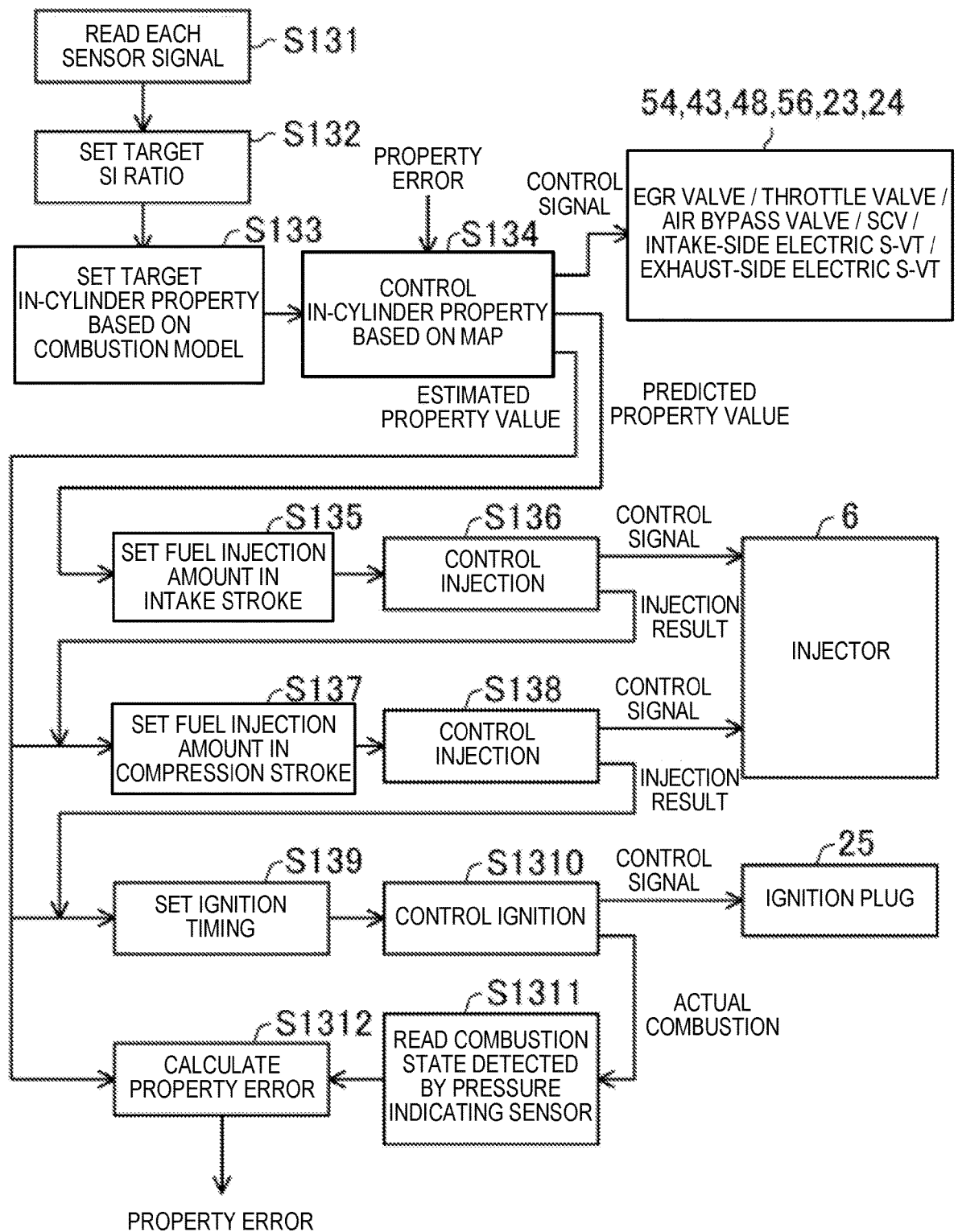

FIG. 13 is a flowchart illustrating a process of an operation control of the engine executed by an ECU.

Figure 14:
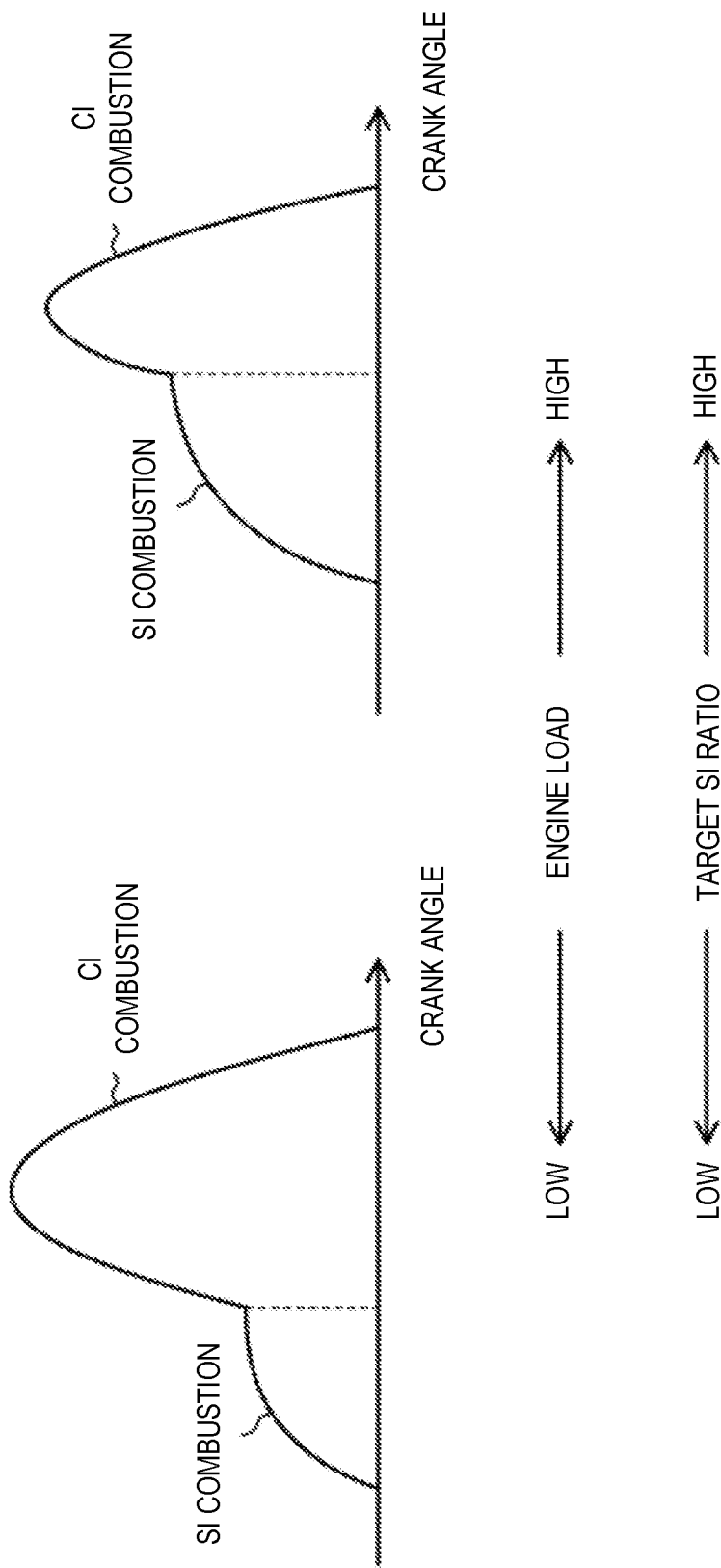

FIG. 14 illustrates a relationship between the engine load and a target SI ratio.

Figure 15:
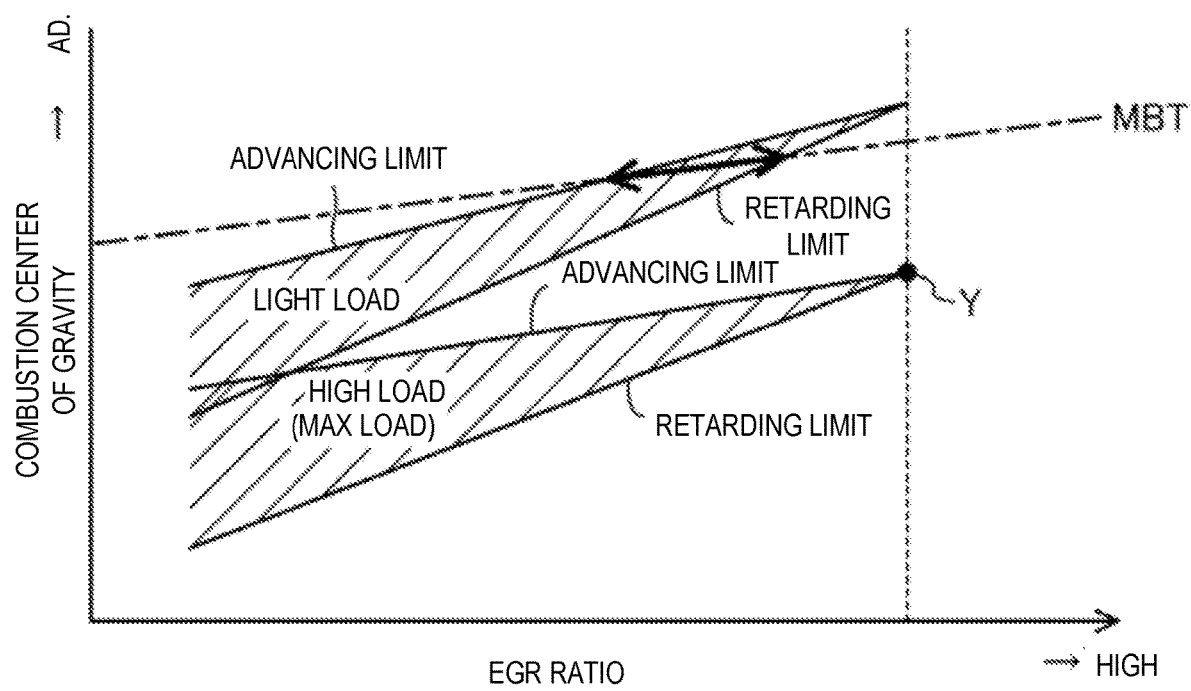

FIG. 15 is a graph illustrating an occurring range of the SPCCI combustion versus an EGR rate in Layer 2.

Figure 16:
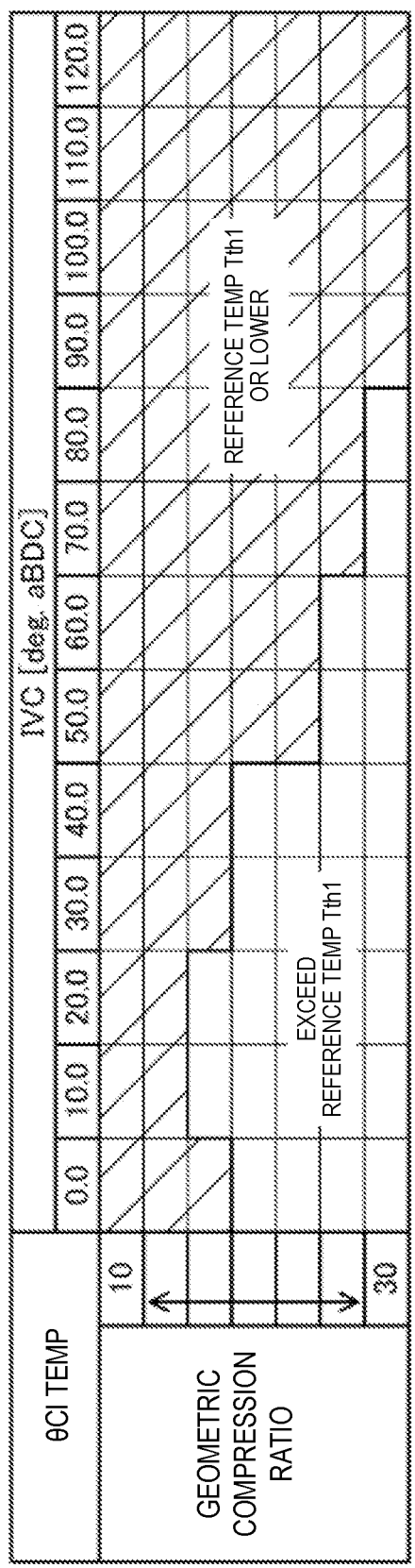

FIG. 16 is one example of a matrix image utilized in order to determine a relationship between a geometric compression ratio and a valve close timing of the intake valve where the SPCCI combustion is possible in Layer 2.

Figure 17:
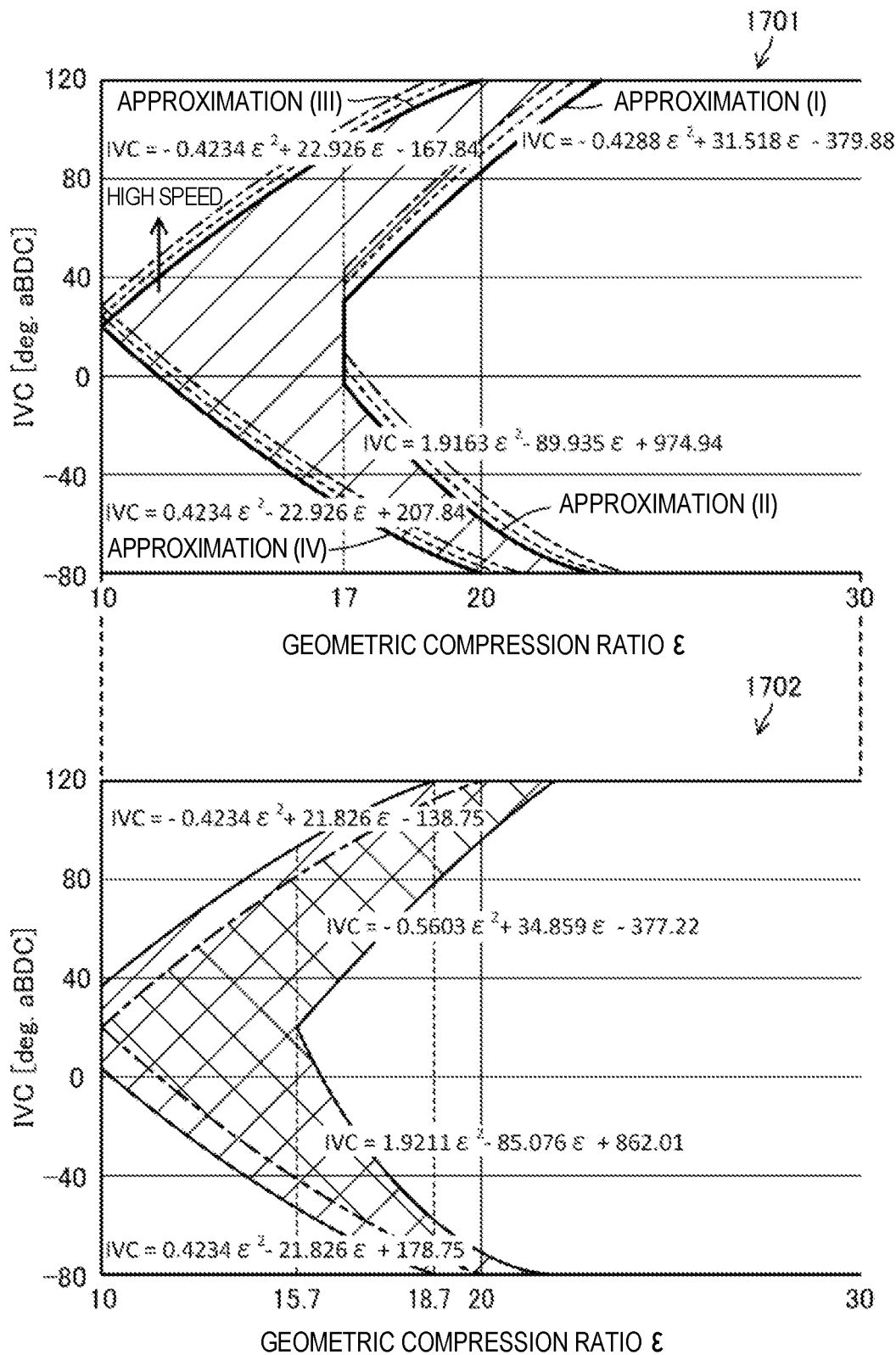

An upper graph of FIG. 17 illustrates a relationship between the geometric compression ratio and the valve close timing of the intake valve where the SPCCI combustion is possible in Layer 2 when a high octane fuel is used, and a lower graph thereof illustrates a relationship between the geometric compression ratio and the valve close timing of the intake valve where the SPCCI combustion is possible in Layer 2 when a low octane fuel is used.

Figure 18:
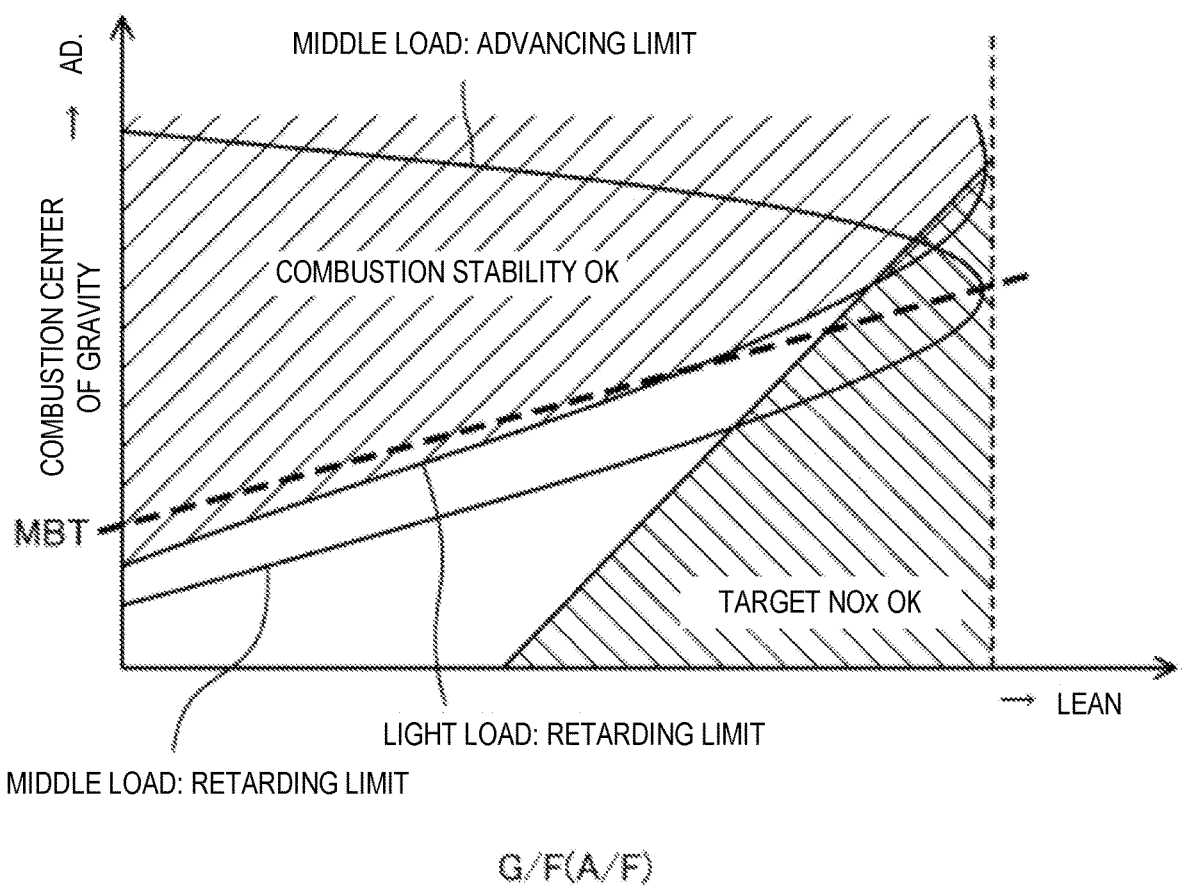

FIG. 18 is a graph illustrating a range where the SPCCI combustion is stabilized versus a gas-fuel ratio (G/F) in Layer 3.

Figure 19:
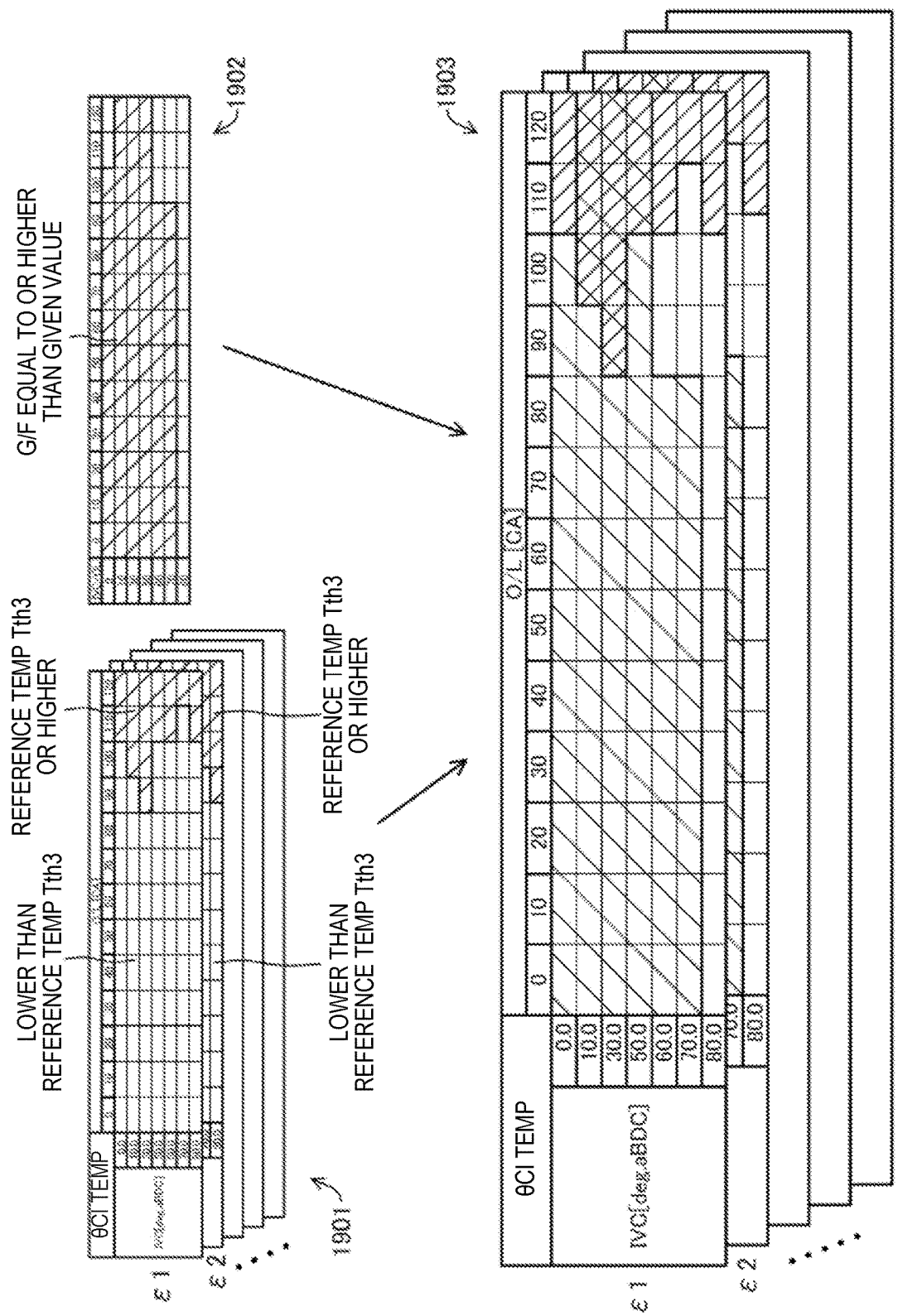

FIG. 19 is one example of a matrix image utilized in order to determine the relationship between the geometric compression ratio and the valve close timing of the intake valve where the SPCCI combustion is possible in Layer 3.

Figure 20:
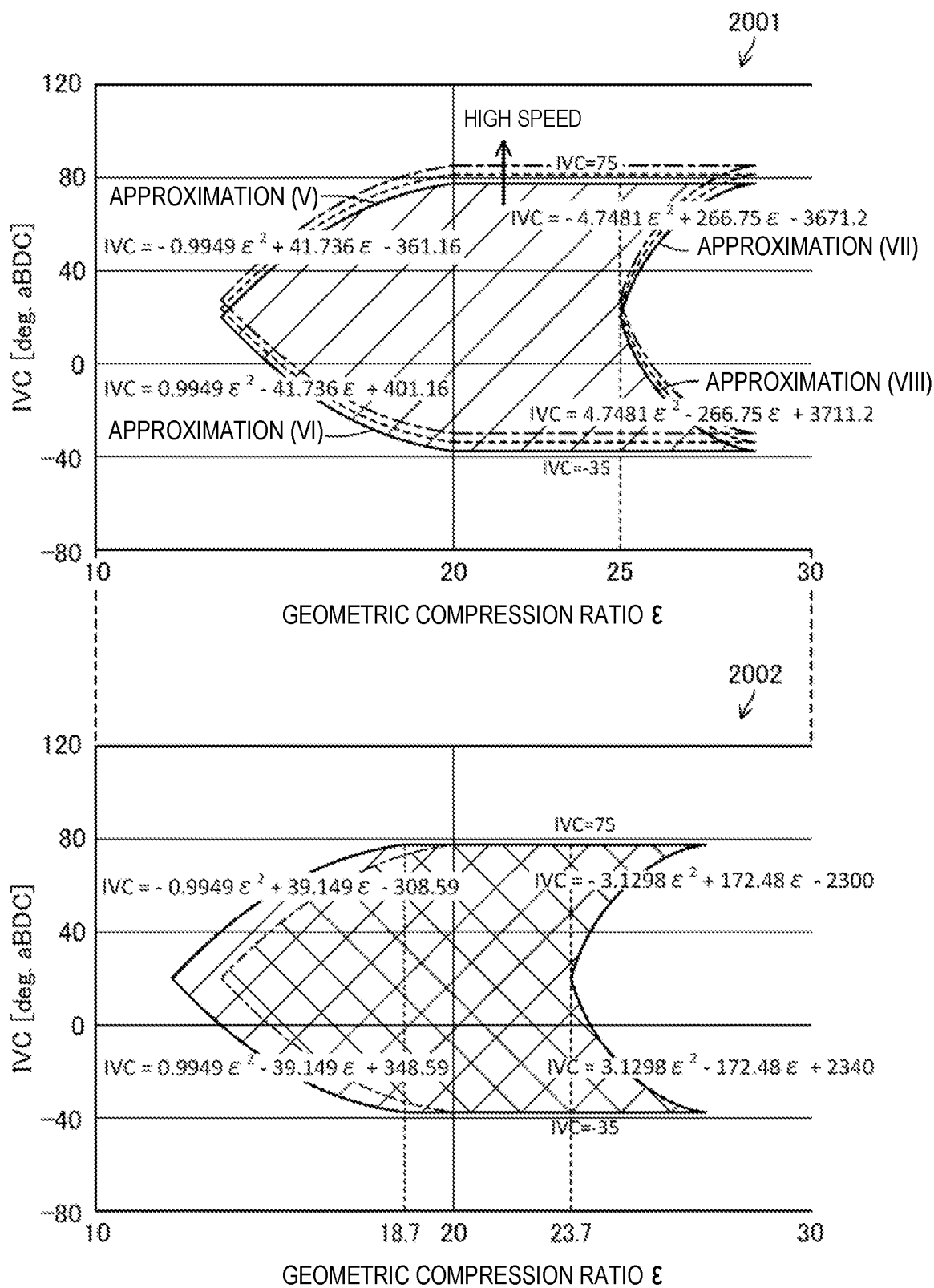

An upper graph of FIG. 20 illustrates a relationship between the geometric compression ratio and the valve close timing of the intake valve where the SPCCI combustion is possible in Layer 3 when the high octane fuel is used, and a lower graph thereof illustrates a relationship between the geometric compression ratio and the valve close timing of the intake valve where the SPCCI combustion is possible in Layer 3 when the low octane fuel is used.

Figure 21:
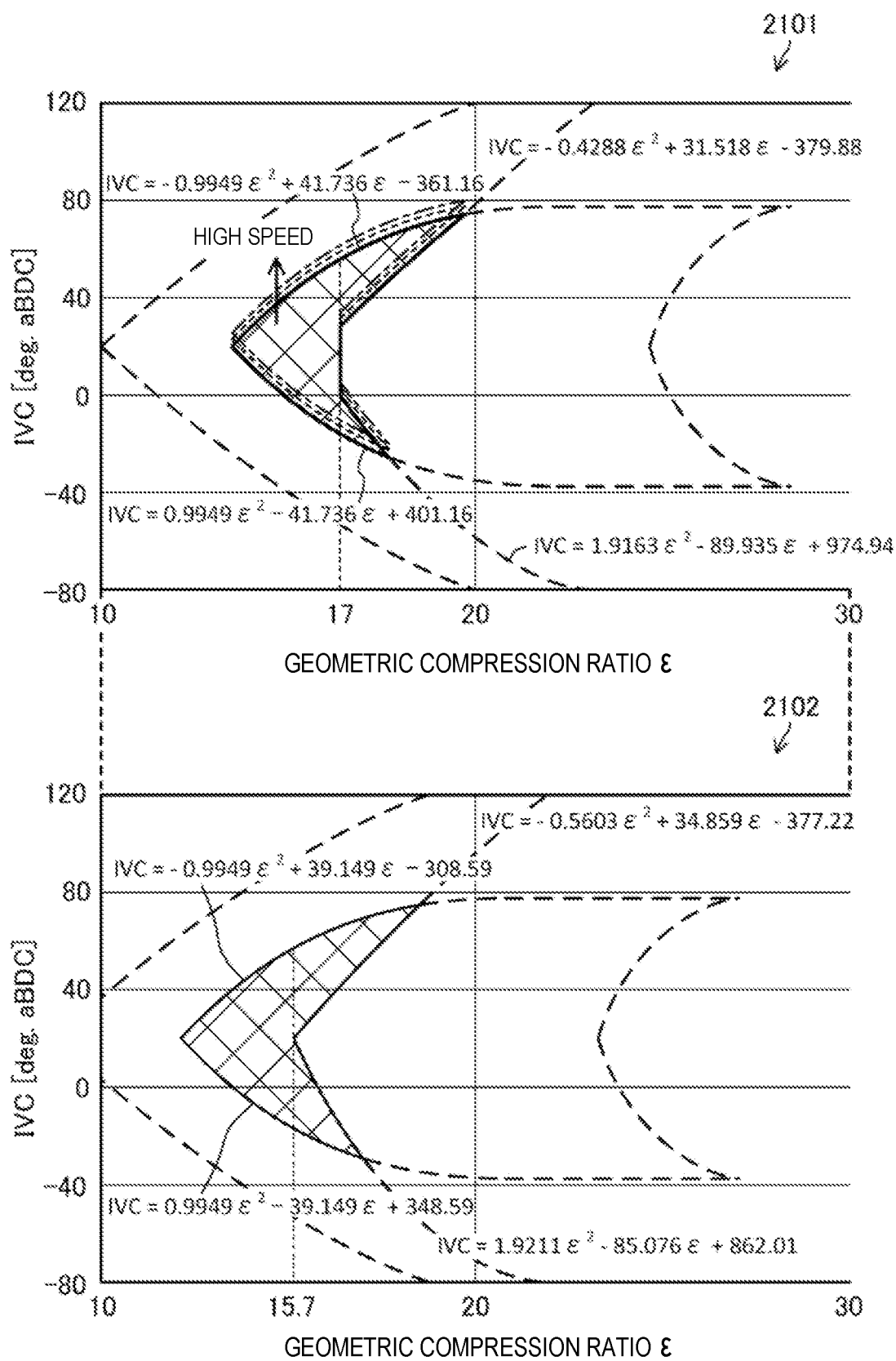

An upper graph of FIG. 21 illustrates a relationship between the geometric compression ratio and the valve close timing of the intake valve where the SPCCI combustion is possible in Layer 2 and Layer 3 when the high octane fuel is used, and a lower graph thereof illustrates a relationship between the geometric compression ratio and the valve close timing of the intake valve where the SPCCI combustion is possible in Layer 2 and Layer 3 when the low octane fuel is used.

Figure 22:
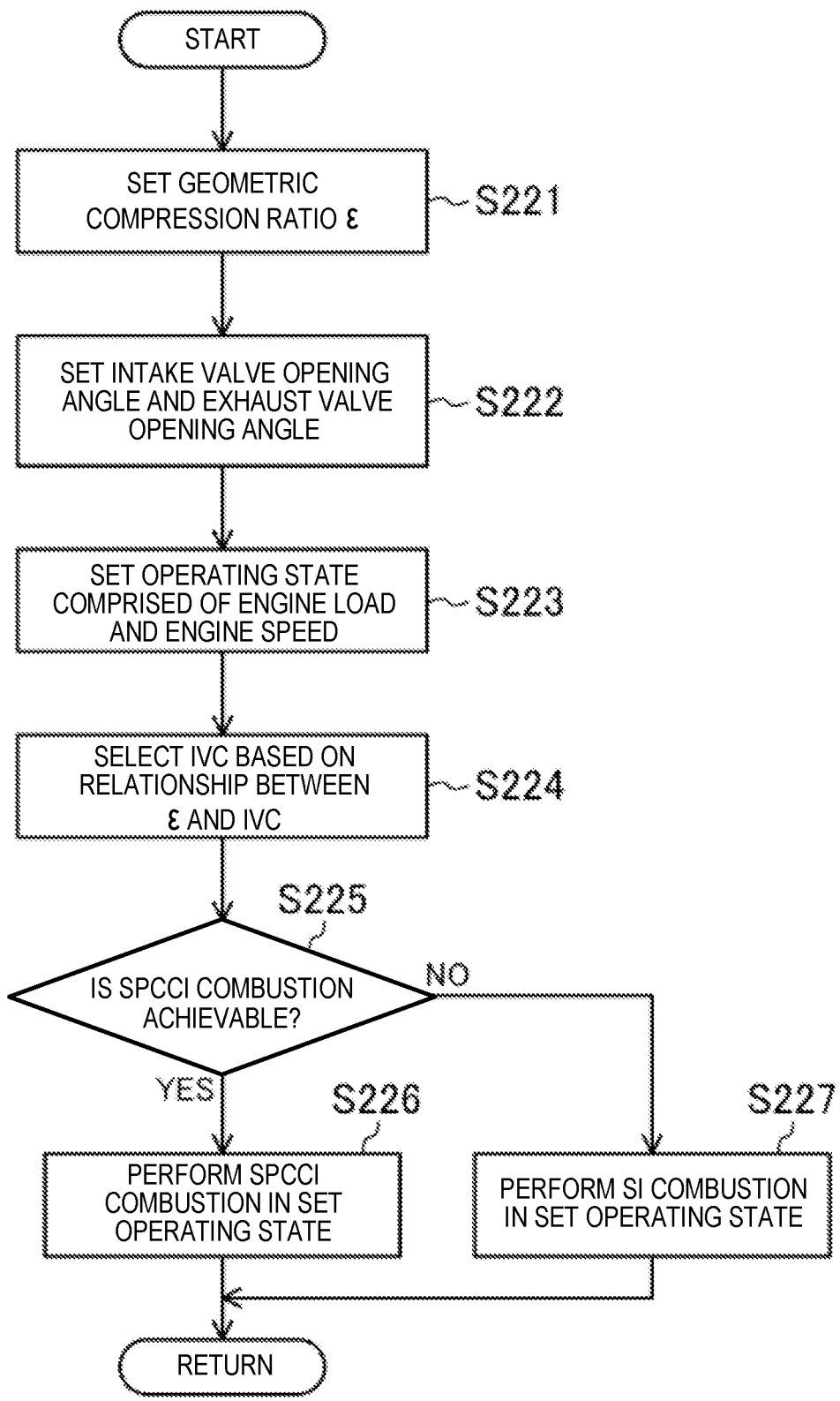

FIG. 22 is a flowchart illustrating a procedure of a method of implementing control logic of a compression-ignition engine.

DETAILED DESCRIPTION OF THE DISCLOSURE

Hereinafter, one embodiment of a method of implementing control logic of a compression-ignition engine will be described in detail with reference to the accompanying drawings. The following description is one example of the engine and the method of implementing the control logic.

Figure 1:
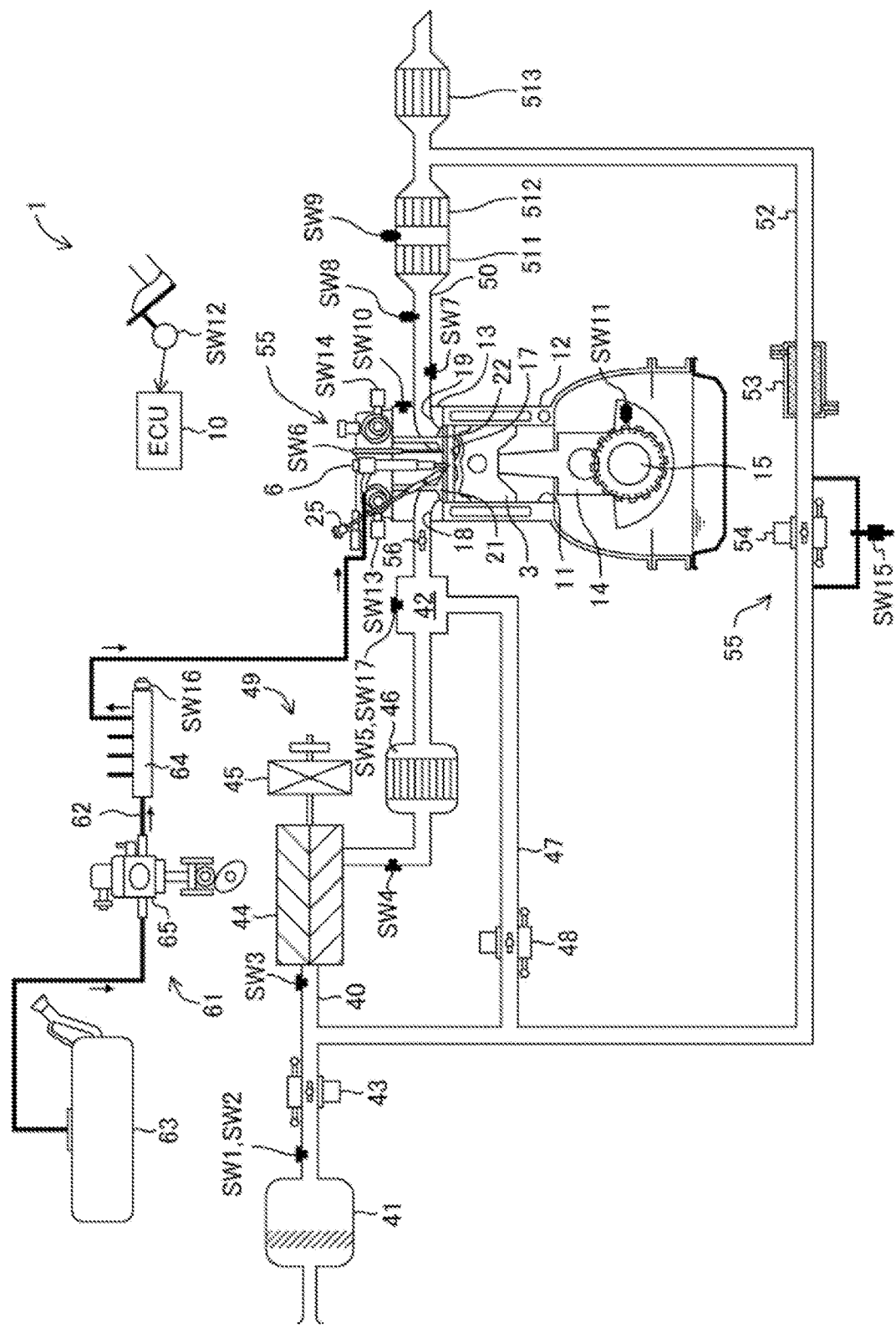
FIG. 1 is a view illustrating a configuration of an engine.
Figure 2:
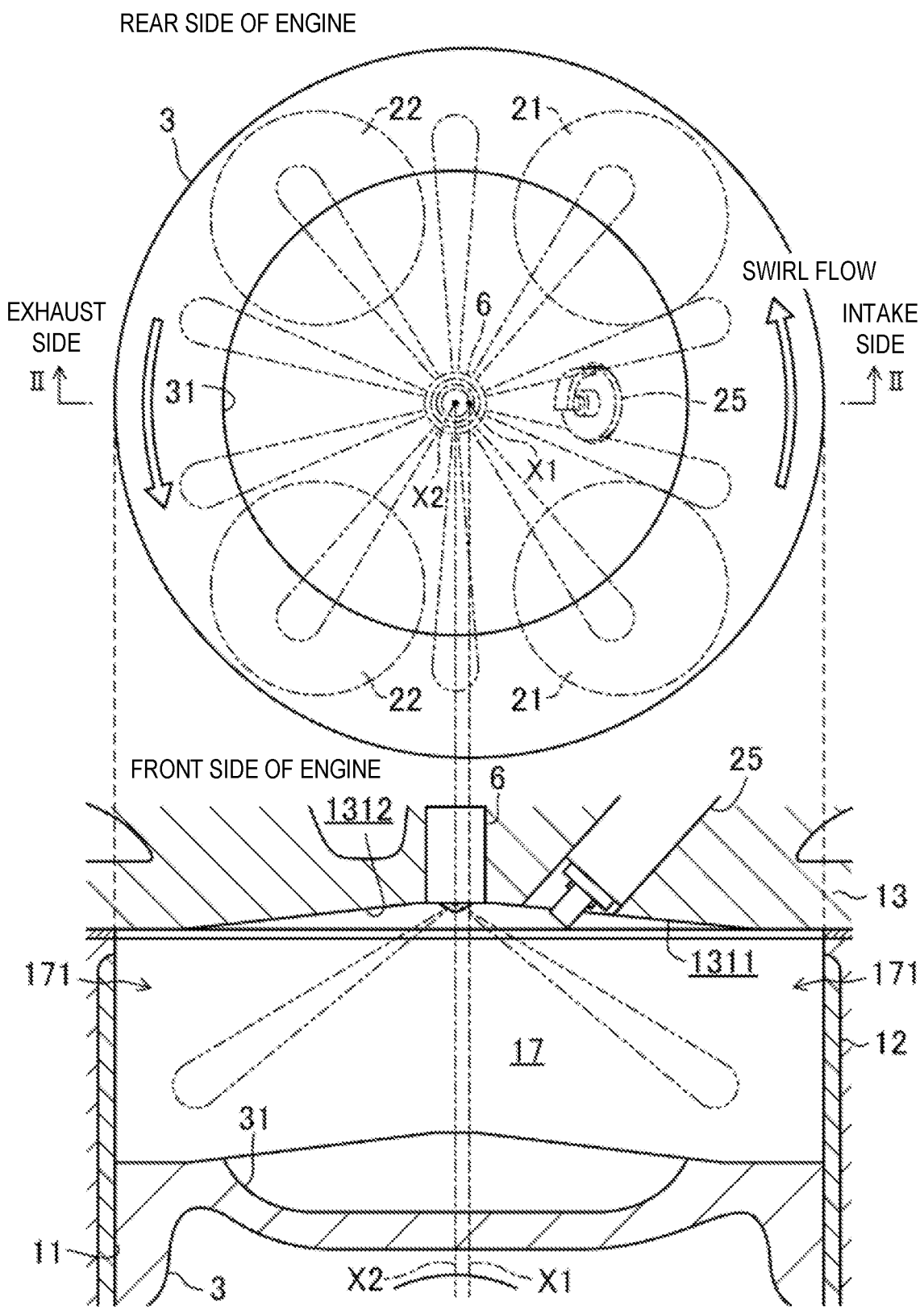
FIG. 2 is a view illustrating a configuration of a combustion chamber, where an upper portion corresponds to a plan view of the combustion chamber, and a lower portion is a cross-sectional view taken along a line II-II.
Figure 3:
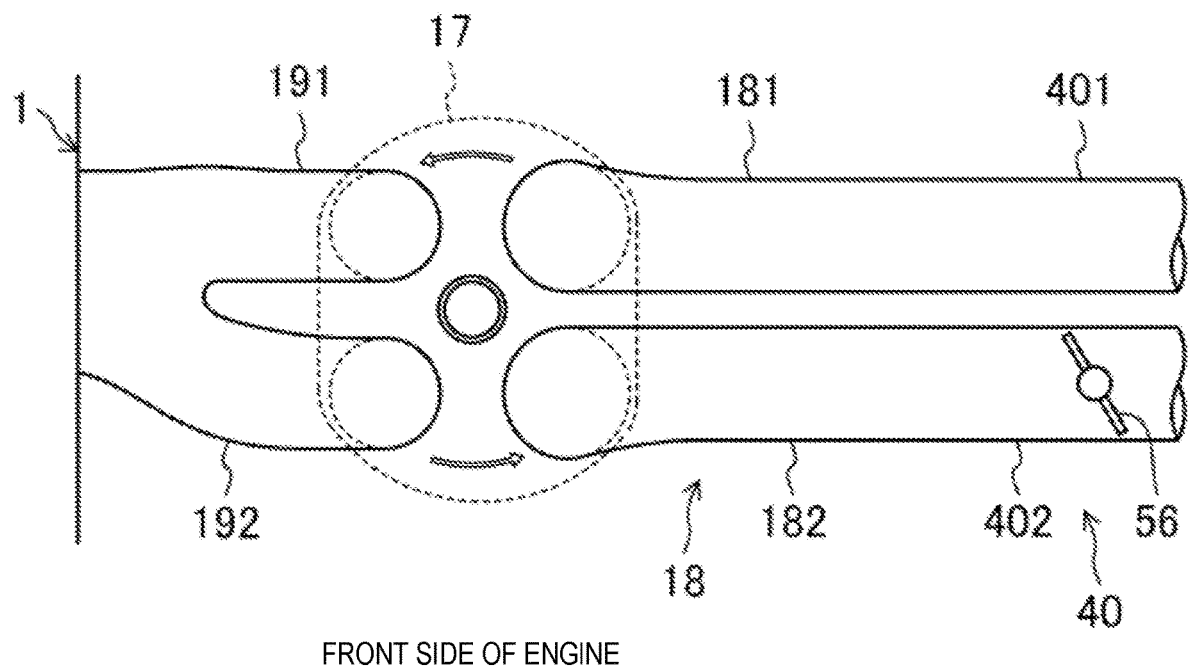
FIG. 3 is a plan view illustrating a configuration of the combustion chamber and an intake system.
Figure 4:
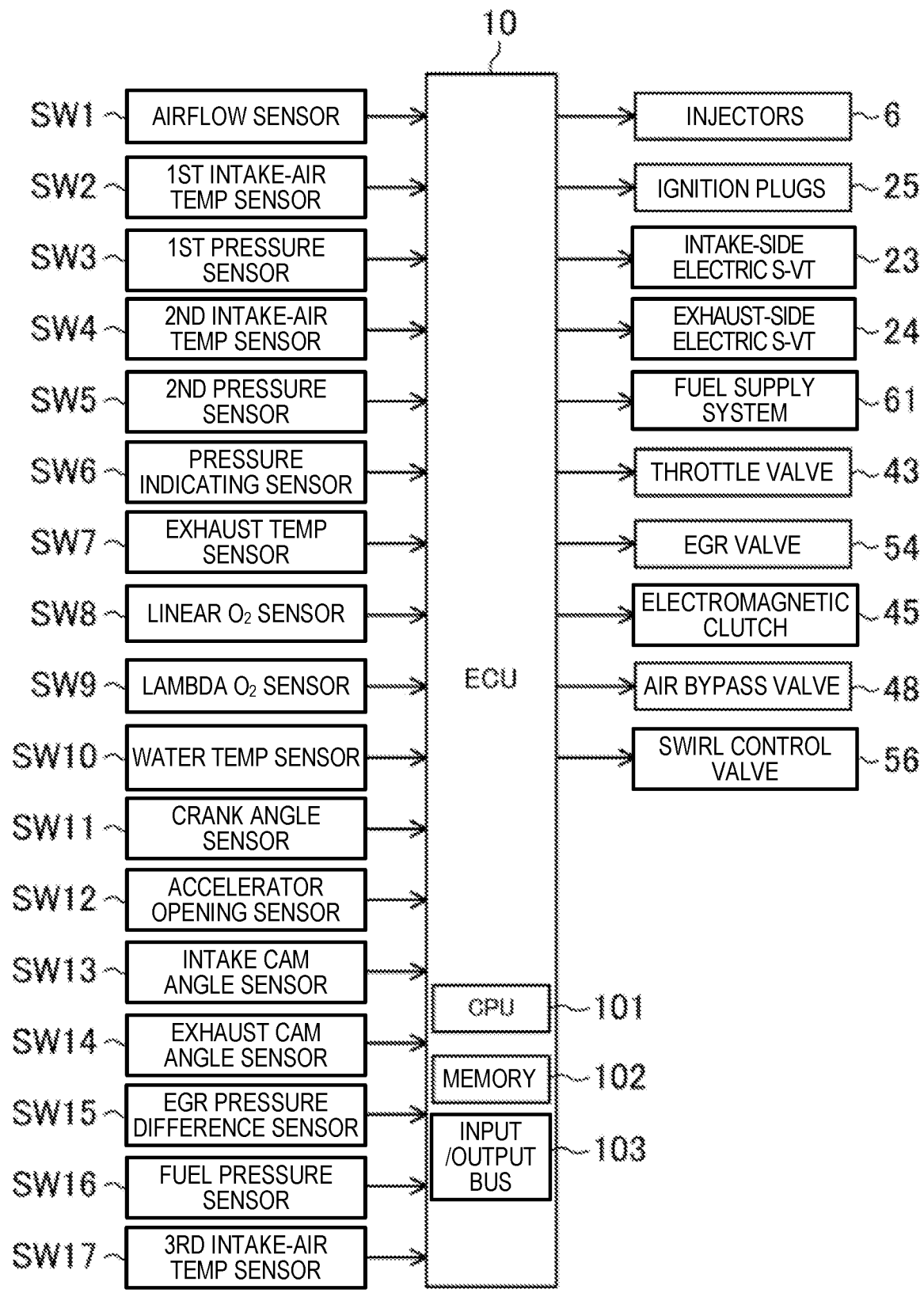
FIG. 4 is a block diagram illustrating a configuration of an engine control device.

FIG. 1 is a view illustrating a configuration of the compression-ignition engine. FIG. 2 is a view illustrating a configuration of a combustion chamber of the engine. FIG. 3 is a view illustrating a configuration of the combustion chamber and an intake system. Note that in FIG. 1, an intake side is the left side in the drawing, and an exhaust side is the right side in the drawing. In FIGS. 2 and 3, the intake side is the right side in the drawings, and the exhaust side is the left side in the drawings. FIG. 4 is a block diagram illustrating a configuration of a control device of the engine.

An engine 1 is a four-stroke engine which operates by a combustion chamber 17 repeating an intake stroke, a compression stroke, an expansion stroke, and an exhaust stroke. The engine 1 is mounted on an automobile with four wheels. The automobile travels by operating the engine 1. Fuel of the engine 1 is gasoline in this example. The fuel may be a liquid fuel containing at least gasoline. The fuel may be gasoline containing, for example, bioethanol.

(Engine Configuration)

The engine 1 includes a cylinder block 12 and a cylinder head 13 placed thereon. A plurality of cylinders 11 are formed inside the cylinder block 12. In FIGS. 1 and 2, only one cylinder 11 is illustrated. The engine 1 is a multi-cylinder engine.

A piston 3 is slidably inserted in each cylinder 11. The pistons 3 are connected with a crankshaft 15 through respective connecting rods 14. Each piston 3 defines the combustion chamber 17, together with the cylinder 11 and the cylinder head 13. Note that the term "combustion chamber" may be used in a broad sense. That is, the term "combustion chamber" may refer to a space formed by the piston 3, the cylinder 11, and the cylinder head 13, regardless of the position of the piston 3.

As illustrated in the lower portion of FIG. 2, a lower surface of the cylinder head 13, i.e., a ceiling surface of the combustion chamber 17, is comprised of a slope 1311 and a slope 1312. The slope 1311 is a rising gradient from the intake side toward an injection axial center X2 of an injector 6 which will be described later. The slope 1312 is a rising gradient from the exhaust side toward the injection axial center X2. The ceiling surface of the combustion chamber 17 is a so-called "pent-roof" shape.

An upper surface of the piston 3 is bulged toward the ceiling surface of the combustion chamber 17. A cavity 31 is formed in the upper surface of the piston 3. The cavity 31 is a dent in the upper surface of the piston 3. The cavity 31 has a shallow pan shape in this example. The center of the cavity 31 is offset at the exhaust side with respect to a center axis X1 of the cylinder 11.

A geometric compression ratio $\varepsilon$ of the engine 1 is set so as to be 10 or higher and 30 or lower. The engine 1 which will be described later performs SPCCI (SPark Controlled Compression Ignition) combustion that is a combination of SI (spark ignition) combustion and CI (compression ignition) combustion in a part of operating ranges. SPCCI combustion controls the CI combustion using a heat generation and a pressure buildup by the SI combustion. The engine 1 is the compression-ignition engine. However, in this engine 1, temperature of the combustion chamber 17, when the piston 3 is at a compression top dead center (i.e., compression end temperature), does not need to be increased. In the engine 1, the geometric compression ratio can be set comparatively low. The low geometric compression ratio becomes advantageous in reduction of cooling loss and mechanical loss. For engines using regular gasoline (low octane fuel of which octane number is about 91), the geometric compression ratio of the engine 1 is 14-17, and for those using high octane gasoline (high octane fuel of which octane number is about 96), the geometric compression ratio is 15-18.

An intake port 18 is formed in the cylinder head 13 for each cylinder 11. As illustrated in FIG. 3, each intake port 18 has a first intake port 181 and a second intake port 182. The intake port 18 communicates with the corresponding combustion chamber 17. Although the detailed illustration of the intake port 18 is omitted, it is a so-called "tumble port." That is, the intake port 18 has such a shape that a tumble flow is formed in the combustion chamber 17.

Each intake valve 21 is disposed in the intake ports 181 and 182. The intake valve 21 opens and closes a channel between the combustion chamber 17 and the intake port 181 or 182. The intake valves 21 are opened and closed at given timings by a valve operating mechanism. The valve operating mechanism may be a variable valve operating mechanism which varies the valve timing and/or valve lift. In this example, as illustrated in FIG. 4, the variable valve operating mechanism has an intake-side electric S-VT (Sequential-Valve Timing) 23. The intake-side electric S-VT 23 continuously varies a rotation phase of an intake cam shaft within a given angle range. The valve open timing and the valve close timing of the intake valve 21 vary continuously. Note that the electric S-VT may be replaced with a hydraulic S-VT, as the intake valve operating mechanism.

An exhaust port 19 is also formed in the cylinder head 13 for each cylinder 11. As illustrated in FIG. 3, each exhaust port 19 also has a first exhaust port 191 and a second exhaust port 192. The exhaust port 19 communicates with the corresponding combustion chamber 17.

Each exhaust valve 22 is disposed in the exhaust ports 191 and 192. The exhaust valve 22 opens and closes a channel between the combustion chamber 17 and the exhaust port 191 or 192. The exhaust valves 22 are opened and closed at a given timing by a valve operating mechanism. The valve operating mechanism may be a variable valve operating mechanism which varies the valve timing and/or valve lift. In this example, as illustrated in FIG. 4, the variable valve operating mechanism has an exhaust-side electric S-VT 24. The exhaust-side electric S-VT 24 continuously varies a rotation phase of an exhaust cam shaft within a given angle range. The valve open timing and the valve close timing of the exhaust valve 22 change continuously. Note that the electric S-VT may be replaced with a hydraulic S-VT, as the exhaust valve operating mechanism.

The intake-side electric S-VT 23 and the exhaust-side electric S-VT 24 adjust length of an overlap period where both the intake valve 21 and the exhaust valve 22 open. If the length of the overlap period is made longer, the residual gas in the combustion chamber 17 can be purged. Moreover, by adjusting the length of the overlap period, internal EGR (Exhaust Gas Recirculation) gas can be introduced into the combustion chamber 17. An internal EGR system is comprised of the intake-side electric S-VT 23 and the exhaust-side electric S-VT 24. Note that the internal EGR system may not be comprised of the S-VT.

The injector 6 is attached to the cylinder head 13 for each cylinder 11. Each injector 6 directly injects fuel into the combustion chamber 17. The injector 6 is one example of a fuel injection part. The injector 6 is disposed in a valley part of the pent roof where the slope 1311 and the slope 1312 meet. As illustrated in FIG. 2, the injection axial center X2 of the injector 6 is located at the exhaust side of the center axis X1 of the cylinder 11. The injection axial center X2 of the injector 6 is parallel to the center axis X1. The injection axial center X2 of the injector 6 and the center of the cavity 31 are in agreement with each other. The injector 6 faces the cavity 31. Note that the injection axial center X2 of the injector 6 may be in agreement with the center axis X1 of the cylinder 11. In such a configuration, the injection axial center X2 of the injector 6 and the center of the cavity 31 may be in agreement with each other.

Although the detailed illustration is omitted, the injector 6 is comprised of a multi nozzle-port type fuel injection valve having a plurality of nozzle ports. As illustrated by two-dot chain lines in FIG. 2, the injector 6 injects the fuel so that the fuel spreads radially from the center of the combustion chamber 17. The injector 6 has ten nozzle ports in this example, and the nozzle port is disposed so as to be equally spaced in the circumferential direction.

The injectors 6 are connected to a fuel supply system 61. The fuel supply system 61 includes a fuel tank 63 configured to store fuel, and a fuel supply passage 62 which connects the fuel tank 63 to the injector 6. In the fuel supply passage 62, a fuel pump 65 and a common rail 64 are provided. The fuel pump 65 pumps fuel to the common rail 64. The fuel pump 65 is a plunger pump driven by the crankshaft 15 in this example. The common rail 64 stores fuel pumped from the fuel pump 65 at a high fuel pressure. When the injector 6 is opened, the fuel stored in the common rail 64 is injected into the combustion chamber 17 from the nozzle ports of the injector 6. The fuel supply system 61 can supply fuel to the injectors 6 at a high pressure of 30 MPa or higher. The pressure of the fuel supplied to the injector 6 may be changed according to the operating state of the engine 1. Note that the configuration of the fuel supply system 61 is not limited to the configuration described above.

An ignition plug 25 is attached to the cylinder head 13 for each cylinder 11. The ignition plug 25 forcibly ignites a mixture gas inside the combustion chamber 17. The ignition plug 25 is disposed at the intake side of the center axis X1 of the cylinder 11 in this example. The ignition plug 25 is located between the two intake ports 181 and 182 of each cylinder. The ignition plug 25 is attached to the cylinder head 13 so as to incline downwardly toward the center of the combustion chamber 17. As illustrated in FIG. 2, the electrode of the ignition plug 25 faces toward the inside of the combustion chamber 17 and is located near the ceiling surface of the combustion chamber 17. Note that the ignition plug 25 may be disposed at the exhaust side of the center axis X1 of the cylinder 11. Moreover the ignition plug 25 may be disposed on the center axis X1 of the cylinder 11.

An intake passage 40 is connected to one side surface of the engine 1. The intake passage 40 communicates with the intake port 18 of each cylinder 11. Gas introduced into the combustion chamber 17 flows through the intake passage 40. An air cleaner 41 is disposed in an upstream end part of the intake passage 40. The air cleaner 41 filters fresh air. A surge tank 42 is disposed near the downstream end of the intake passage 40. Part of the intake passage 40 downstream of the surge tank 42 constitutes independent passages branched from the intake passage 40 for each cylinder 11. The downstream end of each independent passage is connected to the intake port 18 of each cylinder 11.

A throttle valve 43 is disposed between the air cleaner 41 and the surge tank 42 in the intake passage 40. The throttle valve 43 adjusts an introducing amount of the fresh air into the combustion chamber 17 by adjusting an opening of the throttle valve.

A supercharger 44 is also disposed in the intake passage 40, downstream of the throttle valve 43. The supercharger 44 boosts gas to be introduced into the combustion chamber 17. In this example, the supercharger 44 is a mechanical supercharger driven by the engine 1. The mechanical supercharger 44 may be a root, Lysholm, vane, or a centrifugal type.

An electromagnetic clutch 45 is provided between the supercharger 44 and the engine 1. The electromagnetic clutch 45 transmits a driving force from the engine 1 to the supercharger 44 or disengages the transmission of the driving force between the supercharger 44 and the engine 1. As will be described later, an ECU 10 switches the disengagement and engagement of the electromagnetic clutch 45 to switch the supercharger 44 between ON and OFF.

An intercooler 46 is disposed downstream of the supercharger 44 in the intake passage 40. The intercooler 46 cools gas compressed by the supercharger 44. The intercooler 46 may be of a water cooling type or an oil cooling type, for example.

A bypass passage 47 is connected to the intake passage 40. The bypass passage 47 connects an upstream part of the supercharger 44 to a downstream part of the intercooler 46 in the intake passage 40 so as to bypass the supercharger 44 and the intercooler 46. An air bypass valve 48 is disposed in the bypass passage 47. The air bypass valve 48 adjusts a flow rate of gas flowing in the bypass passage 47.

The ECU 10 fully opens the air bypass valve 48 when the supercharger 44 is turned OFF (i.e., when the electromagnetic clutch 45 is disengaged). The gas flowing through the intake passage 40 bypasses the supercharger 44 and is introduced into the combustion chamber 17 of the engine 1. The engine 1 operates in a non-supercharged state, i.e., a natural aspiration state.

When the supercharger 44 is turned ON, the engine 1 operates in a supercharged state. The ECU 10 adjusts an opening of the air bypass valve 48 when the supercharger 44 is turned ON (i.e., when the electromagnetic clutch 45 is engaged). A portion of the gas which passed through the supercharger 44 flows back toward upstream of the supercharger 44 through the bypass passage 47. When the ECU 10 adjusts the opening of the air bypass valve 48, a supercharging pressure of gas introduced into the combustion chamber 17 changes. Note that the term "supercharging" as used herein refers to a situation where the pressure inside the surge tank 42 exceeds an atmospheric pressure, and "non-supercharging" refers to a situation where the pressure inside the surge tank 42 becomes below the atmospheric pressure.

In this example, a supercharging system 49 is comprised of the supercharger 44, the bypass passage 47, and the air bypass valve 48.

The engine 1 has a swirl generating part which generates a swirl flow inside the combustion chamber 17. As illustrated in FIG. 3, the swirl generating part has a swirl control valve 56 attached to the intake passage 40. Among a primary passage 401 coupled to the first intake port 181 and a secondary passage 402 coupled to the second intake port 182, the swirl control valve 56 is disposed in the secondary passage 402. The swirl control valve 56 is an opening control valve which is capable of choking a cross section of the secondary passage 402. When the opening of the swirl control valve 56 is small, since an intake flow rate of air flowing into the combustion chamber 17 from the first intake port 181 is relatively large, and an intake flow rate of air flowing into the combustion chamber 17 from the second intake port 182 is relatively small, the swirl flow inside the combustion chamber 17 becomes stronger. On the other hand, when the opening of the swirl control valve 56 is large, since the intake flow rates of air flowing into the combustion chamber 17 from the first intake port 181 and the second intake port 182 become substantially equal, the swirl flow inside the combustion chamber 17 becomes weaker. When the swirl control valve 56 is fully opened, the swirl flow will not occur. Note that the swirl flow circulates counterclockwise in FIG. 3, as illustrated by white arrows (also see white arrows in FIG. 2).

An exhaust passage 50 is connected to the other side surface of the engine 1. The exhaust passage 50 communicates with the exhaust port 19 of each cylinder 11. The exhaust passage 50 is a passage through which exhaust gas discharged from the combustion chambers 17 flows. Although the detailed illustration is omitted, an upstream part of the exhaust passage 50 constitutes independent passages branched from the exhaust passage 50 for each cylinder 11. The upper end of the independent passage is connected to the exhaust port 19 of each cylinder 11.

An exhaust gas purification system having a plurality of catalytic converters is disposed in the exhaust passage 50. Although illustration is omitted, an upstream catalytic converter is disposed inside an engine bay. The upstream catalytic converter has a three-way catalyst 511 and a GPF (Gasoline Particulate Filter) 512. The downstream catalytic converter is disposed outside the engine bay. The downstream catalytic converter has a three-way catalyst 513. Note that the exhaust gas purification system is not limited to the illustrated configuration. For example, the GPF may be omitted. Moreover, the catalytic converter is not limited to those having the three-way catalyst. Further, the order of the three-way catalyst and the GPF may suitably be changed.

Between the intake passage 40 and the exhaust passage 50, an EGR passage 52 which constitutes an external EGR system is connected. The EGR passage 52 is a passage for recirculating part of the exhaust gas to the intake passage 40. The upstream end of the EGR passage 52 is connected between the upstream catalytic converter and the downstream catalytic converter in the exhaust passage 50. The downstream end of the EGR passage 52 is connected to an upstream part of the supercharger 44 in the intake passage 40. EGR gas flowing through the EGR passage 52 flows into the upstream part of the supercharger 44 in the intake passage 40, without passing through the air bypass valve 48 of the bypass passage 47.

An EGR cooler 53 of water cooling type is disposed in the EGR passage 52. The EGR cooler 53 cools the exhaust gas. An EGR valve 54 is also disposed in the EGR passage 52. The EGR valve 54 adjusts a flow rate of the exhaust gas flowing through the EGR passage 52. By adjusting the opening of the EGR valve 54, an amount of the cooled exhaust gas, i.e., a recirculating amount of external EGR gas can be adjusted.

In this example, an EGR system 55 is comprised of the external EGR system and the internal EGR system. The external EGR system can supply exhaust gas to the combustion chamber 17 that is a lower temperature than the internal EGR system.

The control device of the compression-ignition engine includes the ECU (Engine Control Unit) 10 for operating the engine 1. The ECU 10 is a controller based on a well-known microcomputer, and as illustrated in FIG. 4, includes a central processing unit (CPU) 101 which is a processor that executes a computer program, memory 102 which, for example, is comprised of a RAM (Random Access Memory) and/or a ROM (Read Only Memory), and stores instructions including the program and data, and an input/output bus 103 which inputs and outputs an electrical signal. The ECU 10 is one example of a controller.

As illustrated in FIGS. 1 and 4, various kinds of sensors SW1-SW17 are connected to the ECU 10. The sensors SW1-SW17 output signals to the ECU 10. The sensors include the following sensors:

Airflow sensor SW1: Disposed downstream of the air cleaner 41 in the intake passage 40, and measures a flow rate of fresh air flowing through the intake passage 40;

First intake-air temperature sensor SW2: Disposed downstream of the air cleaner 41 in the intake passage 40, and measures the temperature of fresh air flowing through the intake passage 40;

First pressure sensor SW3: Disposed downstream of the connected position of the EGR passage 52 in the intake passage 40 and upstream of the supercharger 44, and measures the pressure of gas flowing into the supercharger 44;

Second intake-air temperature sensor SW4: Disposed downstream of the supercharger 44 in the intake passage 40 and upstream of the connected position of the bypass passage 47, and measures the temperature of gas flowed out of the supercharger 44;

Second pressure sensor SW5: Attached to the surge tank 42, and measures the pressure of gas downstream of the supercharger 44;

Pressure indicating sensor SW6: Attached to the cylinder head 13 corresponding to each cylinder 11, and measures the pressure inside each combustion chamber 17;

Exhaust temperature sensor SW7: Disposed in the exhaust passage 50, and measures the temperature of the exhaust gas discharged from the combustion chamber 17;

Linear $O_2$ sensor SW8: Disposed upstream of the upstream catalytic converter in the exhaust passage 50, and measures the oxygen concentration of the exhaust gas;

Lambda $O_2$ sensor SW9: Disposed downstream of the three-way catalyst 511 in the upstream catalytic converter, and measures the oxygen concentration of the exhaust gas;

Water temperature sensor SW10: Attached to the engine 1 and measures the temperature of coolant;

Crank angle sensor SW11: Attached to the engine 1 and measures the rotation angle of the crankshaft 15;

Accelerator opening sensor SW12: Attached to an accelerator pedal mechanism and measures the accelerator opening corresponding to an operating amount of the accelerator pedal;

Intake cam angle sensor SW13: Attached to the engine 1 and measures the rotation angle of an intake cam shaft;

Exhaust cam angle sensor SW14: Attached to the engine 1 and measures the rotation angle of an exhaust cam shaft;

EGR pressure difference sensor SW15: Disposed in the EGR passage 52 and measures a pressure difference between the upstream and the downstream of the EGR valve 54;

Fuel pressure sensor SW16: Attached to the common rail 64 of the fuel supply system 61, and measures the pressure of fuel supplied to the injector 6; and Third intake-air temperature sensor SW17: Attached to the surge tank 42, and measures the temperature of gas inside the surge tank 42, i.e., the temperature of intake air introduced into the combustion chamber 17.

The ECU 10 determines the operating state of the engine 1 based on the signals of at least one of the sensors SW1-SW17, and calculates a control amount of each device according to the control logic defined beforehand. The control logic is stored in the memory 102. The control logic includes calculating a target amount and/or the control amount by using a map stored in the memory 102.

The ECU 10 outputs electrical signals according to the calculated control amounts to the injectors 6, the ignition plugs 25, the intake-side electric S-VT 23, the exhaust-side electric S-VT 24, the fuel supply system 61, the throttle valve 43, the EGR valve 54, the electromagnetic clutch 45 of the supercharger 44, the air bypass valve 48, and the swirl control valve 56.

For example, the ECU 10 sets a target torque of the engine 1 based on the signal of the accelerator opening sensor SW12 and the map, and determines a target supercharging pressure. The ECU 10 then performs a feedback control for adjusting the opening of the air bypass valve 48 based on the target supercharging pressure and the pressure difference before and after the supercharger 44 obtained from the signals of the first pressure sensor SW3 and the second pressure sensor SW5 so that the supercharging pressure becomes the target supercharging pressure.

Moreover, the ECU 10 sets a target EGR rate (i.e., a ratio of the EGR gas to the entire gas inside the combustion chamber 17) based on the operating state of the engine 1 and the map. The ECU 10 then determines a target EGR gas amount based on the target EGR rate and an inhaled air amount based on the signal of the accelerator opening sensor SW12, and performs a feedback control for adjusting the opening of the EGR valve 54 based on the pressure difference before and after the EGR valve 54 obtained from the signal of the EGR pressure difference sensor SW15 so that the external EGR gas amount introduced into the combustion chamber 17 becomes the target EGR gas amount.

Further, the ECU 10 performs an air-fuel ratio feedback control when a given control condition is satisfied. For example, the ECU 10 adjusts the fuel injection amount of the injector 6 based on the oxygen concentration of the exhaust gas which is measured by the linear $O_2$ sensor SW8 and the lambda $O_2$ sensor SW9 so that the air-fuel ratio of the mixture gas becomes a desired value.

Note that the details of other controls of the engine 1 executed by the ECU 10 will be described later.

(Concept of SPCCI Combustion)

The engine 1 performs combustion by compressed self-ignition under a given operating state, mainly to improve fuel consumption and emission performance. The combustion by self-ignition varies largely at the timing of the self-ignition, if the temperature inside the combustion chamber 17 before a compression starts is nonuniform. Thus, the engine 1 performs the SPCCI combustion which is a combination of the SI combustion and the CI combustion.

SPCCI combustion is combustion in which the ignition plug 25 forcibly ignites the mixture gas inside the combustion chamber 17 so that the mixture gas carries out the SI combustion by flame propagation, and the temperature inside the combustion chamber 17 increases by the heat generation of the SI combustion and the pressure inside the combustion chamber 17 increases by the flame propagation so that the unburnt mixture gas carries out the CI combustion by self-ignition.

By adjusting the heat amount of the SI combustion, the variation in the temperature inside the combustion chamber 17 before a compression starts can be absorbed. By the ECU 10 adjusting the ignition timing, the mixture gas can be self-ignited at a target timing.

Figure 5:
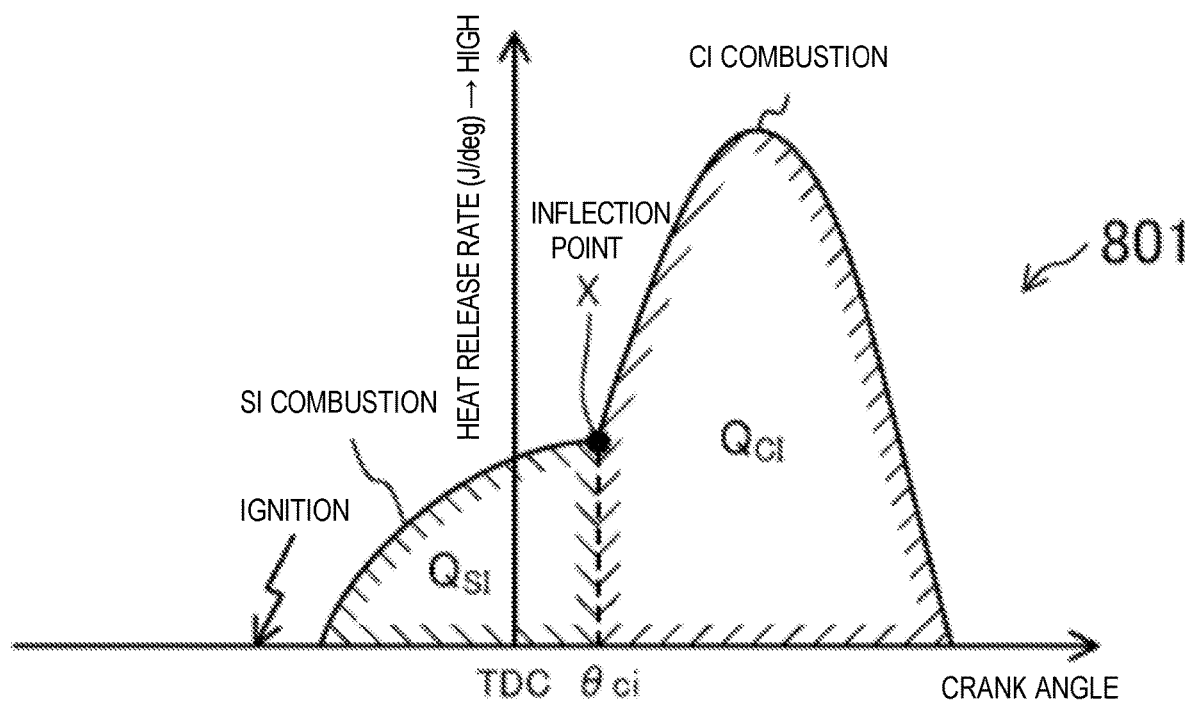
FIG. 5 is a graph illustrating a waveform of SPCCI combustion.

In SPCCI combustion, the heat release of the SI combustion is slower than the heat release in the CI combustion. As illustrated in FIG. 5, the waveform of the heat release rate of the SI combustion in SPCCI combustion is smaller in the rising slope than the waveform in the CI combustion. In addition, SI combustion is slower in the pressure fluctuation (dp/dθ) inside the combustion chamber 17 than CI combustion.

When the unburnt mixture gas self-ignites after SI combustion is started, the waveform slope of the heat release rate may become steeper. The waveform of the heat release rate may have an inflection point X at a timing of starting CI combustion.

After the start in CI combustion, SI combustion and CI combustion are performed in parallel. Since CI combustion has larger heat release than SI combustion, the heat release rate becomes relatively large. However, since CI combustion is performed after a compression top dead center, the waveform slope of the heat release rate does not become too steep. The pressure fluctuation in CI combustion (dp/dθ) also becomes comparatively slow.

The pressure fluctuation (dp/dθ) can be used as an index representing combustion noise. As described above, since SPCCI combustion can reduce the pressure fluctuation (dp/dθ), it is possible to avoid excessive combustion noise. The combustion noise of the engine 1 can be kept below a tolerable level.

SPCCI combustion is completed when CI combustion is finished. CI combustion is shorter in the combustion period than SI combustion. The end timing of SPCCI combustion becomes earlier than SI combustion.

The heat release rate waveform of SPCCI combustion is formed so that a first heat release part $Q_{SI}$ formed by SI combustion and a second heat release part $Q_{CI}$ formed by CI combustion continue in this order.

Here, a SI ratio is defined as a parameter indicative of a characteristic of SPCCI combustion. The SI ratio is defined as an index related to a ratio of the amount of heat generated by SI combustion to the entire amount of heat generated by SPCCI combustion. The SI ratio is a ratio of heat amount generated by the two different combustion modes. If the SI ratio is high, the ratio of SI combustion is high, and if the SI ratio is low, the ratio in CI combustion is high. Alternatively, the SI ratio may be defined as a ratio of the amount of heat generated by SI combustion to the amount of heat generated by CI combustion. That is, in a waveform 801 illustrated in FIG. 5, SI ratio=$Q_{SI}/Q_{CI}$.
Here,
$Q_{SI}$: Area of SI combustion; and
$Q_{CI}$: Area of CI combustion.

The engine 1 generates a strong swirl flow inside the combustion chamber 17 when performing SPCCI combustion. The term "strong swirl flow" may be defined as a flow having a swirl ratio of four or higher, for example. The swirl ratio can be defined as a value obtained by dividing an integrated value of intake flow lateral angular velocities by an engine angular velocity, where the intake flow lateral angular velocity is measured for every valve lift, and the measured values are integrated to obtain the integrated value. Although illustration is omitted, the intake flow lateral angular velocity can be obtained based on measurement using known rig test equipment.

When the strong swirl flow is generated in the combustion chamber 17, the swirl flow is stronger in an outer circumferential part of the combustion chamber 17 and is relatively weaker in a central part. By the whirlpool resulting from a velocity gradient at the boundary between the central part and the outer circumferential part, turbulence energy becomes higher in the central part. When the ignition plug 25 ignites the mixture gas in the central part, the combustion speed of SI combustion becomes higher by the high turbulence energy.

Flame of the SI combustion is carried by the strong swirl flow inside the combustion chamber 17 and propagates in the circumferential direction. CI combustion is performed from the outer circumferential part to the central part in the combustion chamber 17.

When the strong swirl flow is generated in the combustion chamber 17, SI combustion can fully be performed before the start in CI combustion. Thus, the generation of combustion noise can be reduced, and the variation in the torque between cycles can be reduced.

(Engine Operating Range)

Figure 6:
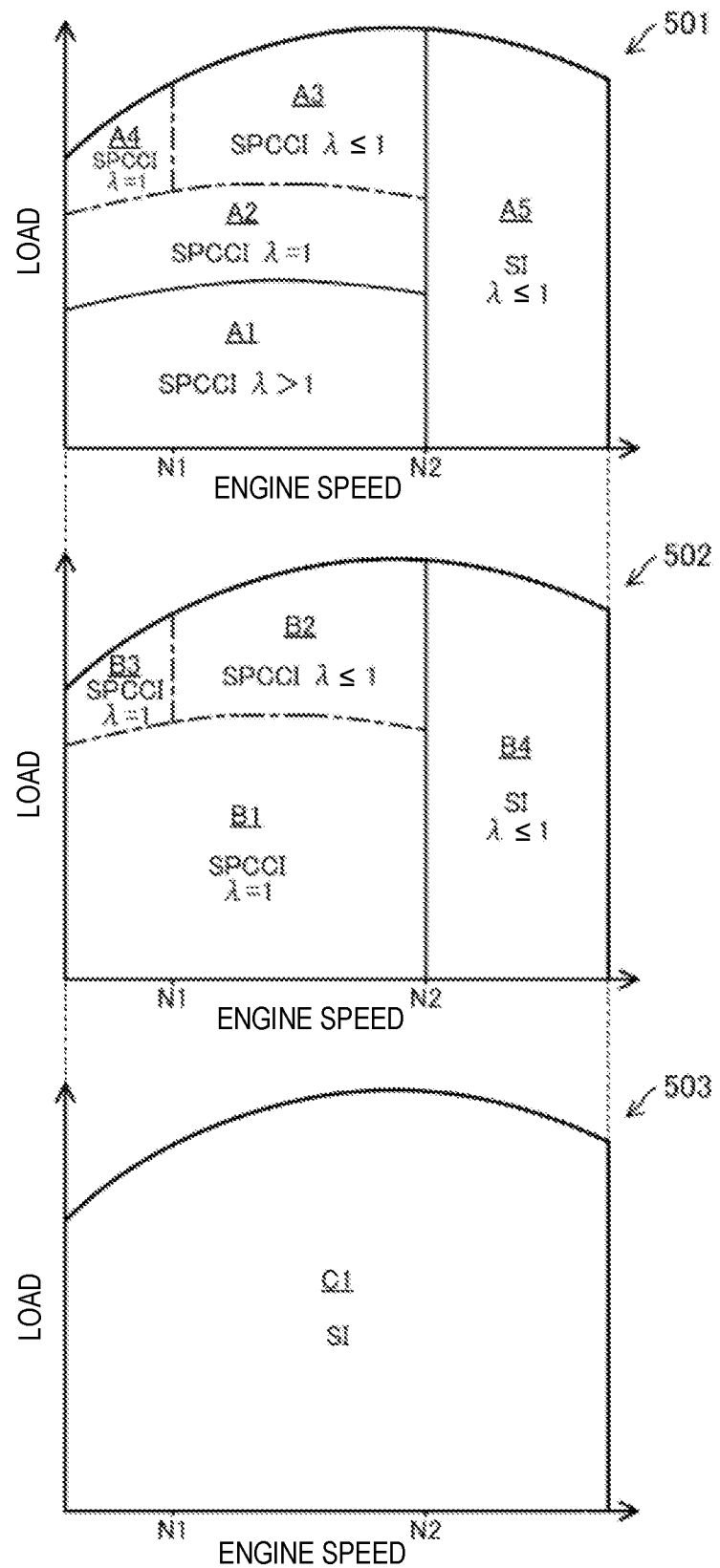
FIG. 6 illustrates maps of the engine, where an upper portion is a map when the engine is warm, a middle portion is a map when the engine is half warm, and a lower portion is a map when the engine is cold.
Figure 7:
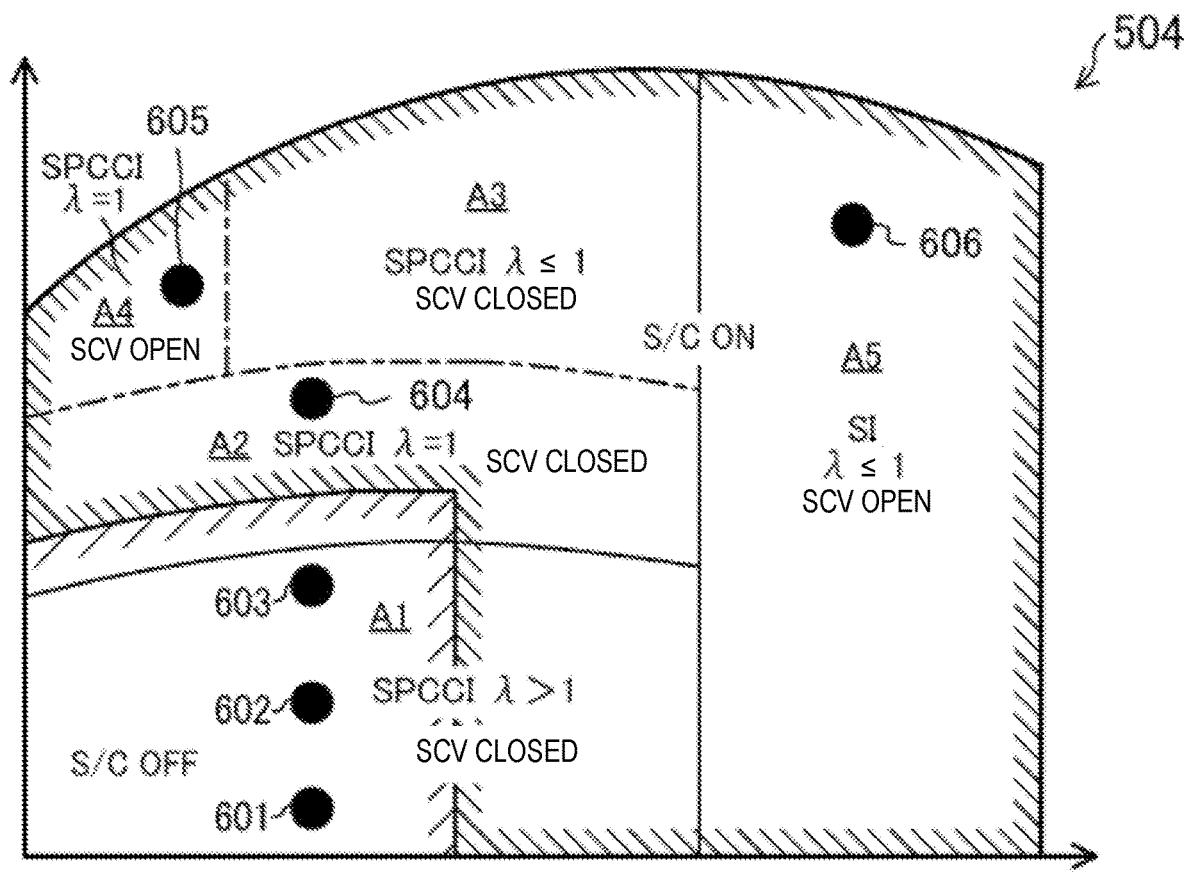
FIG. 7 illustrates the details of the map when the engine is warm.

FIGS. 6 and 7 illustrate maps according to the control of the engine 1. The maps are stored in the memory 102 of the ECU 10. The maps include three kinds of maps, a map 501, a map 502, and a map 503. The ECU 10 uses a map selected from the three kinds of maps 501, 502, and 503 according to a wall temperature of the combustion chamber 17 and an intake air temperature, in order to control the engine 1. Note that the details of the selection of the three kinds of maps 501, 502, and 503 will be described later.

The first map 501 is a map when the engine 1 is warm. The second map 502 is a map when the engine 1 is half warm. The third map 503 is a map when the engine 1 is cold.

The maps 501, 502, and 503 are defined based on the load and the engine speed of the engine 1. The first map 501 is roughly divided into three areas depending on the load and the engine speed. For example, the three areas include a low load area A1, a middle-to-high load area (A2, A3, and A4), and a high speed area A5. The low load area A1 includes idle operation, and covers areas of a low engine speed and a middle engine speed. The middle-to-high load area (A2, A3, and A4) are higher in the load than the low load area A1. The high speed area A5 is higher in the engine speed than the low load area A1 and the middle-to-high load area (A2, A3, and A4). The middle-to-high load area (A2, A3, and A4) is divided into a middle load area A2, a high-load middle-speed area A3 where the load is higher than the middle load area A2, and a high-load low-speed area A4 where the engine speed is lower than the high-load middle-speed area A3.

The second map 502 is roughly divided into two areas. For example, the two areas include a low-to-middle speed area (B1, B2, and B3) and a high speed area B4 where the engine speed is higher than the low-to-middle speed area (B1, B2, and B3). The low-to-middle speed area (B1, B2, and B3) is divided into a low-to-middle load area B1 corresponding to the low load area A1 and the middle load area A2, a high-load middle-speed area B2, and a high-load low-speed area B3.

The third map 503 has only one area C1, without being divided into a plurality of areas.

Here, the low speed area, the middle speed area, and the high speed area may be defined by substantially equally dividing the entire operating range of the engine 1 into three areas in the engine speed direction. In the example of FIGS. 6 and 7, the engine speed is defined to be a low speed if the engine speed is lower than the engine speed N1, a high speed if the engine speed is higher than or equal to the engine speed N2, and a middle speed if the engine speed is higher than or equal to the engine speed N1 and lower than the engine speed N2. For example, the engine speed N1 may be about 1,200 rpm, and the engine speed N2 may be about 4,000 rpm.

Moreover, the low load area may be an area including an operating state with the light load, the high load area may be an area including an operating state with full load, and the middle load area may be an area between the low load area and the high load area. Moreover, the low load area, the middle load area, and the high load area may be defined by substantially equally dividing the entire operating range of the engine 1 into three areas in the load direction.

The maps 501, 502, and 503 in FIG. 6 illustrate the states and combustion modes of the mixture gas in the respective areas. A map 504 in FIG. 7 corresponds to the first map 501, and illustrates the state and combustion mode of the mixture gas in each area of the map, the opening of the swirl control valve 56 in each area, and a driving area and a non-driving area of the supercharger 44. The engine 1 performs SPCCI combustion in the low load area A1, the middle load area A2, the high-load middle-speed area A3, the high-load low-speed area A4, the low-to-middle load area B1, the high-load middle-speed area B2, and the high-load low-speed area B3. The engine 1 performs SI combustion in other areas, specifically, in the high speed area A5, the high speed area B4, and the area C1.

(Operation of Engine in Each Area)

Figure 8:
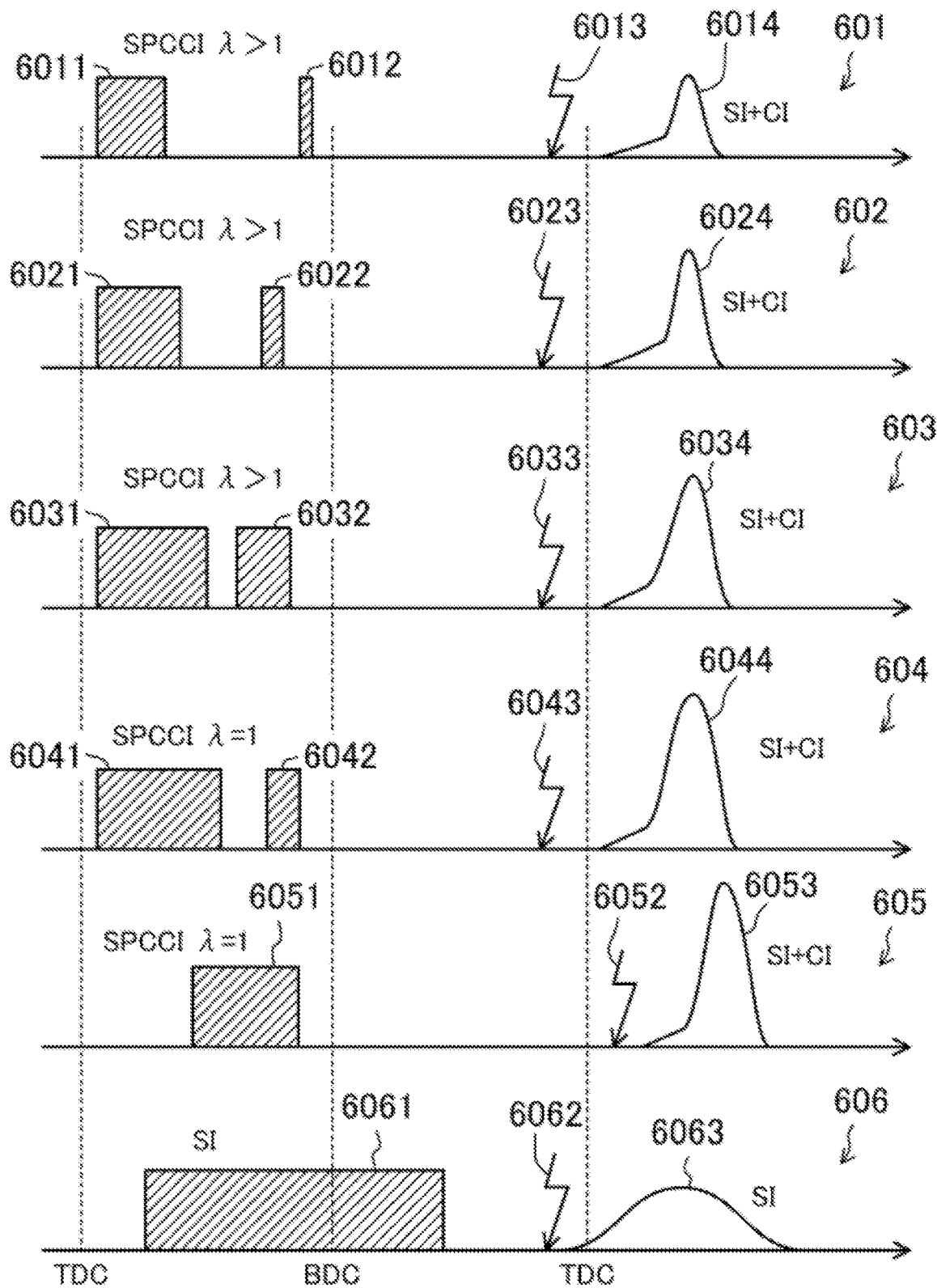
FIG. 8 illustrates charts of a fuel injection timing, ignition timing, and a combustion waveform in each operating range of the map of FIG. 7.

Below, the operation of the engine 1 in each area of the map 504 in FIG. 7 will be described in detail with reference to the fuel injection timing and the ignition timing which are illustrated in FIG. 8. The horizontal axis in FIG. 8 is a crank angle. Note that reference numerals 601, 602, 603, 604, 605, and 606 in FIG. 8 correspond to the operating states of the engine 1 indicated by the reference numerals 601, 602, 603, 604, 605, and 606 in the map 504 of FIG. 7, respectively.

(Low Load Area)

The engine 1 performs SPCCI combustion when the engine 1 operates in the low load area A1.

The reference numeral 601 in FIG. 8 indicates fuel injection timings (reference numerals 6011 and 6012), an ignition timing (reference numeral 6013), and a combustion waveform (i.e., a waveform indicating a change in the heat release rate with respect to the crank angle: reference numeral 6014), when the engine 1 operates in the operating state 601 in the low load area A1. The reference numeral 602 indicates fuel injection timings (reference numerals 6021 and 6022), an ignition timing (reference numeral 6023), and a combustion waveform (reference numeral 6024), when the engine 1 operates in the operating state 602 in the low load area A1. The reference numeral 603 indicates fuel injection timings (reference numerals 6031 and 6032), an ignition timing (reference numeral 6033), and a combustion waveform (reference numeral 6034), when the engine 1 operates in the operating state 603 in the low load area A1. The operating states 601, 602, and 603 have the same engine speed, but different loads. The operating state 601 has the lowest load (i.e., light load), the operating state 602 has the second lowest load (i.e., low load), and the operating state 603 has the maximum load among these states.

In order to improve the fuel efficiency of the engine 1, the EGR system 55 introduces the EGR gas into the combustion chamber 17. For example, the intake-side electric S-VT 23 and the exhaust-side electric S-VT 24 are provided with a positive overlap period where both the intake valve 21 and the exhaust valve 22 are opened near an exhaust top dead center. A portion of the exhaust gas discharged from the combustion chamber 17 into the intake port 18 and the exhaust port 19 is re-introduced into the combustion chamber 17. Since the hot exhaust gas is introduced into the combustion chamber 17, the temperature inside the combustion chamber 17 increases. Thus, it becomes advantageous to stabilize SPCCI combustion. Note that the intake-side electric S-VT 23 and the exhaust-side electric S-VT 24 may be provided with a negative overlap period where both the intake valve 21 and the exhaust valve 22 are closed.

Moreover, the swirl generating part forms the strong swirl flow inside the combustion chamber 17. The swirl ratio is four or higher, for example. The swirl control valve 56 is fully closed or at a given opening (closed to some extent). As described above, since the intake port 18 is the tumble port, an inclined swirl flow having a tumble component and a swirl component is formed in the combustion chamber 17.

The injector 6 injects fuel into the combustion chamber 17 a plurality of times during the intake stroke (reference numerals 6011, 6012, 6021, 6022, 6031, and 6032). The mixture gas is stratified by the multiple fuel injections and the swirl flow inside the combustion chamber 17.

The fuel concentration of the mixture gas in the central part of the combustion chamber 17 is denser or richer than the fuel concentration in the outer circumferential part. For example, the air-fuel ratio (A/F) of the mixture gas in the central part is 20 or higher and 30 or lower, and the A/F of the mixture gas in the outer circumferential part is 35 or higher. Note that the value of the A/F is a value when the mixture gas is ignited, and the same applies to the following description. Since the A/F of the mixture gas near the ignition plug 25 is set 20 or higher and 30 or lower, generation of raw NOx during SI combustion can be reduced. Moreover, since the A/F of the mixture gas in the outer circumferential part is set to 35 or higher, CI combustion stabilizes.

The A/F of the mixture gas is leaner than the stoichiometric air fuel ratio throughout the combustion chamber 17 (i.e., excess air ratio $\lambda > 1$). For example, the A/F of the mixture gas is 30 or higher throughout the combustion chamber 17. Thus, the generation of raw $NO_x$ can be reduced to improve the emission performance.

When the engine load is low (i.e., in the operating state 601), the injector 6 performs the first injection 6011 in the first half of an intake stroke, and performs the second injection 6012 in the second half of the intake stroke. The first half of the intake stroke may be a first half of an intake stroke when the intake stroke is equally divided into two, and the second half of the intake stroke may be the rest. Moreover, an injection amount ratio of the first injection 6011 to the second injection 6012 may be 9:1, for example.

In the operating state 602 where the engine load is higher, the injector 6 initiates the second injection 6022 which is performed in the second half of an intake stroke at a timing advanced from the second injection 6012 in the operating state 601. By advancing the second injection 6022, the mixture gas inside the combustion chamber 17 becomes more homogeneous. The injection amount ratio of the first injection 6021 to the second injection 6022 may be 7:3 to 8:2, for example.

In the operating state 603 where the engine load is even higher, the injector 6 initiates the second injection 6032 which is performed in the second half of an intake stroke at a timing further advanced from the second injection 6022 in the operating state 602. By further advancing the second injection 6032, the mixture gas inside the combustion chamber 17 becomes further homogeneous. The injection amount ratio of the first injection 6031 to the second injection 6032 may be 6:4, for example.

After the fuel injection is finished, the ignition plug 25 ignites the mixture gas in the central part of the combustion chamber 17 at a given timing before a compression top dead center (reference numerals 6013, 6023, and 6033). The ignition timing may be during a final stage of the compression stroke. The compression stroke may be equally divided into three, an initial stage, a middle stage, and a final stage, and this finale stage may be used as the final stage of the compression stroke described above.

As described above, since the mixture gas in the central part has the relatively high fuel concentration, the ignitability improves and SI combustion by flame propagation stabilizes. By SI combustion being stabilized, CI combustion begins at a suitable timing. Thus, the controllability in CI combustion improves in SPCCI combustion. Further, the generation of combustion noise is reduced. Moreover, since the A/F of the mixture gas is made leaner than the stoichiometric air fuel ratio to perform SPCCI combustion, the fuel efficiency of the engine 1 can be significantly improved. Note that the low load area A1 corresponds to Layer 3 described later. Layer 3 extends to the light load operating range and includes a minimum load operating state.

(Middle-to-High Load Area)

When the engine 1 operates in the middle-to-high load area, the engine 1 also performs SPCCI combustion, similar to the low load area.

The reference numeral 604 in FIG. 8 indicates, in the middle-to-high load area, fuel injection timings (reference numerals 6041 and 6042), an ignition timing (reference numeral 6043), and a combustion waveform (reference numeral 6044), when the engine 1 operates in the operating state 604 in the middle load area A2. The reference numeral 605 indicates a fuel injection timing (reference numeral 6051), an ignition timing (reference numeral 6052), and a combustion waveform (reference numeral 6053), when the engine 1 operates in the operating state 605 in the high-load low-speed area A4.

The EGR system 55 introduces the EGR gas into the combustion chamber 17. For example, the intake-side electric S-VT 23 and the exhaust-side electric S-VT 24 are provided with a positive overlap period where both the intake valve 21 and the exhaust valve 22 are opened near an exhaust top dead center. Internal EGR gas is introduced into the combustion chamber 17. Moreover, the EGR system 55 introduces the exhaust gas cooled by the EGR cooler 53 into the combustion chamber 17 through the EGR passage 52. That is, the external EGR gas with a lower temperature than the internal EGR gas is introduced into the combustion chamber 17. The external EGR gas adjusts the temperature inside the combustion chamber 17 to a suitable temperature. The EGR system 55 reduces the amount of the EGR gas as the engine load increases. The EGR system 55 may not recirculate the EGR gas containing the internal EGR gas and the external EGR gas during the full load.

Moreover, in the middle load area A2 and the high-load middle-speed area A3, the swirl control valve 56 is fully closed or at a given opening (closed to some extent). In the combustion chamber 17, the strong swirl flow with the swirl ratio of four or higher is formed. On the other hand, in the high-load low-speed area A4, the swirl control valve 56 is open.

The air-fuel ratio (A/F) of the mixture gas is the stoichiometric air fuel ratio (A/F≈14.7:1) throughout the combustion chamber 17. Since the three-way catalysts 511 and 513 purify the exhaust gas discharged from the combustion chamber 17, the emission performance of the engine 1 is improved. The A/F of the mixture gas may be set within a purification window of the three-way catalyst. The excess air ratio λ, of the mixture gas may be 1.0±0.2. Note that when the engine 1 operates in the high-load middle-speed area A3 including the full load (i.e., the maximum load), the A/F of the mixture gas may be set at the stoichiometric air fuel ratio or richer than the stoichiometric air fuel ratio (i.e., the excess air ratio λ of the mixture gas is λ≤1) throughout the combustion chamber 17.

Since the EGR gas is introduced into the combustion chamber 17, a gas-fuel ratio (G/F) which is a weight ratio of the entire gas to the fuel in the combustion chamber 17 becomes leaner than the stoichiometric air fuel ratio. The G/F of the mixture gas may be 18:1 or higher. Thus, a generation of a so-called "knock" is avoided. The G/F may be set 18:1 or higher and 30:1 or lower. Alternatively, the G/F may be set 18:1 or higher and 50:1 or lower.

When the engine 1 operates in the operating state 604, the injector 6 performs a plurality of fuel injections (reference numerals 6041 and 6042) during an intake stroke. The injector 6 may perform the first injection 6041 in the first half of the intake stroke and the second injection 6042 in the second half of the intake stroke.

Moreover, when the engine 1 operates in the operating state 605, the injector 6 injects fuel in an intake stroke (reference numeral 6051).

The ignition plug 25 ignites the mixture gas at a given timing near a compression top dead center after the fuel is injected (reference numerals 6043 and 6052). The ignition plug 25 may ignite the mixture gas before the compression top dead center when the engine 1 operates in the operating state 604 (reference numeral 6043). The ignition plug 25 may ignite the mixture gas after the compression top dead center when the engine 1 operates in the operating state 605 (reference numeral 6052).

Since the A/F of the mixture gas is set to the stoichiometric air fuel ratio and SPCCI combustion is performed, the exhaust gas discharged from the combustion chamber 17 can be purified using the three-way catalysts 511 and 513. Moreover, the fuel efficiency of the engine 1 improves by introducing the EGR gas into the combustion chamber 17 and making the mixture gas leaner. Note that the middle-to-high load areas A2, A3, and A4 correspond to Layer 2 described later. Layer 2 extends to the high load area and includes the maximum load operating state.

(Operation of Supercharger)

Here, as illustrated in the map 504 of FIG. 7, the supercharger 44 is OFF in part of the low load area A1 and part of the middle load area A2 (see S/C OFF). In detail, the supercharger 44 is OFF in an area on the lower engine speed side in the low load area A1. In an area on the higher speed side in the low load area A1, the supercharger 44 is ON in order to secure a required intake filling amount for the increased speed of the engine 1. Moreover, the supercharger 44 is OFF in a partial area on the lower load and lower engine speed side in the middle load area A2. In the area on the higher load side in the middle load area A2, the supercharger 44 is ON in order to secure a required intake filling amount for the increased fuel injection amount. Moreover, the supercharger 44 is ON also in the area on the higher speed side in the middle load area A2.

Note that in each area of the high-load middle-speed area A3, the high-load low-speed area A4, and the high speed area A5, the supercharger 44 is entirely ON (see S/C ON).

(High Speed Area)

When the speed of the engine 1 increases, a time required for changing the crank angle by 1° becomes shorter. Thus, it becomes difficult to stratify the mixture gas inside the combustion chamber 17. When the speed of the engine 1 increases, it also becomes difficult to perform SPCCI combustion.

Therefore, the engine 1 performs not SPCCI combustion but SI combustion when the engine 1 operates in the high speed area A5. Note that the high speed area A5 extends entirely in the load direction from the low load to the high load.

The reference numeral 606 of FIG. 8 indicates a fuel injection timing (reference numeral 6061), an ignition timing (reference numeral 6062), and a combustion waveform (reference numeral 6063), when the engine 1 operates in the high speed area A5 in the operating state 606 where the load is high.

The EGR system 55 introduces the EGR gas into the combustion chamber 17. The EGR system 55 reduces the amount of the EGR gas as the load increases. The EGR system 55 may not recirculate the EGR gas during full load.

The swirl control valve 56 is fully opened. No swirl flow occurs in the combustion chamber 17, but only a tumble flow occurs. By fully opening the swirl control valve 56, it is possible to increase the filling efficiency, and reduce the pumping loss.

Fundamentally, the air-fuel ratio (A/F) of the mixture gas is the stoichiometric air fuel ratio (A/F≈14.7:1throughout the combustion chamber 17. The excess air ratio λ of the mixture gas may be set to 1.0±0.2. Note that the excess air ratio λ of the mixture gas may be lower than 1 when the engine 1 operates near full load.

The injector 6 starts the fuel injection during an intake stroke. The injector 6 injects fuel all at once (reference numeral 6061). By starting the fuel injection in the intake stroke, the homogeneous or substantially homogeneous mixture gas is formed inside the combustion chamber 17. Moreover, since a longer vaporizing time of the fuel can be secured, unburnt fuel loss can also be reduced.

After the fuel injection is finished, the ignition plug 25 ignites the mixture gas at a suitable timing before a compression top dead center (reference numeral 6062).

(Layer Structure of Map)

Figure 9:
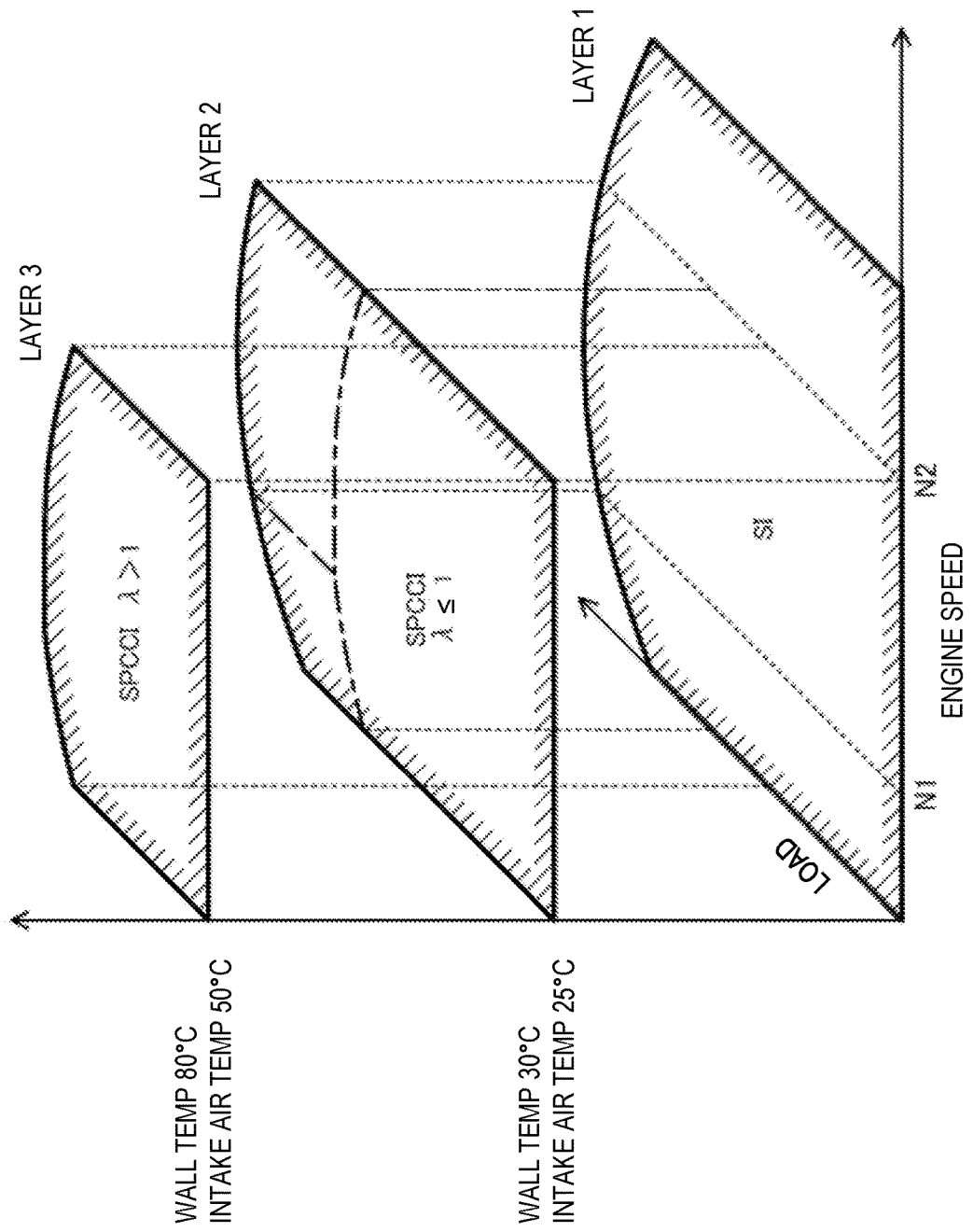
FIG. 9 illustrates a layer structure of the engine map.

As illustrated in FIG. 9, the maps 501, 502, and 503 of the engine 1 illustrated in FIG. 6 are comprised of a combination of three layers, Layer 1, Layer 2, and Layer 3.

Layer 1 is a layer used as a base layer. Layer 1 extends throughout the operating range of the engine 1. Layer 1 corresponds to the entire third map 503.

Layer 2 is a layer which is superimposed on Layer 1. Layer 2 corresponds to a portion of the operating range of the engine 1. For example, Layer 2 corresponds to the low-to-middle speed area B1, B2, and B3 of the second map 502.

Layer 3 is a layer which is superimposed on Layer 2. Layer 3 corresponds to the low load area A1 of the first map 501.

Layer 1, Layer 2, and Layer 3 are selected according to the wall temperature of the combustion chamber 17 and the intake air temperature.

When the wall temperature of the combustion chamber 17 is higher than a given first wall temperature (e.g., 80° C.) and the intake air temperature is higher than a given first intake air temperature (e.g., 50° C.), Layer 1, Layer 2, and Layer 3 are selected, and the first map 501 is formed by superimposing Layer 1, Layer 2, and Layer 3. In the low load area A1 in the first map 501, the top Layer 3 therein becomes effective, in the middle-to-high load areas A2, A3, and A4, the top Layer 2 therein becomes effective, and in the high speed area A5, Layer 1 becomes effective.

When the wall temperature of the combustion chamber 17 is lower than the given first wall temperature and higher than a given second wall temperature (e.g., 30° C.), and the intake air temperature is lower than the given first intake air temperature and higher than a given second intake air temperature (e.g., 25° C.), Layer 1 and Layer 2 are selected. By superimposing the Layer 1 and Layer 2, the second map 502 is formed. In the low-to-middle speed area B1, B2, and B3 in second map 502, the top Layer 2 therein becomes effective, and in the high speed area B4, Layer 1 becomes effective.

When the wall temperature of the combustion chamber 17 is lower than the given second wall temperature and the intake air temperature is lower than the given second intake air temperature, only Layer 1 is selected to form the third map 503.

Note that the wall temperature of the combustion chamber 17 may be replaced, for example, by temperature of the coolant of the engine 1 measured by the water temperature sensor SW10. Alternatively, the wall temperature of the combustion chamber 17 may be estimated based on the temperature of the coolant, or other measurements. The intake air temperature is measurable, for example, by the third intake-air temperature sensor SW17 which measures the temperature inside the surge tank 42. Alternatively, the temperature of the intake air introduced into the combustion chamber 17 may be estimated based on various kinds of measurements.

As described above, SPCCI combustion is performed by generating the strong swirl flow inside the combustion chamber 17. Since the flame propagates along the wall of the combustion chamber 17 during SI combustion, the flame propagation of SI combustion is influenced by the wall temperature. If the wall temperature is low, the flame of SI combustion is cooled to delay the timing of compression-ignition.

Since CI combustion of SPCCI combustion is performed in the area from the outer circumferential part to the central part of the combustion chamber 17, it is influenced by the temperature in the central part of the combustion chamber 17. If the temperature in the central part is low, CI combustion becomes unstable. The temperature in the central part of the combustion chamber 17 depends on the temperature of the intake air introduced into the combustion chamber 17. That is, when the intake air temperature is higher, the temperature in the central part of the combustion chamber 17 becomes higher, and when the intake air temperature is lower, the temperature in the central part becomes lower.

When the wall temperature of the combustion chamber 17 is lower than the given second wall temperature and the intake air temperature is lower than the given second intake air temperature, the stable SPCCI combustion cannot be performed. Thus, only Layer 1 which performs SI combustion is selected, and the ECU 10 operates the engine 1 based on the third map 503. By the engine 1 performing SI combustion in the entire operating range, the combustion stability can be secured.

When the wall temperature of the combustion chamber 17 is higher than the given second wall temperature and the intake air temperature is higher than the given second intake air temperature, the stable SPCCI combustion of the mixture gas having substantially stoichiometric air fuel ratio (i.e., λ≈1) can be carried out. Thus, in addition to Layer 1, Layer 2 is selected, and the ECU 10 operates the engine 1 based on the second map 502. By the engine 1 performing SPCCI combustion in a portion of the operating ranges, the fuel efficiency of the engine 1 improves.

When the wall temperature of the combustion chamber 17 is higher than the given first wall temperature and the intake air temperature is higher than the given first the intake air temperature, the stable SPCCI combustion of the mixture gas leaner than the stoichiometric air fuel ratio can be carried out. Thus, in addition to Layer 1 and Layer 2, Layer 3 is selected, and the ECU 10 operates the engine 1 based on the first map 501. By the engine 1 performing SPCCI combustion of the lean mixture gas in a portion of the operating ranges, the fuel efficiency of the engine 1 further improves.

Figure 10:
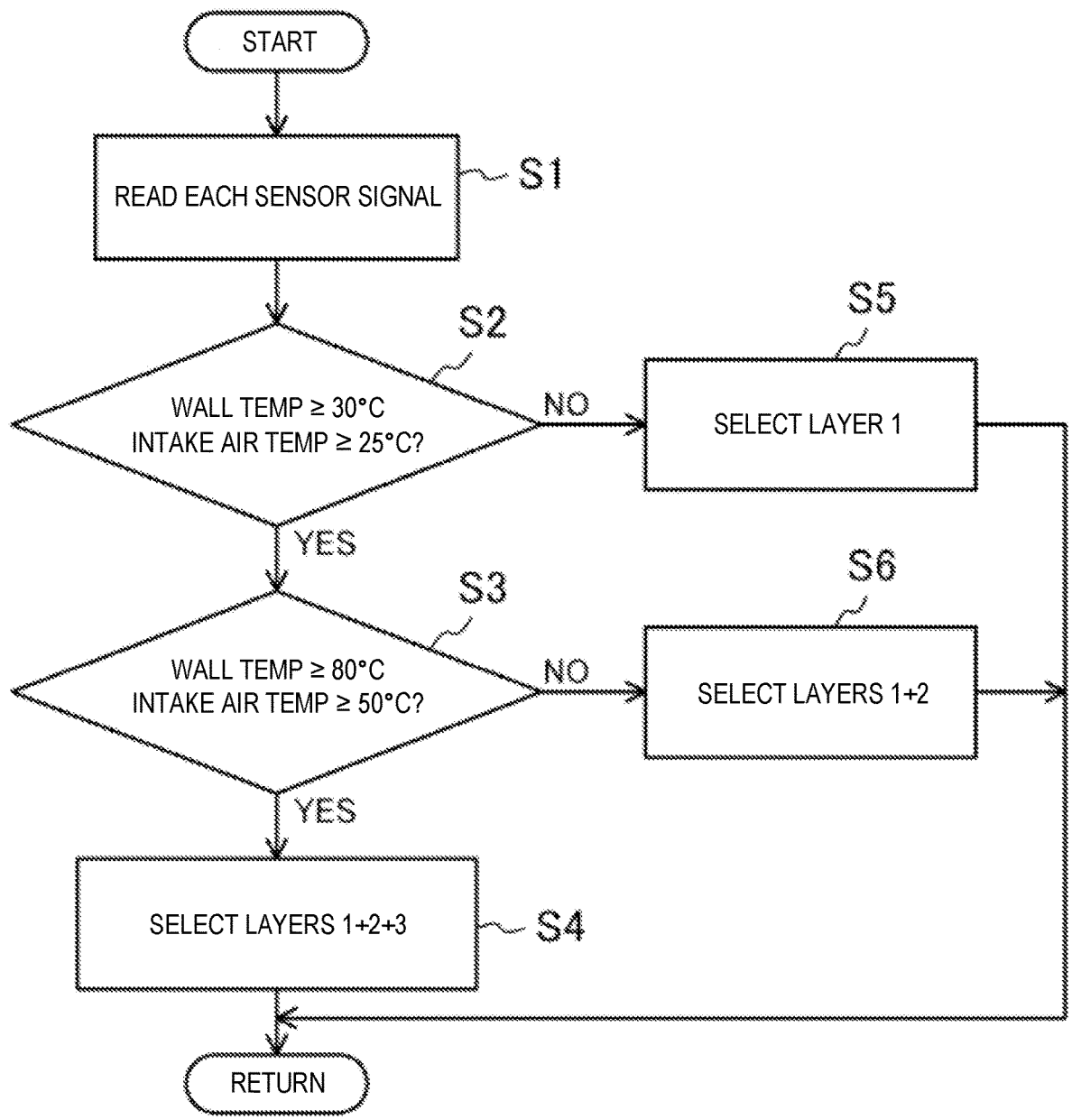
FIG. 10 is a flowchart illustrating a control process according to a layer selection of the map.

Next, one example of control related to the layer selection of the map executed by the ECU 10 will be described with reference to a flowchart of FIG. 10. First, at Step S1 after the control is started, the ECU 10 reads the signals of the sensors SW1-SW17. At the following Step S2, the ECU 10 determines whether the wall temperature of the combustion chamber 17 is 30° C. or higher and the intake air temperature is 25° C. or higher. If the determination at Step S2 is YES, the control shifts the process to Step S3, and on the other hand, if NO, the control shifts the process to Step S5. The ECU 10 selects only Layer 1 at Step S5. The ECU 10 operates the engine 1 based on the third map 503. The control then returns the process.

At Step S3, the ECU 10 determines whether the wall temperature of the combustion chamber 17 is 80° C. or higher and the intake air temperature is 50° C. or higher. If the determination at Step S3 is YES, the control shifts the process to Step S4, and on the other hand, if NO, the control shifts the process to Step S6.

The ECU 10 selects Layer 1 and Layer 2 at Step S6. The ECU 10 operates the engine 1 based on the second map 502. The control then returns the process.

The ECU 10 selects Layer 1, Layer 2, and Layer 3 at Step S4. The ECU 10 operates the engine 1 based on the first map. The control then returns the process.

(Valve Timing of Intake Valve and Exhaust Valve)

FIG. 11 illustrates one example of a change in a valve open timing IVO of the intake valve 21 when the ECU 10 controls the intake-side electric S-VT 23 according to the control logic set for Layer 2. The upper graph of FIG. 11 (i.e., a graph 1101) illustrates a change of the valve open timing IVO of the intake valve 21 (vertical axis) versus the engine load (horizontal axis). The solid line corresponds to a case where the speed of the engine 1 is a relatively low first engine speed, and a broken line corresponds to a case where the speed of the engine 1 is a relatively high second engine speed (first engine speed<second engine speed).

The lower graph of FIG. 11 (i.e., a graph 1102) illustrates a change of the valve open timing IVO of the intake valve 21 (vertical axis) versus the speed of the engine 1 (horizontal axis). The solid line corresponds to a case where the engine load is a relatively low first load, and the broken line corresponds to a case where the engine load is a relatively high second load (first load<second load).

In the graph 1101 and the graph 1102, the valve open timing IVO of the intake valve 21 is advanced as it goes upward and the positive overlap period where both the intake valve 21 and the exhaust valve 22 open becomes longer. Therefore, the amount of the EGR gas introduced into the combustion chamber 17 increases.

In Layer 2, the engine 1 operates with the A/F of the mixture gas at the stoichiometric air fuel ratio or the substantially stoichiometric air fuel ratio, and the G/F leaner than the stoichiometric air fuel ratio. When the engine load is low, the fuel supply amount decreases. As illustrated in the graph 1101, when the engine load is low, the ECU 10 sets the valve open timing IVO of the intake valve 21 at a timing on the retard side. Thus, the amount of the EGR gas introduced into the combustion chamber 17 is regulated to secure the combustion stability.

Since the fuel supply amount increases when the engine load increases, the combustion stability improves. The ECU 10 sets the valve open timing of the intake valve 21 at a timing on the advance side. The pumping loss of the engine 1 can be lowered by increasing the amount of the EGR gas introduced into the combustion chamber 17.

When the engine load further increases, the temperature inside the combustion chamber 17 further increases. Then, the amount of the internal EGR gas is reduced and the amount of the external EGR gas is increased so that the temperature inside the combustion chamber 17 does not become too high. Therefore, the ECU 10 sets the valve open timing of the intake valve 21 again at a timing on the retard side.

When the engine load further increases and the supercharger 44 starts boosting, the ECU 10 sets the valve open timing of the intake valve 21 again at a timing on the advance side. Since the positive overlap period where both the intake valve 21 and the exhaust valve 22 open is provided, the residual gas in the combustion chamber 17 can be purged.

Note that when the engine speed is high and low, the tendency of the change in the valve open timing of the intake valve 21 is almost the same.

As illustrated in the graph 1102, when the engine speed is low, the flow inside the combustion chamber 17 becomes weaker. Since the combustion stability falls, the amount of the EGR gas introduced into the combustion chamber 17 is regulated. The ECU 10 sets the valve open timing of the intake valve 21 at a timing on the retard side.

Since the flow inside the combustion chamber 17 becomes strong when the engine speed increases, the amount of the EGR gas introduced into the combustion chamber 17 can be increased. The ECU 10 sets the valve open timing of the intake valve 21 at a timing on the advance side.

When the engine speed further increases, the ECU 10 sets the valve open timing of the intake valve 21 at a timing on the retard side according to the engine speed. Thus, the amount of gas introduced into the combustion chamber 17 is maximized.

FIG. 12 illustrates one example of a change in the valve open timing IVO of the intake valve 21, a valve close timing EVC of the exhaust valve 22, and an overlap period O/L of the intake valve 21 and the exhaust valve 22, when the ECU 10 controls the intake-side electric S-VT 23 and the exhaust-side electric S-VT 24 according to the control logic set for Layer 3.

The upper graph of FIG. 12 (i.e., a graph 1201) illustrates a change in the valve open timing IVO of the intake valve 21 (vertical axis) versus the engine load (horizontal axis). The solid line corresponds to a case where the engine speed is a relatively low third engine speed, and the broken line corresponds to a case where the engine speed is relatively high fourth engine speed (third engine speed<fourth engine speed).

The middle graph of FIG. 12 (i.e., graph 1202) illustrates a change in the valve close timing EVC of the exhaust valve 22 (vertical axis) versus the engine load (horizontal axis). The solid line corresponds to a case where the engine speed is at the third engine speed, and the broken line corresponds to a case where the engine speed is at the fourth engine speed.

The lower graph of FIG. 12 (i.e., graph 1203) illustrates a change in the overlap period O/L of the intake valve 21 and the exhaust valve 22 (vertical axis) versus the engine load (horizontal axis). The solid line corresponds to a case where the engine speed is at the third engine speed, and the broken line corresponds to a case where the engine speed is at the fourth engine speed.

In Layer 3, the engine 1 operates by carrying out SPCCI combustion of the mixture gas with the A/F leaner than the stoichiometric air fuel ratio. When the engine load is low, the fuel supply amount decreases. Thus, the ECU 10 regulates the amount of gas introduced into the combustion chamber 17 so that the A/F of the mixture gas does not become too low. As illustrated in the graph 1201, the ECU 10 sets the valve open timing IVO of the intake valve 21 at a timing on the retard side of an exhaust top dead center. The valve close timing of the intake valve 21 becomes after an intake bottom dead center, so-called "late close". Moreover, when the engine load is low, the ECU 10 regulates the amount of the internal EGR gas introduced into the combustion chamber 17. As illustrated in the graph 1202, the ECU 10 sets the valve close timing EVC of the exhaust valve 22 at a timing on the advance side. The valve close timing EVC of the exhaust valve 22 approaches the exhaust top dead center.

Since the fuel supply amount increases when the engine load increases, the ECU 10 does not regulate the amount of gas introduced into the combustion chamber 17. Moreover, in order to stabilize SPCCI combustion of the mixture gas leaner than the stoichiometric air fuel ratio, the ECU 10 increases the amount of the internal EGR gas introduced into the combustion chamber 17. The ECU 10 sets the valve open timing IVO of the intake valve 21 at a timing on the advance side of the exhaust top dead center. Moreover, the ECU 10 sets the valve close timing EVC of the exhaust valve 22 at a timing on the retard side of the exhaust top dead center. As a result, as illustrated in the graph 1203, when the engine load increases, the overlap period where both the intake valve 21 and the exhaust valve 22 open becomes longer.

When the engine load further increases, the ECU 10 reduces the amount of the internal EGR gas introduced into the combustion chamber 17 so that the temperature inside the combustion chamber 17 does not become too high. The ECU 10 brings the valve close timing EVC of the exhaust valve 22 closer to the exhaust top dead center. Thus, the overlap period of the intake valve 21 and the exhaust valve 22 becomes shorter. Moreover, when the engine load is high and the engine speed is high, the ECU 10 sets the valve open timing of the intake valve 21 on the retard side more than when the engine speed is low. Thus, the amount of gas introduced into the combustion chamber 17 is maximized.

Note that in the low load area surrounded by a one-dot chain line in FIG. 12, the engine 1 may perform a reduced-cylinder operation in order to improve fuel efficiency. When performing the reduced-cylinder operation, the quantities of gas and the internal EGR gas introduced into the combustion chamber 17 are not regulated. As illustrated by a two-dot chain line in the graphs 1201 and 1202, the ECU 10 may set the valve open timing of the intake valve 21 at a timing on the advance side and the valve close timing of the exhaust valve 22 at a timing on the retard side.

(Engine Control Logic)

FIG. 13 is a flowchart illustrating the control logic of the engine 1. The ECU 10 operates the engine 1 according to the control logic stored in the memory 102. For example, the ECU 10 determines the operating state of the engine 1 based on the signals of the sensors SW1-SW17, and performs calculations for adjusting properties in the combustion chamber 17, the injection amount, the injection timing, and the ignition timing so that the combustion in the combustion chamber 17 becomes combustion at the SI ratio according to the operating state.

The ECU 10 first reads the signals of the sensors SW1-SW17 at Step S131. Subsequently, at Step S132, the ECU 10 determines the operating state of the engine 1 based on the signals of the sensors SW1-SW17, and sets a target SI ratio (i.e., a target heat amount ratio). The target SI ratio is set according to the operating state of the engine 1.

FIG. 14 schematically illustrates one example of a setting of the target SI ratio. When the engine load is low, the ECU 10 sets the target SI ratio low, and on the other hand, when the engine load is high, it sets the target SI ratio high. When the engine load is low, both the reduction of combustion noise and the improvement in fuel efficiency can be achieved by increasing the ratio in CI combustion to SPCCI combustion. When the engine load is high, it becomes advantageous for the reduction of combustion noise by increasing the ratio of SI combustion to SPCCI combustion.

Returning to the flowchart of FIG. 13, the ECU 10 sets the target in-cylinder properties for achieving the target SI ratio setting based on the combustion model stored in the memory 102 at the following Step S133. For example, the ECU 10 sets a target temperature, a target pressure, and target properties in the combustion chamber 17. At Step S134, the ECU 10 sets an opening of the EGR valve 54, an opening of the throttle valve 43, an opening of the air bypass valve 48, an opening of the swirl control valve 56, and phase angles of the intake-side electric S-VT 23, and the exhaust-side electric S-VT 24 (i.e., a valve timing of the intake valve 21 and a valve timing of the exhaust valve 22), which are required for achieving the target in-cylinder properties. The ECU 10 sets the control amounts of these devices based on the map stored in the memory 102. The ECU 10 outputs signals to the EGR valve 54, the throttle valve 43, the air bypass valve 48, the swirl control valve (SCV) 56, the intake-side electric S-VT 23, and the exhaust-side electric S-VT 24 based on the control amount setting. By each device operating based on the signal of the ECU 10, the properties in the combustion chamber 17 become the target properties.

The ECU 10 further calculates predicted values or estimated values of the properties in the combustion chamber 17 based on the control amount setting of each device. The predicted property value is a predicted value of the property in the combustion chamber 17 before the intake valve 21 is closed. The predicted property value is used for setting of the fuel injection amount during the intake stroke as will be described later. The estimated property value is an estimated value of the property in the combustion chamber 17 after the intake valve 21 is closed. The estimated property value is used for setting of the fuel injection amount during a compression stroke, and setting of the ignition timing, as will be described later. The estimated property value is also used for calculation of a property error of comparison with an actual combustion state.

At Step S135, the ECU 10 sets a fuel injection amount in the intake stroke based on the predicted property value. When performing a divided injection during the intake stroke, the ECU 10 sets the injection amount of each injection. Note that when fuel is not injected in the intake stroke, the injection amount of fuel is zero. At Step S136, the ECU 10 outputs a signal to the injector 6 so that the injector 6 injects fuel into the combustion chamber 17 at given injection timing(s).

At Step S137, the ECU 10 sets a fuel injection amount in a compression stroke based on the estimated property value and the injection result of the fuel in the intake stroke. Note that when fuel is not injected in the compression stroke, the injection amount of fuel is zero. At Step S138, the ECU 10 outputs a signal to the injector 6 so that the injector 6 injects fuel into the combustion chamber 17 at an injection timing based on the preset map.

At Step S139, the ECU 10 sets an ignition timing based on the estimated property value and the injection result of the fuel in the compression stroke. At Step S1310, the ECU 10 outputs a signal to the ignition plug 25 so that the ignition plug 25 ignites the mixture gas inside the combustion chamber 17 at the set ignition timing.

By the ignition plug 25 igniting the mixture gas, SI combustion or SPCCI combustion is performed inside the combustion chamber 17. At Step S1311, the ECU 10 reads the change in the pressure inside the combustion chamber 17 measured by the pressure indicating sensor SW6, and based on the change, the ECU 10 determines a combustion state of the mixture gas inside the combustion chamber 17. At Step S1312, the ECU 10 compares the measurement result of the combustion state with the estimated property values estimated at Step S134, and calculates an error between the estimated properties value and the actual properties. The calculated error is used for the estimation at Step S134 in the subsequent cycles. The ECU 10 adjusts the openings of the throttle valve 43, the EGR valve 54, the swirl control valve 56, and/or the air bypass valve 48, and the phase angles of the intake-side electric S-VT 23 and the exhaust-side electric S-VT 24 so as to eliminate the property error. Thus, the quantities of the fresh air and the EGR gas introduced into the combustion chamber 17 are adjusted.

If the ECU 10 estimates that the temperature inside the combustion chamber 17 will be lower than the target temperature again based on the estimated property values, it advances, at Step S138, the injection timing in the compression stroke more than the injection timing based on the map so that the advancing of the ignition timing becomes possible. On the other hand, if ECU 10 estimates that the temperature inside the combustion chamber 17 will be higher than the target temperature based on the estimated property values, it retards, at Step S138, the injection timing in the compression stroke more than the injection timing based on the map so that the retarding of the ignition timing becomes possible.

That is, if the temperature inside the combustion chamber 17 is low, a self-ignition timing $\theta_{CI}$ (see FIG. 5) of the unburnt mixture gas is delayed after SI combustion begins by jump-spark ignition, which deviates the SI ratio from the target SI ratio. In this case, an increase in the unburnt fuel and a decrease in emission performance will be caused.

Thus, when the ECU 10 estimates that the temperature inside the combustion chamber 17 will be lower than the target temperature, it advances the injection timing, and advances the ignition timing at Step S1310. Since the heat release which is sufficient for SI combustion becomes possible by the start of SI combustion is made earlier, it can prevent that the self-ignition timing $\theta_{CI}$ of the unburnt mixture gas is delayed when the temperature inside the combustion chamber 17 is low. As a result, the SI ratio approaches the target SI ratio.

On the other hand, when the temperature inside the combustion chamber 17 is high, the unburnt mixture gas will carry out the self-ignition shortly after SI combustion begins by the jump-spark ignition, which deviates the SI ratio from the target SI ratio. In this case, the combustion noise increases.

Thus, when the ECU 10 estimates that the temperature inside the combustion chamber 17 will be higher than the target temperature, it retards the injection timing, and retards the ignition timing at Step S1310. Since the start of SI combustion is delayed, when the temperature inside the combustion chamber 17 is high, it can be prevented that the self-ignition timing $\theta_{CI}$ of the unburnt mixture gas becomes early. As a result, the SI ratio approaches the target SI ratio.

The control logic of the engine 1 is configured to adjust the SI ratio by using a property setting device including the throttle valve 43, the EGR valve 54, the air bypass valve 48, the swirl control valve 56, the intake-side electric S-VT 23, and the exhaust-side electric S-VT 24. By adjusting the properties in the combustion chamber 17, a rough adjustment of the SI ratio is possible. The control logic of the engine 1 is also configured to adjust the SI ratio by adjusting the injection timing and the ignition timing of fuel. By adjusting the injection timing and the ignition timing, a difference between the cylinders can be corrected, and a fine adjustment of the self-ignition timing can be performed, for example. By adjusting the SI ratio by two steps, the engine 1 can achieve the target SPCCI combustion accurately corresponding to the operating state.

The ECU 10 also outputs signals to at least the EGR system 55 and the ignition plug 25 so that the actual SI ratio by combustion becomes the target SI ratio. Moreover, as described above, when the engine load is high, since the ECU 10 makes the target SI ratio higher than when the load is low, it then outputs the signals to at least the EGR system 55 and the ignition plug 25 when the engine load is high so that the SI ratio becomes higher than when the load is low.

Note that the control of the engine 1 executed by the ECU 10 is not limited to the control logic based on the combustion model described above.

(Method of Implementing Control Logic of Engine)

When implementing the control logic of the engine 1 for performing SPCCI combustion described above, the parameter related to the control amount of each device is set. For example, if the device is the ignition plug 25, ignition energy and the ignition timing corresponding to the operating state of the engine 1 are set. If the device is the intake-side electric S-VT 23, the valve timing of the intake valve 21 corresponding to the operating state of the engine 1 is set. Below, the setting of the valve timing of the intake valve 21 in the method of implementing the control logic of the engine 1 will be described with reference to the drawings.

In the engine 1 for executing SPCCI combustion, in order to reduce combustion noise and achieve the stable SPCCI combustion, the present inventors found out that it was necessary to adjust the temperature inside the combustion chamber 17 to a suitable temperature at the start timing in CI combustion ($\theta_{CI}$: see FIG. 5). That is, when the temperature inside the combustion chamber 17 is low, the ignitability in CI combustion falls. When the temperature inside the combustion chamber 17 is high, the combustion noise increases.

The temperature inside the combustion chamber 17 at the start timing $\theta_{CI}$ in CI combustion is mainly related to the effective compression ratio of the engine 1. The effective compression ratio of the engine 1 is determined by the geometric compression ratio $\varepsilon$ and the valve close timing IVC of the intake valve 21. In order to put the engine for executing SPCCI combustion in practical use, the present inventors newly found that a suitable IVC range existed within a range of the geometric compression ratio $\varepsilon$ where SPCCI combustion may occur. The technology disclosed herein is novel in that a given relationship was found between the geometric compression ratio $\varepsilon$ and the valve close timing IVC of the intake valve 21, where the given relationship is required in order to put to practical use the engine which performs the unique combustion mode that is the SPCCI combustion. In addition, a relational expression between the geometric compression ratio $\varepsilon$ and the valve close timing IVC of the intake valve 21, which will be described later, is also novel.

Further, the technology disclosed herein is also novel in that, when implementing the control logic of the engine 1 for executing SPCCI combustion, the valve close timing IVC of the intake valve 21 is set based on the relationship between the geometric compression ratio $\varepsilon$ and the valve close timing IVC of the intake valve 21.

The engine 1 switches between "Layer 2" where SPCCI combustion is performed with the A/F of the mixture gas being made at the stoichiometric air fuel ratio or richer than the stoichiometric air fuel ratio and the G/F being made leaner than the stoichiometric air fuel ratio, and "Layer 3" where SPCCI combustion is performed with the A/F of the mixture gas being made leaner than the stoichiometric air fuel ratio. The relationship between the geometric compression ratio ε and the valve close timing IVC of the intake valve 21 in Layer 2 differs from the relationship between the geometric compression ratio ε and the valve close timing IVC of the intake valve 21 in Layer 3.

(Relationship Between Geometric Compression Ratio and Valve Close Timing of Intake Valve in Layer 2)

FIG. 15 illustrates the characteristic of SPCCI combustion. For example, FIG. 15 illustrates the occurring range of SPCCI combustion against the EGR rate (horizontal axis) in a case where the engine 1 carries out SPCCI combustion of the mixture gas of which the A/F is the stoichiometric air fuel ratio and the G/F is leaner than the stoichiometric air fuel ratio, similar to Layer 2. The vertical axis in this graph is a crank angle corresponding to a combustion center of gravity, where the combustion center of gravity advances as it goes upward in this graph.

The occurring range of SPCCI combustion is illustrated by a hatched range in this graph. The occurring range of SPCCI combustion is located between a line of "advancing limit" and a line of "retarding limit." If the combustion center of gravity advances beyond the "advancing limit" line, combustion becomes abnormal, which means that SPCCI combustion does not occur. Similarly, if the combustion center of gravity retards beyond the "retarding limit" line, self-ignition does not occur, which means that SPCCI combustion does not occur.

The one-dot chain line in this graph illustrates the combustion center of gravity of combustion corresponding to MBT (Minimum advance for Best Torque). Here, the combustion center of gravity of combustion corresponding to MBT is simply referred to as "MBT." MBT is advanced as the EGR rate increases.

In terms of the improvement in fuel efficiency, it is desirable to bring the combustion center of gravity of SPCCI combustion closer to the MBT. As the EGR rate increases, the occurring range of SPCCI combustion is advanced, but the interval between the "advancing limit" line and the "retarding limit" line becomes narrower, which narrows the occurring range of SPCCI combustion.

When the engine load is low (when "light load"), the occurring range of SPCCI combustion is on the advance side. Therefore, as illustrated by a both-ends arrow in FIG. 15, SPCCI combustion corresponding to the MBT can be achieved by adjusting the EGR rate within a certain width, and adjusting the combustion center of gravity to the advance side or the retard side.

When the engine load increases, the amount of air introduced into the combustion chamber 17 must be increased corresponding to the increase in the fuel supply amount. When the EGR rate is increased corresponding to the increase in the air amount, a large amount of the EGR gas must be introduced into the combustion chamber 17. However, because of the limit of the supercharging capability of the supercharger 44, it is difficult to introduce both the large amount of air and the large amount of the EGR gas into the combustion chamber 17. Therefore, when the engine load increases, the occurring range of SPCCI combustion becomes on the retard side. If bringing the combustion center of gravity of SPCCI combustion closest to the MBT when the engine load is high, SPCCI combustion must be performed at a point Y in FIG. 15. The point Y corresponds to the operating state of the engine 1 with the maximum load where SPCCI combustion of the mixture gas with the A/F being at the stoichiometric air fuel ratio is possible. When the engine 1 operates with the maximum load, it is difficult to achieve SPCCI combustion corresponding to the MBT by adjusting the EGR rate or the combustion center of gravity.

The engine 1 operates over a wide operating range from the low load to the high load in Layer 2. In Layer 2, the state where the engine 1 operates with the maximum load corresponds to the operating state at the limit where SPCCI combustion can occur. In Layer 2, upon determining the relationship between ε and IVC so that the temperature of the combustion chamber 17 at the start timing ($\theta_{CI}$) in CI combustion becomes the given temperature, it is necessary to set the relationship based on the temperature inside the combustion chamber 17 when the engine 1 operates with the maximum load.

In order to obtain the temperature inside the combustion chamber 17 when the engine 1 operates with the maximum load, the present inventors performed SPCCI combustion in an actual engine 1, and used measurements acquired from the engine 1. For example, the present inventors measured various parameters when the engine 1 operates with the maximum load in Layer 2, and estimated an actual temperature inside the combustion chamber 17 at $\theta_{CI}$ based on the measured parameter. The present inventors used an average value of a plurality of estimated temperatures as a reference temperature Tth1. If the temperature of the combustion chamber 17 at $\theta_{CI}$ is the reference temperature Tth1, SPCCI combustion can be achieved in Layer 2.

Here, as described above, $\theta_{CI}$ can be adjusted by adjusting the ignition timing in SPCCI combustion. However, while the engine 1 operates with the maximum load in Layer 2, it becomes impossible to adjust $\theta_{CI}$ even if the ignition timing is adjusted when the temperature inside the combustion chamber 17 at $\theta_{CI}$ exceeds the reference temperature Tth1. On the other hand, if the temperature inside the combustion chamber 17 at $O_{CI}$ is the reference temperature Tth1 or lower, the ignition timing is adjusted (e.g., the ignition timing is advanced) to raise the temperature inside the combustion chamber 17 at $\theta_{CI}$ to the reference temperature Tth1, thereby achieving SPCCI combustion.

Therefore, in order to achieve SPCCI combustion in Layer 2, the relationship is required between ε and IVC so that the temperature of the combustion chamber 17 at $\theta_{CI}$ does not exceed the reference temperature Tth1.

Thus, as conceptually illustrated in FIG. 16, the present inventors performed an estimation of the temperature of the combustion chamber 17 at $\theta_{CI}$ by using a model of the engine 1, while changing the values of the geometric compression ratio ε and the valve close timing IVC of the intake valve 21 in a matrix comprised of the two parameters of ε and IVC. A combination of ε and IVC where the temperature of the combustion chamber 17 becomes the reference temperature Tth1 or lower can achieve SPCCI combustion in Layer 2. As illustrated in FIG. 16, when the geometric compression ratio ε is high and the valve close timing IVC of the intake valve 21 approaches an intake bottom dead center, the temperature of the combustion chamber 17 during CI combustion exceeds the reference temperature Tth1.

Note that FIG. 16 illustrates the matrix where IVC is set after the intake bottom dead center. Although illustration is omitted, the present inventors also acquired a combination of ε and IVC where the temperature becomes the reference temperature Tth1 or lower, by performing an estimation of the temperature of the combustion chamber 17 at $\theta_{CI}$, similarly for the matrix where IVC is set before the intake bottom dead center.

A graph 1701 of the upper graph in FIG. 17 illustrates approximations (I) and (II) calculated based on the combination of ε and IVC. The horizontal axis of the graph 1701 is the geometric compression ratio ε, and the vertical axis is the valve close timing IVC (deg.aBDC) of the intake valve 21. Although illustration is omitted, the present inventors plotted on the graph 1701 the combination of ε and IVC where the temperature becomes the reference temperature Tth1 or lower, and determined the approximations (I) and (II) based on the plots.

The graph 1701 corresponds to a case where the engine speed is 2,000 rpm. The approximations (I) and (II) are as follows.

$$IVC = -0.4288\varepsilon^2 + 31.518\varepsilon - 379.88 \quad \text{(Approximation I)}$$

$$IVC = 1.9163\varepsilon^2 - 89.935\varepsilon + 974.94 \quad \text{(Approximation II)}$$

In the graph 1701, the combination of ε and IVC on the left side of the approximations (I) and (II) and ε=17, the temperature of the combustion chamber 17 during CI combustion becomes the reference temperature Tth1 or lower. In this combination, it is possible to carry out SPCCI combustion of the mixture gas with the A/F being the stoichiometric air fuel ratio and the G/F being leaner than the stoichiometric air fuel ratio.

The relation between ε and IVC described above is a relationship based on the maximum temperature of the combustion chamber 17 in Layer 2.

On the other hand, in Layer 2, also while the engine 1 operates with the light load, the relation between ε and IVC must be defined so that the temperature of the combustion chamber 17 becomes the given temperature.

The temperature of the combustion chamber 17 when SPCCI combustion is performed is a result of two pressure buildups of a pressure buildup by the compression work of the piston 3 in a compression stroke, and the pressure buildup caused by the heat generation of SI combustion. The compression work of the piston 3 is determined by the effective compression ratio. If the effective compression ratio is too low, the pressure buildup by the compression work of the piston 3 decreases. Unless the pressure buildup, which is caused by the heat generation of SI combustion after the flame propagation in SPCCI combustion progresses, increases considerably, the in-cylinder temperature cannot be raised to an ignition temperature. As a result, since the amount of the mixture gas which is ignited by the compressed self-ignition is little, and most of the mixture gas burn by the flame propagation, the combustion period becomes longer and fuel efficiency decreases. In order to stabilize the CI combustion in SPCCI combustion and maximize fuel efficiency, it is necessary to maintain the effective compression ratio above a certain value. Therefore, the relationship between ε and IVC must be determined accordingly.

Similarly, the present inventors measured various parameters when the actual engine 1 operates with the light load, and estimated an actual temperature inside the combustion chamber 17 at $\theta_{CI}$ based on the measured parameters. The present inventors used an average value of a plurality of estimated temperatures as a reference temperature Tth2.

If the temperature inside the combustion chamber 17 at $\theta_{CI}$ is the reference temperature Tth2 or higher while the engine 1 operates with the light load, SPCCI combustion can be achieved by delaying the ignition timing. However, since the temperature of the combustion chamber 17 is too low if the temperature at $\theta_{CI}$ is lower than the reference temperature Tth2, SPCCI combustion cannot be achieved even if the ignition timing is advanced.

Thus, in order to achieve SPCCI combustion in Layer 2, a relationship is required between ε and IVC so that the temperature of the combustion chamber 17 at $\theta_{CI}$ becomes the reference temperature Tth2 or higher.

The present inventors performed an estimation of the temperature of the combustion chamber 17 during CI combustion by using a model of the engine 1, while changing the values of the geometric compression ratio ε and the valve close timing IVC of the intake valve 21 in a matrix comprised of two parameters of ε and IVC, similarly to the matrix illustrated in FIG. 16. In this matrix, the combination of ε and IVC where the temperature of the combustion chamber 17 becomes the reference temperature Tth2 or higher can achieve SPCCI combustion in Layer 2.

In the graph 1701 of FIG. 17, approximations (III) and (IV) calculated based on the combination of ε and IVC where the temperature becomes the reference temperature Tth2 or higher are also illustrated. The approximations (III) and (IV) are as follows.

$$IVC = -0.4234\varepsilon^2 + 22.926\varepsilon - 167.84 \quad \text{(Approximation III)}$$

$$IVC = 0.4234\varepsilon^2 - 22.926\varepsilon + 207.84 \quad \text{(Approximation IV)}$$

In the graph 1701, the combination of ε and IVC on the right side of the approximations (III) and (IV), the temperature of the combustion chamber 17 during CI combustion becomes the reference temperature Tth2 or higher. In this combination, SPCCI combustion of the mixture gas with the A/F being the stoichiometric air fuel ratio and the G/F being leaner than the stoichiometric air fuel ratio is possible.

As seen in FIG. 17, the relationship between ε and IVC is substantially vertically symmetrical with respect to IVC=about 20 deg.aBDC. IVC=20 deg.aBDC corresponds to a valve close timing (i.e., the best IVC) at which the amount of gas introduced into the combustion chamber 17 becomes the maximum when the engine speed is 2,000 rpm. Moreover, IVC=120 deg.aBDC is a retarding limit of the valve close timing IVC of the intake valve 21, and IVC=−80 deg.aBDC is an advancing limit of the valve close timing IVC of the intake valve 21.

The combination of ε and IVC within a range surrounded by the approximations (I), (II), (III), and (IV) in FIG. 17 is a combination which can put to practical use the engine 1 for executing SPCCI combustion in Layer 2. In other words, the combination of ε and IVC outside this range cannot put the engine 1 to practical use for executing SPCCI combustion in Layer 2.

The processor determines the IVC within the ε-IVC valid range hatched in FIG. 17, upon determining the valve close timing IVC of the intake valve 21 when the engine 1 operates in Layer 2.

For example, if the geometric compression ratio ε is set as 10≤ε<17, the processor determines the valve close timing IVC (deg.aBDC) so that the following expression is satisfied.

$$0.4234\varepsilon^2 - 22.926\varepsilon + 207.84 \leq IVC \leq -0.4234\varepsilon^2 + 22.926\varepsilon - 167.84 \quad (1)$$

Moreover, if the geometric compression ratio ε is set as 17≤ε<20, the processor determines the valve close timing IVC (deg.aBDC) so that the following expression is satisfied.

$$-0.4288\varepsilon^2 + 31.518\varepsilon - 379.88 \leq IVC \leq -0.4234\varepsilon^2 + 22.926\varepsilon - 167.84 \quad (2)$$

or $$0.4234\varepsilon^2-22.926\varepsilon+207.84 \le IVC \le 1.9163\varepsilon^2-89.935\varepsilon+974.94 \quad (3)$$

Further, if the geometric compression ratio ε is set as 20≤ε≤30, the processor determines the valve close timing IVC (deg.aBDC) so that the following expression is satisfied.

$$-0.4288\varepsilon^2+31.518\varepsilon-379.88 \le IVC \le 120 \quad (4)$$

or $$-80 \le IVC \le 1.9163\varepsilon^2-89.935\varepsilon+974.94 \quad (5)$$

By setting the valve close timing IVC of the intake valve 21 based on the relational expressions (1) to (5), SPCCI combustion of the mixture gas with the A/F being the stoichiometric air fuel ratio or richer than the stoichiometric air fuel ratio and the G/F being leaner than the stoichiometric air fuel ratio is achieved.

Note that the valve close timing IVC is set for each operating state which is determined by the load and the engine speed in Layer 2. The example illustrated by the solid line in FIG. 17 is the ε-IVC valid range when the engine speed is 2,000 rpm, as described above. If the engine speed changes, the ε-IVC valid range also changes. As the engine speed increases, the best IVC is retarded. For example, when the engine speed is 3,000 rpm, the best IVC is about 22 deg.aBDC. As illustrated by broken lines in FIG. 17, the ε-IVC valid range when the engine speed is 3,000 rpm can be obtained by parallelly translating the ε-IVC valid range when the engine speed is 2,000 rpm to the retard side by about 2 deg.

Therefore, if the geometric compression ratio ε is set as 10≤ε<17, when the engine speed is 3,000 rpm, the processor determines the valve close timing IVC (deg.aBDC) so that the following expression is satisfied.

$$0.4234\varepsilon^2-22.926\varepsilon+209.84 \le IVC \le -0.4234\varepsilon^2+22.926\varepsilon-165.84 \quad (1^{-1})$$

Moreover, if the geometric compression ratio ε is set as 17≤ε<20, when the engine speed is 3,000 rpm, the processor determines the valve close timing IVC (deg.aBDC) so that the following expression is satisfied.

$$-0.4288\varepsilon^2+31.518\varepsilon-377.88 \le IVC \le -0.4234\varepsilon^2+22.926\varepsilon-165.84 \quad (2^{-1})$$

or $$0.4234\varepsilon^2-22.926\varepsilon+209.84 \le IVC \le 1.9163\varepsilon^2-89.935\varepsilon+976.94 \quad (3^{-1})$$

Further, if the geometric compression ratio ε is set as 20≤ε≤30, the processor determines the valve close timing IVC (deg.aBDC) so that the following expression is satisfied.

$$-0.4288\varepsilon^2+31.518\varepsilon-377.88 \le IVC \le 120 \quad (4^{-1})$$

or $$-80 \le IVC \le 1.9163\varepsilon^2-87.935\varepsilon+976.94 \quad (5^{-1})$$

Moreover, when the engine speed is 4,000 rpm, the best IVC is about 28 deg.aBDC. As illustrated by one-dot chain lines in FIG. 17, the ε-IVC valid range when the engine speed is 4,000 rpm is obtained by parallelly translating the ε-IVC valid range when the engine speed is 2,000 rpm to the retard side by about 8 deg.

Therefore, if the geometric compression ratio ε is set as 10≤ε<17, when the engine speed is 4,000 rpm, the processor determines the valve close timing IVC (deg.aBDC) so that the following expression is satisfied.

$$0.4234\varepsilon^2-22.926\varepsilon+215.84 \le IVC \le -0.4234\varepsilon^2+22.926\varepsilon-159.84 \quad (1^{-2})$$

Moreover, if the geometric compression ratio ε is set as 17≤ε<20, when the engine speed is 4,000 rpm, the processor determines the valve close timing IVC (deg.aBDC) so that the following expression is satisfied.

$$-0.4288\varepsilon^2+31.518\varepsilon-371.88 \le IVC \le -0.4234\varepsilon^2+22.926\varepsilon-159.84 \quad (2^{-2})$$

or $$0.4234\varepsilon^2-22.926\varepsilon+215.84 \le IVC \le 1.9163\varepsilon^2-89.935\varepsilon+982.94 \quad (3^{-2})$$

Further, if the geometric compression ratio ε is set as 20≤ε≤30, the processor determines the valve close timing IVC (deg.aBDC) so that the following expression is satisfied.

$$-0.4288\varepsilon^2+31.518\varepsilon-371.88 \le IVC \le 120 \quad (4^{-2})$$

or $$-80 \le IVC \le 1.9163\varepsilon^2-89.935\varepsilon+982.94 \quad (5^{-2})$$

If the correction term C according to the engine speed NE (rpm) of the engine 1 is set as the following, $$C=3.3\times10^{-10}NE^3-1.0\times10^{-6}NE^2+7.0\times10^{-4}NE$$

the relational expression of ε and IVC in Layer 2 can be expressed as follows. If the geometric compression ratio ε is 10≤ε<17, $$0.4234\varepsilon^2-22.926\varepsilon+207.84+C \le IVC \le -0.4234\varepsilon^2+22.926\varepsilon-167.84+C \quad (1^{-3})$$

If the geometric compression ratio ε is 17≤ε<20, $$-0.4288\varepsilon^2+31.518\varepsilon-379.88+C \le IVC \le -0.4234\varepsilon^2+22.926\varepsilon-167.84+C \quad (2^{-3})$$

or $$0.4234\varepsilon^2-22.926\varepsilon+207.84+C \le IVC \le 1.9163\varepsilon^2-89.935\varepsilon+974.94+C \quad (3^{-3})$$

If the geometric compression ratio ε is 20≤ε≤30, $$-0.4288\varepsilon^2+31.518\varepsilon-379.88+C \le IVC \le 120 \quad (4^{-3})$$

or $$-80 \le IVC \le 1.9163\varepsilon^2-89.935\varepsilon+974.94+C \quad (5^{-3})$$

The processor determines the valve close timing IVC based on the ε-IVC valid range determined for every engine speed of the engine 1. As a result, the processor can set the valve timing of the intake valve 21 in Layer 2 as illustrated in FIG. 11.

(Change in ε-IVC Valid Range by Difference of Octane Number)

The graph 1701 in FIG. 17 is a relationship between ε and IVC when the fuel is the high octane fuel (octane number is about 96). The graph 1702 illustrated in the lower graph is a relationship between ε and IVC when the fuel is the low octane fuel (octane number is about 91). According to the examination of the present inventors, when the fuel was the low octane fuel, it was found that the ε-IVC valid range shifts by 1.3 compression ratios toward the lower compression ratio from the ε-IVC valid range of the high octane fuel.

Accordingly, upon determining the valve close timing IVC in the engine 1 of the low octane fuel, if the geometric compression ratio ε is set as 10≤ε<15.7, when the engine speed is 2,000 rpm, the processor determines the valve close timing IVC (deg.aBDC) so that the following expression is satisfied.

$$0.4234\varepsilon^2-21.826\varepsilon+178.75 \leq IVC \leq -0.4234\varepsilon^2+21.826\varepsilon-138.75 \qquad (6)$$

Moreover, if the geometric compression ratio ε is set as 15.7≤ε<18.7 in the engine 1 of the low octane fuel, when the engine speed is 2,000 rpm, the processor determines the valve close timing IVC (deg.aBDC) so that the following expression is satisfied.

$$-0.5603\varepsilon^2+34.859\varepsilon-377.22 \leq IVC \leq -0.4234\varepsilon^2+21.826\varepsilon-138.75 \qquad (7)$$

or $$0.4234\varepsilon^2-21.826\varepsilon+178.75 \leq IVC \leq 1.9211\varepsilon^2-85.076\varepsilon+862.01 \qquad (8)$$

Further, if the geometric compression ratio ε is set as 18.7≤ε≤30 in the engine 1 of the low octane fuel, when the engine speed is 2,000 rpm, the processor determines the valve close timing IVC (deg.aBDC) so that the following expression is satisfied.

$$-0.5603\varepsilon^2+34.859\varepsilon-377.22 \leq IVC \leq 120 \qquad (9)$$

or $$-80 \leq IVC \leq 1.9211\varepsilon^2-85.076\varepsilon+862.01 \qquad (10)$$

The cross-hatched range in the graph 1702 of FIG. 17 is an overlapping range of the ε-IVC valid range of the high octane fuel and the ε-IVC valid range of the low octane fuel. The processor can set the control logic which suits both the engine 1 using the high octane fuel and the engine 1 using the low octane fuel, if IVC is determined within the overlapping range of the two valid ranges. Even if the octane number of the fuel differs for every destination of this product, the processor can collectively implement the engine control logic. This package design has an advantage which lessens the designing time and labor.

Note that although illustration is omitted, the ε-IVC valid range is parallelly translated to the retard side also in the engine 1 of the low octane fuel, when the engine speed increases. If the geometric compression ratio ε is set as 10≤ε<15.7 in the engine 1 of the low octane fuel, when the engine speed is 3,000 rpm, the processor determines the valve close timing IVC (deg.aBDC) so that the following expression is satisfied.

$$0.4234\varepsilon^2-21.826\varepsilon+180.75 \leq IVC \leq -0.4234\varepsilon^2+21.826\varepsilon-136.75 \qquad (6^{-1})$$

Moreover, if the geometric compression ratio ε is set as 15.7≤ε<18.7 in the engine 1 of the low octane fuel, when the engine speed is 3,000 rpm, the processor determines the valve close timing IVC (deg.aBDC) so that the following expression is satisfied.

$$-0.5603\varepsilon^2+34.859\varepsilon-375.22 \leq IVC \leq -0.4234\varepsilon^2+21.826\varepsilon-136.75 \qquad (7^{-1})$$

or $$0.4234\varepsilon^2-21.826\varepsilon+180.75 \leq IVC \leq 1.9211\varepsilon^2-85.076\varepsilon+864.01 \qquad (8^{-1})$$

Further, if the geometric compression ratio ε is set as 18.7≤ε≤30 in the engine 1 of the low octane fuel, when the engine speed is 3,000 rpm, the processor determines the valve close timing IVC (deg.aBDC) so that the following expression is satisfied.

$$-0.5603\varepsilon^2+34.859\varepsilon-375.22 \leq IVC \leq 120 \qquad (9^{-1})$$

or $$-80 \leq IVC \leq 1.9211\varepsilon^2-85.076\varepsilon+864.01 \qquad (10^{-1})$$

Moreover, if the geometric compression ratio ε is set as 10≤ε<15.7 in the engine 1 of the low octane fuel, when the engine speed is 4,000 rpm, the processor determines the valve close timing IVC (deg.aBDC) so that the following expression is satisfied.

$$0.4234\varepsilon^2-21.826\varepsilon+186.75 \leq IVC \leq -0.4234\varepsilon^2+21.826\varepsilon-130.75 \qquad (6^{-2})$$

Moreover, if the geometric compression ratio ε is set as 15.7≤ε<18.7 in the engine 1 of the low octane fuel, when the engine speed is 4,000 rpm, the processor determines the valve close timing IVC (deg.aBDC) so that the following expression is satisfied.

$$-0.5603\varepsilon^2+34.859\varepsilon-369.22 \leq IVC \leq -0.4234\varepsilon^2+21.826\varepsilon-130.75 \qquad (7^{-2})$$

or $$0.4234\varepsilon^2-21.826\varepsilon+186.75 \leq IVC \leq 1.9211\varepsilon^2-85.076\varepsilon+870.01 \qquad (8^{-2})$$

Further, if the geometric compression ratio ε is set as 18.7≤ε≤30 in the engine 1 of the low octane fuel, when the engine speed is 4,000 rpm, the processor determines the valve close timing IVC (deg.aBDC) so that the following expression is satisfied.

$$-0.5603\varepsilon^2+34.859\varepsilon-369.22 \leq IVC \leq 120 \qquad (9^{-2})$$

or $$-80 \leq IVC \leq 1.9211\varepsilon^2-77.076\varepsilon+870.01 \qquad (10^{-2})$$

If the correction term C according to the engine speed NE (rpm) of the engine 1 is used similar to the above, the relational expression of ε and IVC in Layer 2 in the engine 1 of the low octane fuel can be expressed as follows.

If the geometric compression ratio ε is 10≤ε<15.7, $$0.4234\varepsilon^2-21.826\varepsilon+178.75+C \leq IVC \leq -0.4324\varepsilon^2+21.826\varepsilon-138.75+C \qquad (6^{-3})$$

If the geometric compression ratio ε is 15.7≤ε<18.7, $$-0.5603\varepsilon^2+34.859\varepsilon-377.22+C \leq IVC \leq -0.4234\varepsilon^2+21.826\varepsilon-138.75+C \qquad (7^{-3})$$

or $$0.4234\varepsilon^2-21.826\varepsilon+178.75+C \leq IVC \leq 1.9211\varepsilon^2-85.076\varepsilon+862.01+C \qquad (8^{-3})$$

If the geometric compression ratio ε is 18.7≤ε≤30, $$-0.5603\varepsilon^2+34.859\varepsilon-377.22+C \leq IVC \leq 120 \qquad (9^{-3})$$

or $$-80 \leq IVC \leq 1.9211\varepsilon^2-85.076\varepsilon+862.01+C \qquad (10^{-3})$$

(Relationship Between Geometric Compression Ratio and Valve Close Timing of Intake Valve in Layer 3)

FIG. 18 illustrates the characteristic of SPCCI combustion when the engine 1 carries out SPCCI combustion of the mixture gas where the A/F is leaner than the stoichiometric air fuel ratio, similar to Layer 3. FIG. 18 illustrates a range where SPCCI combustion is stable with respect to the G/F (horizontal axis). The vertical axis in this graph is a crank angle corresponding to a combustion center of gravity, and the combustion center of gravity is advanced as it goes upward in this graph.

The range where SPCCI combustion is stabilized is a range surrounded by a curve in this graph. When the engine load is low, the range where SPCCI combustion is stabilized is located at upper left in FIG. 18. When the engine load increases, the range where SPCCI combustion is stabilized moves downwardly in FIG. 18.

FIG. 18 also illustrates a range where discharge of raw NOR can be reduced. The range where the discharge of raw $NO_x$ can be reduced is located at lower right in FIG. 18. This range has a triangular shape in FIG. 18. If A/F is leaner than the stoichiometric air fuel ratio, raw $NO_x$ cannot be purified by the three-way catalyst. In Layer 3, the engine 1 must satisfy both the stabilization of SPCCI combustion and the reduction of the discharge of raw $NO_x$.

As seen in this graph, if the engine load is high, an overlapping area of the range where the combustion stability is secured and the range where the discharge of raw $NO_x$ can be reduced increases. On the other hand, if the engine load is low, the overlapping area of the range where the combustion stability is secured and the range where the discharge of raw $NO_x$ can be reduced decreases.

Regarding Layer 3, the state where the engine 1 operates with the light load corresponds to a limit of the operating state where SPCCI combustion can occur. Regarding Layer 3, upon determining the relationship between ε and IVC so that the temperature of the combustion chamber 17 at the start timing ($\theta_{CI}$) of CI combustion becomes the given temperature, it is necessary to be set based on the temperature inside the combustion chamber 17 when the engine 1 operates with the light load.

Similar to above, using the actual engine 1, the present inventors measured various parameters when operating the engine 1 with the light load in Layer 3, and estimated an actual temperature inside the combustion chamber 17 at $\theta_{CI}$ based on the measured parameters. Then, an average value of a plurality of estimated temperatures was determined as a reference temperature Tth3. If the temperature of the combustion chamber 17 at $\theta_{CI}$ s the reference temperature Tth3, SPCCI combustion can be achieved in Layer 3. This reference temperature Tth3 corresponds to the minimum temperature. If the temperature inside the combustion chamber 17 at $\theta_{CI}$ is the reference temperature Tth3 or higher while the engine 1 operates with the light load, SPCCI combustion can be achieved by delaying the ignition timing. However, if the temperature inside the combustion chamber 17 at $\theta_{CI}$ is lower than the reference temperature Tth3, SPCCI combustion cannot be achieved even if the ignition timing is advanced.

Therefore, in order to achieve the stable SPCCI combustion in Layer 3, the relationship is required between ε and IVC so that the temperature inside the combustion chamber 17 at $\theta_{CI}$ becomes the reference temperature Tth3 or higher.

Thus, as conceptually illustrated in FIG. 19, the present inventors estimated the temperature of the combustion chamber 17 during CI combustion by using the model of the engine 1, while changing the values of IVC and O/L in a matrix of the valve close timing IVC of the intake valve 21 and the overlap period O/L of the intake valve 21 and the exhaust valve 22, for every geometric compression ratio ε (ε1, ε2 . . . ) (reference numeral 1901). As hatched in the matrix of the reference numeral 1901, a combination of IVC and O/L where the temperature becomes the reference temperature Tth3 or higher can achieve SPCCI combustion in Layer 3.

Moreover, in order to reduce the discharge of raw $NO_x$, the G/F of the mixture gas must be made a given value or higher. As illustrated by a reference numeral 1902 in FIG. 19, the present inventors estimated the G/F by using the model of the engine 1, while changing the values of the valve close timing IVC and the overlap period O/L in the matrix comprised of the two parameters of IVC and O/L. As oblique lines are drawn in the matrix of the reference numeral 1902, the combination of IVC and O/L where the G/F becomes the given value or higher can reduce the discharge of raw $NO_x$.

Then, the present inventors determined the relationship between ε and IVC which can achieve both the stability of SPCCI combustion and the reduction of raw $NO_x$ discharge, by overlapping the combination of IVC and O/L where the temperature becomes the reference temperature Tth3 or higher which is illustrated by the reference numeral 1901, and the combination of IVC and O/L where the G/F becomes the given value or higher which is illustrated by the reference numeral 1902. That is, in the matrix of a reference numeral 1903, a cross-hatched range is the combination of ε and IVC which can achieve both the stability of SPCCI combustion and the reduction of $NO_x$ discharge.

Note that although illustration is omitted, the present inventors acquired a combination of IVC and O/L where the temperature becomes the reference temperature Tth3 or higher and a combination of IVC and O/L where the G/F becomes the given value or higher by estimating the temperature of the combustion chamber 17 and the G/F during CI combustion, similarly for the matrix where the valve close timing of the intake valve 21 is set before the intake bottom dead center.

FIG. 20 illustrates approximations (V) and (VI) calculated based on the combinations of ε and IVC. The horizontal axis in FIG. 20 is the geometric compression ratio ε, and the vertical axis is the valve close timing IVC (deg. aBDC) of the intake valve 21.

An upper graph 2001 of FIG. 20 corresponds to a case when the engine speed is 2,000 rpm. The approximations (V) and (VI) are as follows.

$$IVC = -0.9949\varepsilon^2 + 41.736\varepsilon - 361.16 \quad \text{(Approximation V)}$$

$$IVC = 0.9949\varepsilon^2 - 41.736\varepsilon + 401.16 \quad \text{(Approximation VI)}$$

In FIG. 20, the combinations of ε and IVC on the right side of the approximations (V) and (VI) have the temperature of the combustion chamber 17 during CI combustion becoming the reference temperature Tth3 or higher, thereby achieving SPCCI combustion of the mixture gas with the A/F being leaner than the stoichiometric air fuel ratio.

In Layer 3, the relationship between ε and IVC described above is a relationship based on the minimum temperature of the combustion chamber 17 which can achieve SPCCI combustion when the engine 1 operates with the light load.

On the other hand, if the temperature inside the combustion chamber 17 is too high, CI combustion begins before the start of SI combustion and SPCCI combustion cannot be performed, regardless of Layer 2 or Layer 3.

Here, the concept of SPCCI combustion is such that, as described above, when the ignition plug 25 ignites the mixture gas, the mixture gas around the ignition plug 25 starts SI combustion, and, after that, surrounding mixture gas carries out CI combustion. From the examinations by experiments, etc. which the present inventors conducted until now, it was found that the self-ignition of the mixture gas occurred when the surrounding temperature of the mixture gas which self-ignites exceeds a given reference temperature Tth4, and this reference temperature Tth4 was not necessarily in agreement with a mean temperature of the entire combustion chamber 17. From this knowledge, if the mean temperature inside the combustion chamber 17 at a compression top dead center reaches the reference temperature Tth4, it is thought that CI combustion will begin before SI combustion begins, and in this case, SPCCI combustion cannot be performed.

Thus, the present inventors estimated the temperature of the combustion chamber 17 at the compression top dead center by using the model of the engine 1, while changing the values of the valve close timing IVC and the overlap period O/L in the matrix of the valve close timing IVC of the intake valve 21, and the overlap period O/L of the intake valve 21 and the exhaust valve 22, for every geometric compression ratio ε (ε1, ε2 . . . ), similar to the matrix of the reference numeral 1901 of FIG. 19. The combination of IVC and O/L where the temperature inside the combustion chamber 17 at the compression top dead center exceeds the reference temperature Tth4 cannot achieve SPCCI combustion, but the combination of IVC and O/L being the reference temperature Tth4 or lower can achieve SPCCI combustion.

FIG. 20 illustrates approximations (VII) and (VIII) calculated based on the combination of ε and IVC where the temperature inside the combustion chamber 17 at the compression top dead center becomes the reference temperature Tth4 or lower. The approximations (VII) and (VIII) are as follows.

$$IVC = -4.7481\varepsilon^2 + 266.75\varepsilon - 3671.2 \quad \text{(Approximation (VII))}$$

and $$IVC = 4.7481\varepsilon^2 - 266.75\varepsilon + 3711.2 \quad \text{Approximation (VIII)}$$

In FIG. 20, the combination of ε and IVC on the left side the approximations (VII) and (VIII) can avoid that CI combustion begins before SI combustion, and achieves SPCCI combustion.

As seen in FIG. 20, also in Layer 3, the relationship between ε and IVC is substantially vertically symmetrical with respect to IVC=20 deg.aBDC. Moreover, IVC=75 deg.aBDC is a retarding limit of the valve close timing of the intake valve 21 set in consideration of the amount of gas introduced into the combustion chamber 17 when the engine 1 operates in Layer 3. Similarly, IVC=−35 deg.aBDC is an advancing limit of the valve close timing of the intake valve 21 set in consideration of the amount of gas introduced into the combustion chamber 17.

When determining the valve close timing IVC of the intake valve 21 in the case where the engine 1 operates in Layer 3, the processor must determine IVC within the ε-IVC valid range surrounded by the approximations (V), (VI), (VII), and (VIII) in FIG. 20 (the hatched range in FIG. 20).

For example, if the geometric compression ratio ε is set as 10≤ε<20, when the engine speed is 2,000 rpm, the processor determines the valve close timing IVC (deg.aBDC) so that the following expression is satisfied.

$$0.9949\varepsilon^2 - 41.736\varepsilon + 401.16 \leq IVC \leq -0.9949\varepsilon^2 + 41.736\varepsilon - 361.16 \quad (11)$$

Moreover, if the geometric compression ratio ε is set as 20≤ε<25, when the engine speed is 2,000 rpm, the processor determines the valve close timing IVC (deg.aBDC) so that the following expression is satisfied.

$$-35 \leq IVC \leq 75 \quad (12)$$

Further, if the geometric compression ratio ε is set as 25≤ε≤30, when the engine speed is 2,000 rpm, the processor determines the valve close timing IVC (deg.aBDC) so that the following expression is satisfied.

$$-4.7481\varepsilon^2 + 266.75\varepsilon - 3671.2 \leq IVC \leq 75 \quad (13)$$

or $$-35 \leq IVC \leq 4.7481\varepsilon^2 - 266.75\varepsilon + 3711.2 \quad (14)$$

By setting the valve close timing IVC of the intake valve 21 based on the relational expressions (11) to (14), SPCCI combustion of the mixture gas with that the A/F being leaner than the stoichiometric air fuel ratio carries is achieved. Note that the valve close timing IVC is set for each operating state which is determined by the load and the engine speed in Layer 3.

The example illustrated by a solid line in FIG. 20 is the ε-IVC valid range when the engine speed is 2,000 rpm, as described above. If the engine speed changes, the ε-IVC valid range also changes. When the engine speed increases, the ε-IVC valid range is also parallelly translated to the retard side, similarly in FIG. 20. Therefore, if the geometric compression ratio is set as 10≤ε<20, when the engine speed is 3,000 rpm (see a broken line), the processor determines the valve close timing IVC (deg.aBDC) so that the following expression is satisfied.

$$0.9949\varepsilon^2 - 41.736\varepsilon + 403.16 \leq IVC \leq -0.9949\varepsilon^2 + 41.736\varepsilon - 359.16 \quad (11^{-1})$$

If the geometric compression ratio ε is set as 20≤ε<25, when the engine speed is 3,000 rpm, the processor determines the valve close timing IVC (deg.aBDC) so that the following expression is satisfied.

$$-33 \leq IVC \leq 77 \quad (12^{-1})$$

Further, if the geometric compression ratio ε is set as 25≤ε≤30, when the engine speed is 3,000 rpm, the processor determines the valve close timing IVC (deg.aBDC) so that the following expression is satisfied.

$$-4.7481\varepsilon^2 + 266.75\varepsilon - 3669.2 \leq IVC \leq 77 \quad (13^{-1})$$

or $$-33 \leq IVC \leq 4.7481\varepsilon^2 - 266.75\varepsilon + 3713.2 \quad (14^{-1})$$

If the geometric compression ratio ε is set as 10≤ε<20, when the engine speed is 4,000 rpm (see one-dot chain line), the processor determines the valve close timing IVC (deg.aBDC) so that the following expression is satisfied.

$$0.9949\varepsilon^2 - 41.736\varepsilon + 409.16 \leq IVC \leq -0.9949\varepsilon^2 + 41.736\varepsilon - 353.16 \quad (11^{-2})$$

If the geometric compression ratio ε is set as 20≤ε<25, when the engine speed is 4,000 rpm, the processor determines the valve close timing IVC (deg.aBDC) so that the following expression is satisfied.

$$-27 \leq IVC \leq 83 \quad (12^{-2})$$

Further, if the geometric compression ratio ε is set as 25≤ε≤30, when the engine speed is 4,000 rpm, the processor determines the valve close timing IVC (deg.aBDC) so that the following expression is satisfied.

$$-4.7481\varepsilon^2 + 266.75\varepsilon - 3663.2 \leq IVC \leq 83 \quad (13^{-2})$$

or $$-27 \leq IVC \leq 4.7481\varepsilon^2 - 266.75\varepsilon + 3719.2 \quad (14^{-2})$$

If the correction term C according to the engine speed NE (rpm) of the engine 1 is used similar to the above, the relational expression of ε and IVC in Layer 3 can be expressed as follows.

If the geometric compression ratio ε is 10≤ε<20, $$0.9949\varepsilon^2-41.736\varepsilon+401.16+C \leq IVC \leq -0.9949\varepsilon^2+41.736\varepsilon-361.16+C \quad (11^{-3})$$

If the geometric compression ratio ε is 20≤ε<25, $$-35+C \leq IVC \leq 75+C \quad (12^{-3})$$

If the geometric compression ratio ε is 25≤ε≤30, $$-4.7481\varepsilon^2+266.75\varepsilon-3671.2+C \leq IVC \leq 75+C \quad (13^{-3})$$

or $$-35+C \leq IVC \leq 4.7481\varepsilon^2-266.75\varepsilon+3711.2+C \quad (14^{-3})$$

The processor determines the valve close timing IVC based on the ε-IVC valid range determined for every engine speed of the engine 1. As a result, the processor can set the valve timing of the intake valve 21 in Layer 3 as illustrated in FIG. 12.

Moreover, a lower graph 2002 of FIG. 20 is a relation between ε and IVC when the fuel is the low octane fuel.

Upon determining the valve close timing IVC in the engine 1 of the low octane fuel, if the geometric compression ratio ε is set as 10≤ε<18.7, when the engine speed is 2,000 rpm, the processor determines the valve close timing IVC (deg.aBDC) so that the following expression is satisfied.

$$0.9949\varepsilon^2-39.149\varepsilon+348.59 \leq IVC \leq -0.9949\varepsilon^2+39.149\varepsilon-308.59 \quad (15)$$

Moreover, if the geometric compression ratio ε is set as 18.7≤ε<23.7 in the engine 1 of the low octane fuel, when the engine speed is 2,000 rpm, the processor determines the valve close timing IVC (deg.aBDC) so that the following expression is satisfied.

$$-35 \leq IVC \leq 75 \quad (16)$$

Further, if the geometric compression ratio ε is set as 23.7≤ε≤30 in the engine 1 of the low octane fuel, when the engine speed is 2,000 rpm, the processor determines the valve close timing IVC (deg.aBDC) so that the following expression is satisfied.

$$-3.1298\varepsilon^2+172.48\varepsilon-2300 \leq IVC \leq 75 \quad (17)$$

or $$-35 \leq IVC \leq 3.1298\varepsilon^2-172.48\varepsilon+2340 \quad (18)$$

The cross-hatched range in the lower graph 2002 of FIG. 20 is an overlapping range of the ε-IVC valid range of the high octane fuel and the ε-IVC valid range of the low octane fuel. Similar to the above, the processor can set the control logic which suits both the engine 1 using the high octane fuel and the engine 1 using the low octane fuel by determining IVC within the overlapping range of the two occurring ranges.

Note that although illustration is omitted, if the engine speed increases, the ε-IVC valid range is parallelly translated to the retard side also in the engine 1 of the low octane fuel. If the geometric compression ratio ε is set as 10≤ε<18.7 in the engine 1 of the low octane fuel, when the engine speed is 3,000 rpm, the processor determines the valve close timing IVC (deg.aBDC) so that the following expression is satisfied.

$$0.9949\varepsilon^2-39.149\varepsilon+350.59 \leq IVC \leq -0.9949\varepsilon^2+39.149\varepsilon-306.59 \quad (15^{-1})$$

Moreover, if the geometric compression ratio ε is set as 18.7≤ε<23.7 in the engine 1 of the low octane fuel, when the engine speed is 3,000 rpm, the processor determines the valve close timing IVC (deg.aBDC) so that the following expression is satisfied.

$$-33 \leq IVC \leq 77 \quad (16^{-1})$$

Further, if the geometric compression ratio ε is set as 23.7≤ε≤30 in the engine 1 of the low octane fuel, when the engine speed is 3,000 rpm, the processor determines the valve close timing IVC (deg.aBDC) so that the following expression is satisfied.

$$-3.1298\varepsilon^2+172.48\varepsilon-2298 \leq IVC \leq 77 \quad (17^{-1})$$

or $$-33 \leq IVC \leq 3.1298\varepsilon^2-172.48\varepsilon+2342 \quad (18^{-1})$$

If the geometric compression ratio ε is set as 10≤ε<18.7 in the engine 1 of the low octane fuel, when the engine speed is 4,000 rpm, the processor determines the valve close timing IVC (deg.aBDC) so that the following expression is satisfied.

$$0.9949\varepsilon^2-39.149\varepsilon+356.59 \leq IVC \leq -0.9949\varepsilon^2+39.149\varepsilon-300.59 \quad (15^{-2})$$

Moreover, if the geometric compression ratio ε is set as 18.7≤ε<23.7 in the engine 1 of the low octane fuel, when the engine speed is 4,000 rpm, the processor determines the valve close timing IVC (deg.aBDC) so that the following expression is satisfied.

$$-27 \leq IVC \leq 83 \quad (16^{-2})$$

Further, if the geometric compression ratio ε is set as 23.7≤ε≤30 in the engine 1 of the low octane fuel, when the engine speed is 4,000 rpm, the processor determines the valve close timing IVC (deg.aBDC) so that the following expression is satisfied.

$$-3.1298\varepsilon^2+172.48\varepsilon-2292 \leq IVC \leq 83 \quad (17^{-2})$$

or $$-27 \leq IVC \leq 3.1298\varepsilon^2-172.48\varepsilon+2348 \quad (18^{-2})$$

If the correction term C according to the engine speed NE (rpm) of the engine 1 is used similar to the above, the relational expression of ε and IVC in Layer 3, in the engine 1 of the low octane fuel can be expressed as follows. If the geometric compression ratio ε is 10≤ε<18.7, $$0.9949\varepsilon^2-39.149\varepsilon+348.59+C \leq IVC \leq -0.9949\varepsilon^2+39.149\varepsilon-308.59+C \quad (15^{-3})$$

If the geometric compression ratio ε is 18.7≤ε<23.7, $$-35+C \leq IVC \leq 75+C \quad (16^{-3})$$

If the geometric compression ratio ε is 23.7≤ε≤30, $$-3.1298\varepsilon^2+172.48\varepsilon-2300+C \leq IVC \leq 75+C \quad (17^{-3})$$

or $$-35+C \leq IVC \leq 3.1298\varepsilon^2-172.48\varepsilon+2340+C \quad (18^{-3})$$

(Relationship Between Geometric Compression Ratio and Valve Close Timing of Intake Valve in Layers 2 and 3)

FIG. 21 illustrates a relationship between the geometric compression ratio ε and the valve close timing IVC of the intake valve 21 where SPCCI combustion is possible in both Layer 2 and Layer 3. This relational expression is obtained from the ε-IVC valid range of FIG. 17 and the ε-IVC valid range of FIG. 20.

When the ECU 10 selects Layer 3 according to the temperature, etc. of the engine 1, the low-load operating range of the engine 1 is switched from Layer 2 to Layer 3. If the valve close timing IVC of the intake valve 21 is set so that SPCCI combustion is possible in both Layer 2 and Layer 3, it is possible to continuously perform SPCCI combustion even when the map of the engine 1 is switched from Layer 2 to Layer 3.

An upper graph 2101 of FIG. 21 is a relationship between ε and IVC when the fuel is the high octane fuel. A lower graph 2102 is a relationship between ε and IVC when the fuel is the low octane fuel.

If the geometric compression ratio ε is set as 10≤ε<17 in the engine 1 of the high octane fuel, when the engine speed is 2,000 rpm, the processor determines the valve close timing IVC (deg.aBDC) so that the following expression is satisfied.

$$0.9949\varepsilon^2-41.736\varepsilon+401.16 \leq IVC \leq -0.9949\varepsilon^2+41.736\varepsilon-361.16 \quad (19)$$

If the geometric compression ratio ε is set as 17≤ε≤30 in the engine 1 of the high octane fuel, when the engine speed is 2,000 rpm, the processor determines the valve close timing IVC (deg.aBDC) so that the following expression is satisfied.

$$-0.4288\varepsilon^2+31.518\varepsilon-379.88 \leq IVC \leq -0.9949\varepsilon^2+41.736\varepsilon-361.16 \quad (20)$$

or $$0.9949\varepsilon^2-41.736\varepsilon+401.16 \leq IVC \leq 1.9163\varepsilon^2-89.935\varepsilon+974.94 \quad (21)$$

By setting the valve close timing IVC of the intake valve 21 based on the relational expressions (19) to (21), SPCCI combustion of the mixture gas with the A/F being leaner than the stoichiometric air fuel ratio can be carried out, and SPCCI combustion of the mixture gas with the A/F being the stoichiometric air fuel ratio or richer than the stoichiometric air fuel ratio, and the G/F being leaner than the stoichiometric air fuel ratio can be carried out.

Note that the valve close timing IVC is set for each operating state which is determined by the load and the engine speed in Layer 2 and Layer 3.

As illustrated by a broken line, if the geometric compression ratio ε is set as 10≤ε<17 in the engine 1 of the high octane fuel, when the engine speed is 3,000 rpm, the processor determines the valve close timing IVC (deg.aBDC) so that the following expression is satisfied.

$$0.9949\varepsilon^2-41.736\varepsilon+403.16 \leq IVC \leq -0.9949\varepsilon^2+41.736\varepsilon-359.16 \quad (19^{-1})$$

If the geometric compression ratio ε is set as 17≤ε≤30 in the engine 1 of the high octane fuel, when the engine speed is 3,000 rpm, the processor determines the valve close timing IVC (deg.aBDC) so that the following expression is satisfied.

$$-0.4288\varepsilon^2+31.518\varepsilon-377.88 \leq IVC \leq -0.9949\varepsilon^2+41.736\varepsilon-359.16 \quad (20^{-1})$$

or $$0.9949\varepsilon^2-41.736\varepsilon+403.16 \leq IVC \leq 1.9163\varepsilon^2-89.935\varepsilon+976.94 \quad (21^{-1})$$

Similarly, as illustrated by a one-dot chain line, if the geometric compression ratio ε is set as 10≤ε<17 in the engine 1 of the high octane fuel, when the engine speed is 4,000 rpm, the processor determines the valve close timing IVC (deg.aBDC) so that the following expression is satisfied.

$$0.9949\varepsilon^2-41.736\varepsilon+409.16 \leq IVC \leq -0.9949\varepsilon^2+41.736\varepsilon-353.16 \quad (19^{-2})$$

If the geometric compression ratio ε is set as 17≤ε≤30 in the engine 1 of the high octane fuel, when the engine speed is 4,000 rpm, the processor determines the valve close timing IVC (deg.aBDC) so that the following expression is satisfied.

$$-0.4288\varepsilon^2+31.518\varepsilon-371.88 \leq IVC \leq -0.9949\varepsilon^2+41.736\varepsilon-353.16 \quad (20^{-2})$$

or $$0.9949\varepsilon^2-41.736\varepsilon+409.16 \leq IVC \leq 1.9163\varepsilon^2-89.935\varepsilon+982.94 \quad (21^{-2})$$

If the correction term C according to the engine speed NE (rpm) of the engine 1 is used similar to the above, the relational expression of ε and IVC in Layer 2 and Layer 3 can be expressed as follows. If the geometric compression ratio ε is 10≤ε<17, $$0.9949\varepsilon^2-41.736\varepsilon+401.16+C \leq IVC \leq -0.9949\varepsilon^2+41.736\varepsilon-361.16+C \quad (19^{-3})$$

If the geometric compression ratio ε is 17≤ε≤30, $$-0.4288\varepsilon^2+31.518\varepsilon-379.88+C \leq IVC \leq -0.9949\varepsilon^2+41.736\varepsilon-361.16+C \quad (20^{-3})$$

or $$0.9949\varepsilon^2-41.736\varepsilon+401.16+C \leq IVC \leq 1.9163\varepsilon^2-89.935\varepsilon+974.94+C \quad (21^{-3})$$

Here, if the geometric compression ratio ε determined to be lower than 17, the processor can determine IVC based on the relational expression ($19^{-3}$). Since the selection range of IVC is wide, a degree of freedom in the design becomes high.

Moreover, as illustrated in the lower graph 2102 of FIG. 21, if the geometric compression ratio ε is set as 10≤ε<15.7 in the engine 1 of the low octane fuel, when the engine speed is 2,000 rpm, the processor determines the valve close timing IVC (deg.aBDC) so that the following expression is satisfied.

$$0.9949\varepsilon^2-39.149\varepsilon+348.59 \leq IVC \leq -0.9949\varepsilon^2+39.149\varepsilon-308.59 \quad (22)$$

Moreover, if the geometric compression ratio ε is set as 15.7≤ε≤30 in the engine 1 of the low octane fuel, when the engine speed is 2,000 rpm, the processor determines the valve close timing IVC (deg.aBDC) so that the following expression is satisfied.

$$=0.5603\varepsilon^2+34.859\varepsilon-377.22 \leq IVC \leq -0.9949\varepsilon^2+39.149\varepsilon-308.59 \quad (23)$$

or $$0.9949\varepsilon^2-39.149\varepsilon+348.59 \leq IVC \leq 1.9211\varepsilon^2-85.076\varepsilon+862.01 \quad (24)$$

Although illustration is omitted, if the geometric compression ratio ε is set as 10≤ε<15.7 in the engine 1 of the low octane fuel, when the engine speed is 3,000 rpm, the processor determines the valve close timing IVC (deg.aBDC) so that the following expression is satisfied.

$$0.9949\varepsilon^2-39.149\varepsilon+350.59 \leq IVC \leq -0.9949\varepsilon^2+39.149\varepsilon-306.59 \quad (22^{-1})$$

Moreover, if the geometric compression ratio ε is set as 15.7≤ε≤30 in the engine 1 of the low octane fuel, when the engine speed is 3,000 rpm, the processor determines the valve close timing IVC (deg.aBDC) so that the following expression is satisfied.

$$-0.5603\varepsilon^2+34.859\varepsilon-375.22 \leq IVC \leq -0.9949\varepsilon^2+39.149\varepsilon-306.59 \quad (23^{-1})$$

or $$0.9949\varepsilon^2-39.149\varepsilon+350.59 \leq IVC \leq 1.9211\varepsilon^2-85.076\varepsilon+864.01 \quad (24^{-1})$$

Although illustration is similarly omitted, if the geometric compression ratio ε is set as 10≤ε<15.7 in the engine 1 of the low octane fuel, when the engine speed is 4,000 rpm, the processor determines the valve close timing IVC (deg.aBDC) so that the following expression is satisfied.

$$0.9949\varepsilon^2-39.149\varepsilon+356.59 \leq IVC \leq -0.9949\varepsilon^2+39.149\varepsilon-300.59 \quad (22^{-2})$$

Moreover, if the geometric compression ratio ε is set as 15.7≤ε≤30 in the engine 1 of the low octane fuel, when the engine speed is 4,000 rpm, the processor determines the valve close timing IVC (deg.aBDC) so that the following expression is satisfied.

$$-0.5603\varepsilon^2+34.859\varepsilon-369.22 \leq IVC \leq -0.9949\varepsilon^2+39.149\varepsilon-300.59 \quad (23^{-2})$$

or $$0.9949\varepsilon^2-39.149\varepsilon+356.59 \leq IVC \leq 1.9211\varepsilon^2-85.076\varepsilon+870.01 \quad (24^{-2})$$

If the correction term C according to the engine speed NE (rpm) of the engine 1 is used similar to the above, the relational expression of ε and IVC in Layer 2 and Layer 3 in the engine 1 of the low octane fuel can be expressed as follows. If the geometric compression ratio ε is 10≤ε<15.7, $$0.9949\varepsilon^2-39.149\varepsilon+348.59+C \leq IVC \leq -0.9949\varepsilon^2+39.149\varepsilon-308.59+C \quad (22^{-3})$$

If the geometric compression ratio ε is 15.7≤ε≤30, $$-0.5603\varepsilon^2+34.859\varepsilon-377.22+C \leq IVC \leq -0.9949\varepsilon^2+39.149\varepsilon-308.59+C \quad (23^{-3})$$

or $$0.9949\varepsilon^2-39.149\varepsilon+348.59+C \leq IVC \leq 1.9211\varepsilon^2-85.076\varepsilon+862.01+C \quad (24^{-3})$$

Note that although illustration is omitted, the processor may determine IVC within an overlapping range of the ε-IVC valid range of the upper graph 2101 and the ε-IVC valid range of the lower graph 2102 of FIG. 21. Similar to above, the processor can set the control logic which suits both the engine 1 using the high octane fuel and the engine 1 using the low octane fuel by determining IVC within the overlapping range of the two occurring ranges.

(Procedure of Method of Implementing Control Logic)

Next, a procedure of the method of implementing the control logic of the engine 1 for executing SPCCI combustion will be described with reference to a flowchart illustrated in FIG. 22. The processor can execute each step. The computer stores information on the ε-IVC valid range illustrated in FIGS. 17, 20, and 21.

At Step S221 after the procedure starts, the processor first sets the geometric compression ratio ε. The processor may input the set value of the geometric compression ratio ε into the computer.

At the following Step S222, the processor sets the valve opening angle of the intake valve 21, and the valve opening angle of the exhaust valve 22. This corresponds to determining the cam shapes of the intake valve 21 and the exhaust valve 22. The processor may input the set values of the valve opening angles of the intake valve 21 and the exhaust valve 22 into the computer. Thus, a hardware configuration of the engine 1 can be set at Steps S221 and S222.

At Step S223, the processor sets the operating state comprised of the load and the engine speed, and at the following Step S224, the processor selects IVC based on the ε-IVC valid range (FIGS. 17, 20, and 21) stored in the computer.

Then, at Step S225, the computer determines whether SPCCI combustion can be achieved based on IVC set at Step S224. If the determination at Step S225 is YES, this procedure shifts to Step S226, and the processor determines the control logic of the engine 1 so that SPCCI combustion is performed in the operating state set at Step S223. On the other hand, if the determination at Step S225 is NO, this procedure shifts to Step S227, and the processor determines the control logic of the engine 1 so that SI combustion is performed in the operating state set at Step S223. Note that at Step S227, the processor may again set the valve close timing IVC of the intake valve 21 in consideration of performing SI combustion.

As described above, the method of implementing the control logic of the compression-ignition engine disclosed herein determines the relation between the engine geometric compression ratio ε and the valve close timing IVC of the intake valve 21. The processor can determine the valve close timing IVC of the intake valve 21 within the range where the relation is satisfied. The processor can implement the control logic of the engine 1 by less time and labor compared with the conventional arts.

(Other Embodiments)

Note that the application of the technology disclosed herein is not limited to the engine 1 having the configuration described above. The configuration of the engine 1 may adopt various configurations.

For example, the engine 1 may be provided with a turbocharger, instead of the mechanical supercharger 44.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
10 ECU (Controller)
17 Combustion Chamber
23 Intake-side Electric S-VT (Variable Valve Operating Mechanism)
25 Ignition Plug (Ignition Part)
44 Supercharger
55 EGR System
6 Injector (Fuel Injection Part)
SW1 Airflow Sensor (Measurement Part)

SW2 First Intake-air Temperature Sensor (Measurement Part)
SW3 First Pressure Sensor (Measurement Part)
SW4 Second Intake-air Temperature Sensor (Measurement Part)
SW5 Second Pressure Sensor (Measurement Part)
SW6 Pressure Indicating Sensor (Measurement Part)
SW7 Exhaust Temperature Sensor (Measurement Part)
SW8 Linear $O_2$ Sensor (Measurement Part)
SW9 Lambda $O_2$ Sensor (Measurement Part)
SW10 Water Temperature Sensor (Measurement Part)
SW11 Crank Angle Sensor (Measurement Part)
SW12 Accelerator Opening Sensor (Measurement Part)
SW13 Intake Cam Angle Sensor (Measurement Part)
SW14 Exhaust Cam Angle Sensor (Measurement Part)
SW15 EGR Pressure Difference Sensor (Measurement Part)
SW16 Fuel Pressure Sensor (Measurement Part)
SW17 Third Intake-air Temperature Sensor (Measurement Part)

What is claimed is:

1. A method of implementing control logic of a compression-ignition engine, the engine comprising: an injector configured to inject fuel to be supplied in a combustion chamber; a variable valve operating mechanism configured to change a valve timing of an intake valve; an ignition plug configured to ignite a mixture gas inside the combustion chamber; at least one sensor configured to measure a parameter related to an operating state of the engine; and a controller including a processor configured to execute the control logic and a memory in which the control logic is stored, the controller being configured to perform a calculation according to the control logic corresponding to the operating state of the engine in response to the measurement of the at least one sensor, and output a signal to the injector, the variable valve operating mechanism, and the ignition plug, the controller outputting the signal to the injector and the variable valve operating mechanism so that a gas-fuel ratio (G/F) that is a weight ratio of an entire gas of the mixture gas inside the combustion chamber to the fuel becomes leaner than a stoichiometric air fuel ratio, and air-fuel ratio (A/F) that is a weight ratio of air contained in the mixture gas to the fuel becomes the stoichiometric air fuel ratio or richer than the stoichiometric air fuel ratio, and outputting a signal to the ignition plug so that unburnt mixture gas combusts by self-ignition after the ignition plug ignites the mixture gas inside the combustion chamber, and the method comprising:
 determining a geometric compression ratio $\varepsilon$ of the engine;
 executing, by the processor, the control logic defining a valve close timing IVC of the intake valve; and
 closing, by the variable valve operating mechanism, the intake valve when the valve close timing IVC (deg.aBDC) is determined so that the following expression is satisfied:
 if the geometric compression ratio $\varepsilon$ is $10 \leq \varepsilon < 17$, $0.4234\varepsilon^2 - 22.926\varepsilon + 207.84 + C \leq IVC \leq -0.4234\varepsilon^2 + 22.926\varepsilon - 167.84 + C$ and if the geometric compression ratio $\varepsilon$ is $17 \leq \varepsilon < 20$, $-0.4288\varepsilon^2 + 31.518\varepsilon - 379.88 + C \leq IVC \leq -0.4234\varepsilon^2 + 22.926\varepsilon - 167.84 + C$ or $0.4234\varepsilon^2 - 22.926\varepsilon + 207.84 + C \leq IVC \leq 1.9163\varepsilon^2 - 89.935\varepsilon + 974.94 + C$ and if the geometric compression ratio $\varepsilon$ is $20 \leq \varepsilon \leq 30$, $-0.4288\varepsilon^2 + 31.518\varepsilon - 379.88 + C \leq IVC \leq 120$ or $-80 \leq IVC \leq 1.9163\varepsilon^2 - 89.935\varepsilon + 974.94 + C$ where C is a correction term according to an engine speed NE (rpm), $C = 3.3 \times 10^{-10} NE^3 - 1.0 \times 10^{-6} NE^2 + 7.0 \times 10^{-4} NE$.

2. The method of claim 1, wherein
the engine has:
 a first mode in which the controller outputs a signal to each of the injector and the variable valve operating mechanism so that the A/F becomes leaner than the stoichiometric air fuel ratio, and outputs a signal to the ignition plug so that the unburnt mixture gas combusts by self-ignition after the ignition plug ignites the mixture gas inside the combustion chamber, and
 a second mode in which the controller outputs a signal to each of the injector and the variable valve operating mechanism so that the G/F becomes leaner than the stoichiometric air fuel ratio, and the A/F becomes the stoichiometric air fuel ratio or richer than the stoichiometric air fuel ratio, and outputs a signal to the ignition plug so that the unburnt mixture gas combusts by self-ignition after the ignition plug ignites the mixture gas inside the combustion chamber, and
when executing the control logic, the valve close timing IVC (deg.aBDC) is determined so that the following expression is satisfied:
 if the engine speed is in a range from 2,000 rpm to 4,000 rpm,
 if the fuel is a high octane fuel, and
 if the geometric compression ratio $\varepsilon$ is $10 \leq \varepsilon < 17$, $0.9949\varepsilon^2 - 41.736\varepsilon + 401.16 + C \leq IVC \leq -0.9949\varepsilon^2 + 41.736\varepsilon - 361.16 + C$ and if the geometric compression ratio $\varepsilon$ is $17 \leq \varepsilon \leq 30$, $-0.4288\varepsilon^2 + 31.518\varepsilon - 379.88 + C \leq IVC \leq -0.9949\varepsilon^2 + 41.736\varepsilon - 361.16 + C$ or $0.9949\varepsilon^2 - 41.736\varepsilon + 401.16 + C \leq IVC \leq 1.9163\varepsilon^2 - 89.935\varepsilon + 974.94 + C$ where C is the correction term according to the engine speed NE (rpm), $C = 3.3 \times 10^{-10} NE^3 - 1.0 \times 10^{-6} NE^2 + 7.0 \times 10^{-4} NE$.

3. The method of claim 1, wherein
the engine has:
 a first mode in which the controller outputs a signal to each of the injector and the variable valve operating mechanism so that the A/F becomes leaner than the stoichiometric air fuel ratio, and outputs a signal to the ignition plug so that the unburnt mixture gas combusts by self-ignition after the ignition plug ignites the mixture gas inside the combustion chamber, and
 a second mode in which the controller outputs a signal to each of the injector and the variable valve operating mechanism so that the G/F becomes leaner than the stoichiometric air fuel ratio, and the A/F becomes the stoichiometric air fuel ratio or richer than the stoichiometric air fuel ratio, and outputs a signal to the ignition plug so that the unburnt mixture gas combusts by self-ignition after the ignition plug ignites the mixture gas inside the combustion chamber, and when executing the control logic, the valve close timing IVC (deg.aBDC) is determined so that the following expression is satisfied:

if the engine speed is in a range from 2,000 rpm to 4,000 rpm,
if the fuel is a low octane fuel, and
if the geometric compression ration ε is 10≤ε<15.7, $$0.9949\varepsilon^2-39.149\varepsilon+348.59+C \leq IVC \leq -0.9949\varepsilon^2+39.149\varepsilon-308.59+C$$

and if the geometric compression ratio ε is 15.7≤ε≤30, $$-0.5603\varepsilon^2+34.859\varepsilon-377.22+C \leq IVC \leq -0.9949\varepsilon^2+39.149\varepsilon-308.59+C$$

or $$0.9949\varepsilon^2-39.149\varepsilon+348.59+C \leq IVC \leq 1.9211\varepsilon^2-85.076\varepsilon+862.01+C$$

where C is the correction term according to the engine speed NE (rpm), $$C=3.3\times10^{-10}NE^3-1.0\times10^{-6}NE^2+7.0\times10^{-4}NE.$$

4. The method of claim 1, wherein
the close timing IVC of the intake valve changes as the operating state of the engine changes, and
the close timing IVC (deg.aBDC) is determined for each operating state so that the expression is satisfied.

5. The method of claim 1, wherein
the engine is provided with an exhaust gas recirculation (EGR) system configured to introduce exhaust gas into the combustion chamber, and
the controller outputs a signal to the EGR system and the ignition plug so that a heat amount ratio used as an index related to a ratio of an amount of heat generated when the mixture gas combusts by flame propagation to the entire amount of heat generated when the mixture gas inside the combustion chamber combusts, becomes a target heat amount ratio defined corresponding to the operating state of the engine.

6. The method of claim 5, wherein the controller outputs a signal to the EGR system and the ignition plug so that the heat amount ratio becomes higher when a load of the engine is higher.

7. A method of implementing control logic of a compression-ignition engine, the engine comprising: a injector configured to inject fuel to be supplied in a combustion chamber; a variable valve operating mechanism configured to change a valve timing of an intake valve; an ignition plug configured to ignite a mixture gas inside the combustion chamber; at least one sensor configured to measure a parameter related to an operating state of the engine; and a controller including a processor configured to execute the control logic and a memory in which the control logic is stored, the controller being configured to perform a calculation according to the control logic corresponding to the operating state of the engine in response to the measurement of the at least one sensor, and output a signal to the injector, the variable valve operating mechanism, and the ignition plug, the controller outputting the signal to the injector and the variable valve operating mechanism so that a gas-fuel ratio (G/F) that is a weight ratio of an entire gas of the mixture gas inside the combustion chamber to the fuel becomes leaner than a stoichiometric air fuel ratio, and an air-fuel ratio (A/F) that is a weight ratio of air contained in the mixture gas to the fuel becomes the stoichiometric air fuel ratio or richer than the stoichiometric air fuel ratio, and outputting a signal to the ignition plug so that unburnt mixture gas combusts by self-ignition after the ignition plug ignites the mixture gas inside the combustion chamber, and the method comprising:

determining a geometric compression ratio ε of the engine;
executing, by the processor, the control logic defining a valve close timing IVC of the intake valve; and
closing, by the variable valve operating mechanism, the intake valve when the valve close timing IVC (deg.aBDC) is determined so that the following expression is satisfied:
if the fuel is a low octane fuel, and
if the geometric compression ratio ε is 10≤ε<15.7, $$0.4234\varepsilon^2-21.826\varepsilon+178.75+C \leq IVC \leq -0.4234\varepsilon^2+321.826\varepsilon-138.75+C$$

and if the geometric compression ratio ε is 15.7≤ε<18.7, $$-0.5603\varepsilon^2+34.859\varepsilon-377.22+C \leq IVC \leq -0.4234\varepsilon^2+21.826\varepsilon-138.75+C$$

or $$0.4234\varepsilon^2-32.826\varepsilon+178.75+C \leq IVC \leq 1.9211\varepsilon^2-85.076\varepsilon+862.01+C$$

and if the geometric compression ratio ε is 18.7≤ε≤30, $$-0.5603\varepsilon^2+34.859\varepsilon-377.22+C \leq IVC \leq 120$$

or $$-80 \leq IVC \leq 1.9211\varepsilon^2-85.076\varepsilon+862.01+C$$

where C is the correction term according to an engine speed NE (rpm), $$C=3.3\times10^{-10}NE^3-1.0\times10^{-6}NE^2+7.0\times10^{-4}NE.$$

8. The method of claim 7, wherein
the close timing IVC of the intake valve changes as the operating state of the engine changes, and
the close timing IVC (deg.aBDC) is determined for each operating state so that the expression is satisfied.

9. The method of claim 7, wherein
the engine is provided with an exhaust gas recirculation (EGR) system configured to introduce exhaust gas into the combustion chamber, and
the controller outputs a signal to the EGR system and the ignition plug so that a heat amount ratio used as an index related to a ratio of an amount of heat generated when the mixture gas combusts by flame propagation to the entire amount of heat generated when the mixture gas inside the combustion chamber combusts, becomes a target heat amount ratio defined corresponding to the operating state of the engine.

10. The method of claim 9, wherein the controller outputs a signal to the EGR system and the ignition plug so that the heat amount ratio becomes higher when a load of the engine is higher.

11. A method of implementing control logic of a compression-ignition engine, the engine comprising: a injector configured to inject fuel to be supplied in a combustion chamber; a variable valve operating mechanism configured to change a valve timing of an intake valve; an ignition plug configured to ignite a mixture gas inside the combustion chamber; at least one sensor configured to measure a parameter related to an operating state of the engine; and a controller including a processor configured to execute the control logic and a memory in which the control logic is stored, the controller being configured to perform a calculation according to the control logic corresponding to the operating state of the engine in response to the measurement of the at least one sensor, and output a signal to the injector, the variable valve operating mechanism, and the ignition plug, the controller outputting the signal to the injector and the variable valve operating mechanism so that an air-fuel ratio (A/F) that is a weight ratio of air contained in the mixture gas to the fuel becomes leaner than the stoichiometric air fuel ratio, and outputting a signal to the ignition plug so that unburnt mixture gas combusts by self-ignition after the ignition plug ignites the mixture gas inside the combustion chamber, and the method comprising:

determining a geometric compression ratio $\varepsilon$ of the engine;

executing, by the processor, the control logic defining a valve close timing IVC of the intake valve; and closing, by the variable valve operating mechanism, the intake valve when the valve close timing IVC (deg.aBDC) is determined so that the following expression is satisfied:

if the geometric compression ratio $\varepsilon$ is $10 \leq \varepsilon < 20$, $$0.9949\varepsilon^2 - 41.736\varepsilon + 401.16 + C \leq IVC \leq -0.9949\varepsilon^2 + 41.736\varepsilon - 361.16 + C$$

and if the geometric compression ratio $\varepsilon$ is $20 \leq \varepsilon < 25$, $$-35 + C \leq IVC \leq 75 + C$$

and if the geometric compression ratio $\varepsilon$ $25 \leq \varepsilon \leq 30$, $$-4.7481\varepsilon^2 + 266.75\varepsilon^2 - 3671.2 + C \leq IVC \leq 75 + C$$

or $$-35 + C \leq IVC \leq 4.47581\varepsilon^2 - 266.75\varepsilon + 3711.2 + C$$

where C is a correction term according to an engine speed NE (rpm), $$C = 3.3 \times 10^{-10} NE^3 - 1.0 \times 10^{-6} NE^2 + 7.0 \times 10^{-4} NE.$$

12. The method of claim 11, wherein
the close timing IVC of the intake valve changes as the operating state of the engine changes, and
the close timing IVC (deg.aBDC) is determined for each operating state so that the expression is satisfied.

13. The method of claim 12, wherein
the engine is provided with an exhaust gas recirculation (EGR) system configured to introduce exhaust gas into the combustion chamber, and
the controller outputs a signal to the EGR system and the ignition plug so that a heat amount ratio used as an index related to ratio of an amount of heat generated when the mixture gas combusts by flame propagation to the entire amount of heat generated when the mixture gas inside the combustion chamber combusts, becomes a target heat amount ratio defined corresponding to the operating state of the engine.

14. The method of claim 11, wherein
the engine is provided with an EGR system configured to introduce exhaust gas into the combustion chamber, and
the controller outputs a signal to the EGR system and the ignition plug so that a heat amount ratio used as an index related to ratio of an amount of heat generated when the mixture gas combusts by flame propagation to the entire amount of heat generated when the mixture gas inside the combustion chamber combusts, becomes a target heat amount ratio defined corresponding to the operating state of the engine.

15. The method of claim 14, wherein the controller outputs a signal to the EGR system and the ignition plug so that the heat amount ratio becomes higher when a load of the engine is higher.

16. A method of implementing control logic of a compression-ignition engine, the engine comprising: a injector configured to inject fuel to be supplied in a combustion chamber; a variable valve operating mechanism configured to change a valve timing of an intake valve; an ignition plug configured to ignite a mixture gas inside the combustion chamber; at least one sensor configured to measure a parameter related to an operating state of the engine; and a controller including a processor configured to execute the control logic and a memory in which the control logic is stored, the controller being configured to perform a calculation according to the control logic corresponding to the operating state of the engine in response to the measurement of the at least one sensor, and output a signal to the injector, the variable valve operating mechanism, and the ignition plug, the controller outputting the signal to the injector and the variable valve operating mechanism so that an air-fuel ratio (A/F) that is a weight ratio of air contained in the mixture gas to the fuel becomes leaner than a stoichiometric air fuel ratio, and outputting a signal to the ignition plug so that unburnt mixture gas combusts by self-ignition after the ignition plug ignites the mixture gas inside the combustion chamber, and the method comprising:

determining a geometric compression ratio $\varepsilon$ of the engine;

executing, by the processor, the control logic defining a valve close timing IVC of the intake valve; and closing, by the variable valve operating mechanism, the intake valve when the valve close timing IVC (deg.aBDC) is determined so that the following expression is satisfied:

if the fuel is a low octane fuel, and
if the geometric compression ratio $\varepsilon$ is $10 \leq \varepsilon < 18.7$, $$0.9949\varepsilon^2 - 39.149\varepsilon + 348.59 + C \leq IVC \leq -0.9949\varepsilon^2 + 39.149\varepsilon - 308.59 + C$$

and if the geometric compression ratio $\varepsilon$ is $18.7 \leq \varepsilon < 23.7$, $$-35 + C \leq IVC \leq 75 + C$$

and if the geometric compression ratio $\varepsilon$ is $23.7 \leq \varepsilon \leq 30$, $$-3.1298\varepsilon^2 + 172.48\varepsilon - 2300 + C \leq IVC \leq 75 + C$$

or $$-35 + C \leq IVC \leq 3.1298\varepsilon^2 - 172.48\varepsilon + 2340 + C$$

where C is the correction term according to an engine speed NE (rpm), $$C = 3.3 \times 10^{-10} NE^3 - 1.0 \times 10^{-6} NE^2 + 7.0 \times 10^{-4} NE.$$

17. The method of claim 16, wherein
the close timing IVC of the intake valve changes as the operating state of the engine changes, and
the close timing IVC (deg.aBDC) is determined for each operating state so that the expression is satisfied.

18. The method of claim 17, wherein
the engine is provided with an EGR system configured to introduce exhaust gas into the combustion chamber, and the controller outputs a signal to the EGR system and the ignition plug so that a heat amount ratio used as an index related to ratio of an amount of heat generated when the mixture gas combusts by flame propagation to the entire amount of heat generated when the mixture gas inside the combustion chamber combusts, becomes a target heat amount ratio defined corresponding to the operating state of the engine.

19. The method of claim 16, wherein the engine is provided with an EGR system configured to introduce exhaust gas into the combustion chamber, and the controller outputs a signal to the EGR system and the ignition plug so that a heat amount ratio used as an index related to ratio of an amount of heat generated when the mixture gas combusts by flame propagation to the entire amount of heat generated when the mixture gas inside the combustion chamber combusts, becomes a target heat amount ratio defined corresponding to the operating state of the engine.

20. The method of claim 19, wherein the controller outputs a signal to the EGR system and the ignition plug so that the heat amount ratio becomes higher when a load of the engine is higher.

\* \* \* \* \*